(12) United States Patent
Yasui et al.

(10) Patent No.: US 6,192,311 B1
(45) Date of Patent: Feb. 20, 2001

(54) APPARATUS FOR CONTROLLING INTERNAL COMBUSTION ENGINE

(75) Inventors: Yuji Yasui; Masaki Ueno, both of Wako (JP)

(73) Assignee: Honda Giken Kogyo Kabushiki Kaisha, Tokyo (JP)

( * ) Notice: Under 35 U.S.C. 154(b), the term of this patent shall be extended for 0 days.

(21) Appl. No.: 09/411,867

(22) Filed: Oct. 4, 1999

(30) Foreign Application Priority Data

Oct. 2, 1998 (JP) .................................................. 10-281428

(51) Int. Cl.$^7$ ...................................................... F02D 41/14
(52) U.S. Cl. ........................... 701/113; 701/102; 123/350
(58) Field of Search .................................. 701/102, 110, 701/113; 123/350, 339.2

(56) References Cited

U.S. PATENT DOCUMENTS

| | | | |
|---|---|---|---|
| 5,479,897 | * 1/1996 | Kawai et al. | 123/339.2 |
| 5,651,341 | * 7/1997 | Harada et al. | 123/339.2 |
| 5,749,343 | * 5/1998 | Nichols et al. | 123/350 |

FOREIGN PATENT DOCUMENTS

| | | |
|---|---|---|
| 7-133739 | 5/1995 | (JP) . |
| 8-61122 | 3/1996 | (JP) . |

OTHER PUBLICATIONS

U.S. application No. 09/063,732, Yasui et al., filed Apr. 24, 1998; For: Control System For Controlling Internal Combustion Engine.

* cited by examiner

*Primary Examiner*—Andrew M. Dolinar
(74) *Attorney, Agent, or Firm*—Arent Fox Kintner Plotkin & Kahn, PLLC

(57) ABSTRACT

A control apparatus controls an internal combustion engine by generating a command value for a manipulative quantity of a flow control valve disposed in an intake air passage of an internal combustion engine controllable by the flow control valve, according to a sliding mode control process in order to converge a predetermined control quantity relative to the internal combustion engine to a target value thereof. An object to be controlled by the sliding mode control process is modeled by a discrete system for generating the control quantity from the command value for the manipulative quantity of the flow control valve. The sliding mode control process uses a switching function constructed by a linear function composed of a plurality of time-series data of the difference between the control quantity and the target value. An algorithm for generating the command value for the manipulative quantity of the flow control valve in a predetermined control cycle according to the sliding mode control process is constructed based on the discrete-system model of the object to be controlled and the switching function.

7 Claims, 21 Drawing Sheets

MAIN ROUTINE (PROCESSING IN STEP4-4)

(PROCESSING IN STEP14-3)

(PROCESSING IN STEP15-6)

(PROCESSING IN STEP14-6)

(PROCESSING IN STEP4-6)

(PROCESSING IN STEP22-2)

APPARATUS FOR CONTROLLING INTERNAL COMBUSTION ENGINE

BACKGROUND OF THE INVENTION

1. Field of the Invention

The present invention relates to an apparatus for controlling an internal combustion engine, and more particularly to an apparatus for controlling a flow control valve disposed in an intake air passage of an internal combustion engine, such as a throttle valve or the like, for converging a given control quantity such as an amount of intake air introduced into the internal combustion engine to a target value therefor according to a sliding mode control process.

2. Description of the Related Art

Apparatus for controlling internal combustion engines control a flow control valve disposed in an intake air passage of an internal combustion engine, such as a throttle valve or the like, for converging various control quantities, e.g., an amount of intake air, a rotational speed, an output torque, etc. relative to the internal combustion engine to desired target values according to a feedback control process.

It is the general practice to employ a PI (proportional plus integral) control process as the feedback control process. However, the PI control process is difficult to achieve control stability against the effect of disturbance or the like, and finds it extremely difficult to establish gain constants relative to proportional and integral terms.

In recent years, there have been proposed apparatus which employ a sliding mode control process for the above feedback control process, as disclosed in Japanese laid-open patent publications Nos. 7-133739 and 8-61122, for example.

In the proposed apparatus, a command signal (so-called control input) corresponding to a command value for a manipulative quantity for the throttle valve for converging an output torque, which is a control quantity of an internal combustion engine, to its target value is generated according to the sliding mode control process, and an actuator of the throttle valve is operated on the basis of the generated command signal.

Generally, the sliding mode control process is more stable against the effect of disturbance or the like than the PI control process. According to the sliding mode control process, it is possible to converge a control quantity, such as an output torque or the like, of an internal combustion engine that can be controlled by the throttle valve, stably to a target value.

The sliding mode control process requires a model of an object to be controlled thereby in order to construct an algorithm for the processing thereof. Heretofore, as described in the above publications, the model is established as a continuous system or, more specifically, a continuous-time system.

For example, according to the disclosure of the above publications, a system including a throttle valve, an actuator thereof, and an internal combustion engine is handled as an object to be controlled, and each of the behavioral characteristics of a system including the throttle valve and the actuator and the behavioral characteristics of the internal combustion engine is expressed as a continuous-system model of a time lag of first order (a differential equation of first order) (the overall object to be controlled is expressed by a differential equation of second order). The algorithm for the processing of the sliding mode control process is constructed on the basis of the continuous-system model.

However, since the object to be controlled by the sliding mode control process has heretofore been expressed as a continuous-system model, the conventional apparatus suffer the following drawbacks:

In the sliding mode control process, it is necessary to establish, in addition to the above model, a linear function referred to as a switching function based on the model (such a linear function is called a sliding line constant in the above publications). When the continuous-system model of the object to be controlled is established, the switching function is defined by a linear function composed of the difference between a control quantity and a target value therefor and a time differential of the difference (a rate of change of the difference). According to the above publications, an input of the object to be controlled, i.e., a command signal corresponding to a command value for the manipulative quantity of a throttle valve, is generated in order to converge the value of the switching function thus defined to "0". In this manner, the difference and its rate of change are controlled to achieve a stable state in which the difference between the control quantity (output torque) of the object to be controlled and its target value, and its rate of change become "0", i.e., the control quantity is steadily converged to its target value.

The conventional apparatus which express the object to be controlled as a continuous-system model require the rate of change (time differential) of the difference between the control quantity and its target value as a component of the switching function that is needed for the processing of the sliding mode control process.

However, inasmuch as the rate of change generally cannot directly be detected easily by a sensor or the like, it is customary to determine the rate of change from the detected value of the control quantity or its predicted value through calculations. Accordingly, the value of the rate of change tends to contain a calculation error. Moreover, in situations where the control quantity tends to contain an instantaneous noise component (such situations are likely to occur with internal combustion engines), the value of the rate of change tends to suffer a large error, i.e., tends to lack reliability.

Though the sliding mode control process has excellent properties, those properties possibly fail to be fully utilized, making it impossible to converge the control quantity stably to the target value.

In the continuous-system model, generally, it is difficult to identify the values of model parameters (such as a time constant in the above publications) which define the actual behaviors of the model. It has been necessary to express the continuous-system model as a discrete system (specifically, a discrete-time system), and to use a known computer-processed algorithm to identify the model parameters of the discrete-system model.

SUMMARY OF THE INVENTION

It is therefore an object of the present invention to provide an apparatus for controlling an internal combustion engine to control a flow control valve such as a throttle valve or the like according to a sliding mode control process for converging a certain control quantity in an internal combustion engine to a target value, the apparatus allowing an algorithm for the processing of the sliding mode control process to be constructed without using data of a rate of change of the difference between the control quantity and its target value, and capable of converging the control quantity to the target value stably and accurately.

To accomplish the above object, there is provided in accordance with the present invention, an apparatus for controlling an internal combustion engine by generating a command value for a manipulative quantity of a flow control valve disposed in an intake air passage of an internal combustion engine controllable by the flow control valve, according to a sliding mode control process in order to converge a predetermined control quantity relative to the internal combustion engine to a target value thereof, wherein an object to be controlled by the sliding mode control process is modeled by a discrete system for generating the control quantity from the command value for the manipulative quantity of the flow control valve, the sliding mode control process uses a switching function constructed by a linear function composed of a plurality of time-series data of the difference between the control quantity and the target value, and an algorithm for generating the command value for the manipulative quantity of the flow control valve in a predetermined control cycle according to the sliding mode control process is constructed based on the discrete-system model of the object to be controlled and the switching function.

With the above arrangement, since an object to be controlled by the sliding mode control process is modeled by a discrete system for generating the control quantity from the command value for the manipulative quantity of the flow control valve, the switching function used in the sliding mode control process can comprise a linear function composed of a plurality of time-series data of the difference between the control quantity and the target value. When the switching function is thus constructed, the algorithm of the processing of the sliding mode control process may basically comprise an algorithm for generating a command value for the manipulative quantity of the flow control valve to converge the value of the switching function determined by the values of the time-series data of the difference of the switching function to "0" and maintain the value of the switching function at "0" with respect to the discrete-system model of the object to be controlled. According to the above algorithm, it is possible to converge each of the values of the time-series data of the difference of the switching function to a balanced state where each of the values is "0" (at this time, the switching function is also "0"), i.e., a balanced state where the control quantity is kept at the target value.

According to the present invention, therefore, the algorithm of the processing of the sliding mode control process can be constructed without using the data of a rate of change of the difference between the control quantity and the target value thereof. As no data of a rate of change of the difference is necessary, the control quantity can be converged to the target value stably and accurately.

Data of the control quantity required to generate the command value for the manipulative quantity of the flow control valve may directly be detected by a suitable sensor, but may be predicted from other data. The control quantity may be an amount of intake air, a rotational speed, an output torque, etc. of the internal combustion engine.

The discrete-system model may comprise a model in which the control quantity in each control cycle is expressed by the control quantity and the command value for the manipulative quantity of the flow control valve in a control cycle prior to the control cycle. Thus, the discrete-system model of the object to be controlled can easily be constructed, and behaviors of the object to be controlled can accurately be expressed by the discrete-system model. Model parameters which define the actual behavioral characteristics of the discrete-system model, i.e., coefficients relatively to the control quantity of the discrete-system model and the command value for the control quantity of the flow control valve according to the invention, can be identified relatively easily by using a known identifying algorithm, e.g., an algorithm for identifying model parameters according to the method of least squares in order to minimize the difference or error between the control quantity in each control cycle generated on the discrete-system model and the actual control quantity (a detected or predicted value of the control quantity).

The sliding mode control process should preferably comprise an adaptive sliding mode control process.

It is important in the sliding mode control process to converge the value of the switching function stably to "0" for stably controlling the control quantity at the target value. The algorithm of a normal sliding mode control process is constructed on the basis of a reaching law for converging the value of the switching function stably to "0" and a control law (which is a control law for defining an equivalent control input in the sliding mode control process) for holding the value of the switching function stably to "0". According to the reaching law of the normal sliding mode control process, it is often difficult to converge the value of the switching function stably to "0" if the effect of disturbance is large. According to the adaptive sliding mode control process, in contrast to the normal sliding mode control process, a control law referred to as an adaptive law (adaptive algorithm) for eliminating the effect of disturbance as much as possible in order to converge the value of the switching function to "0" is used together with the reaching law to construct an algorithm of control processing.

The adaptive sliding mode control process used for the normal sliding mode control process according to the present invention makes it possible to converge the control quantity stably to the target value without being affected by disturbance.

The algorithm of the processing of the adaptive sliding mode control process is basically constructed on the basis of a reaching law for converging the value of the switching function stably to "0", an adaptive law (adaptive algorithm) for eliminating the effect of disturbance as much as possible in converging the value of the switching function to "0", and a control law for holding the value of the switching function stably to "0". An input to the object to be controlled which is generated by the algorithm, i.e., the command value for the control quantity of the flow control valve, is basically given as the sum of a component based on the reaching law, a component based on the adaptive law, and a component (referred to as an "equivalent control input") based on the control law for holding the value of the switching function stably to "0".

The equivalent control input based on the control law for holding the value of the switching function stably to "0" is basically composed of a feedback control component depending on the difference between the control quantity and the target value and a feed-forward control component corresponding to the target value of the control quantity.

According to the adaptive sliding mode control process using the adaptive law, the stability of the convergence of the value of the switching function to "0" is increased. Therefore, even if the feedback control component in the equivalent control input based on the control law for holding the value of the switching function stably to "0" is omitted, the stability of the convergence of the control quantity to the target value is not easily impaired.

With the adaptive sliding mode control process being used, the algorithm of the sliding mode control process determines a corrective quantity for the command value for the manipulative quantity of the flow control valve based on a reaching law and an adaptive law of the adaptive sliding mode control process, and corrects, with the determined corrective quantity, a reference control value for the manipulative quantity of the flow control valve determined depending on the target value for the control quantity for thereby determining the command value for the manipulative quantity of the flow control valve in each control cycle.

In this invention, the feedback control component of the equivalent control input is omitted, and the reference command value as the feed-forward control component of the equivalent control input is corrected by the corrective quantity as a component of the control input based on the reaching law and the adaptive law, for thereby determining the command value for the manipulative quantity of the flow control valve as an input to the object to be controlled.

Since the feedback control component of the equivalent control input is omitted, the process of generating the command value for the manipulative quantity of the flow control valve according to the adaptive sliding mode control process is simplified, and a calculation load for the generation of the command value can be reduced. For determining the feedback control component of the equivalent control input, the values of model parameters of the discrete-system model are necessarily required. However, by omitting the feedback control component, the effect of an actual error introduced by modeling the actual object to be controlled into the discrete-system model can be reduced, and the command value for the manipulative quantity of the flow control valve can be generated without using the values of model parameters.

Specifically, the corrective quantity for the command value for the manipulative quantity of the flow control valve is determined as the sum of a component based on the reaching law proportional to the value of the switching function and a component based on the adaptive law proportional to an integrated value of the value of the switching function in each control cycle.

As described above, the corrective quantity for the command value for the manipulative quantity of the flow control valve is determined as the sum of a component based on the reaching law proportional to the value of the switching function and a component based on the adaptive law proportional to an integrated value of the value of the switching function. The component based on the reaching law (a control input to be given to the object to be controlled based on the reaching law) and the component based on the adaptive law (a control input to be given to the object to be controlled based on the adaptive law) can be determined by simple calculations without using model parameters of the discrete-system model. By correcting the reference command value corresponding to the feed-forward control component of the equivalent control input with the corrective quantity, which is the sum of the components) for the command value for the manipulative quantity of the flow control valve, the value of the switching function can be converged stably to "0" while eliminating the effect of disturbance, and hence the control quantity can be controlled stably at the target value.

The sliding mode control process (including the adaptive sliding mode control process) is one of so-called response designating control processes, and is capable of directly and variably designating a rate of reduction of the difference (the degree of a time-dependent reduction of the difference to "0") with the values of coefficient parameters relative to the time-series data of the difference between the control quantity of the switching function and the target value.

For example, if a switching function $\sigma 1$ is defined by a linear function $\sigma 1 (k)=s1 \cdot Eq(k)+s2 \cdot Eq(k-1)$ (k is a control cycle number, and s1, s2 are coefficient parameters of the switching function $\sigma 1$) using two time-series data $Eq(k)$, $Eq(k-1)$ of the difference Eq between the control quantity and the target value, according to the equation (10) described later on, then when the switching function $\sigma 1$ is converged to "0", since $Eq(k)=(-s2/s1) \cdot Eq(k-1)$, the value of s2/s1 defines the rate of reduction of the difference Eq by establishing the values of the coefficient parameters s1, s2 in the range of $-1<s2/s1<1$. The rate of reduction of the difference Eq can be changed to a desired rate of reduction by varying the values of the coefficient parameters s1, s2 in the range of $-1<s2/s1<1$. Increasing and reducing the rate of reduction is equivalent to increasing and reducing the gain of the feedback control process according to the sliding mode control process.

For controlling the control quantity of the internal combustion engine at the target value, it is preferable in some situations to change, i.e., increase or reduce, the rate of reduction of the difference under certain circumstances in view of the stability of control and the stability of operating conditions of the internal combustion engine.

The apparatus may comprise means for variably establishing the value of a coefficient parameter relative to the time-series data of the difference between the control quantity of the switching function and the target value, depending on a predetermined condition.

With the above means, it is possible to increase or reduce the rate of reduction of the difference (the rate at which the control quantity is converged to the target value) for thereby increasing the stability of control and the stability of operating conditions of the internal combustion engine.

Specifically, the control quantity is converged to the target value according to the sliding mode control process immediately after the internal combustion engine has started to operate, and, at least in a predetermined period after the internal combustion engine has started to operate, the value of the coefficient parameter is established in order to make a rate of reduction of the difference lower than after elapse of the predetermined period.

Immediately after the internal combustion engine has started to operate, the combustion status of the internal combustion engine generally tends to be unstable. If the command value for the control quantity of the flow control valve is generated to quickly converge the control quantity to the target value according to the sliding mode control process under this condition, then in the case where the difference is relatively large, the command value is liable to fluctuate abruptly, and hence the amount of intake air introduced into the internal combustion engine is also liable to fluctuate abruptly. As a result, the combustion and emission statuses of the internal combustion engine tend to be impaired.

According to the present invention, therefore, at least in a predetermined period after the internal combustion engine has started to operate, the value of the coefficient parameter is established in order to make a rate of reduction of the difference lower than after elapse of the predetermined period. Consequently, the command value for the control quantity of the flow control valve generated according to the sliding mode control process is prevented from changing abruptly, and hence the amount of intake air introduced into the internal combustion engine is prevented from fluctuating abruptly. The combustion and emission statuses of the internal combustion engine are thus prevented from tending to be impaired, and the control quantity can be controlled at the target value while allowing the internal combustion engine to operate smoothly.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

An apparatus for controlling an internal combustion engine according to an embodiment of the present invention will be described below with reference to FIGS. 1 through 25.

Figure 1:
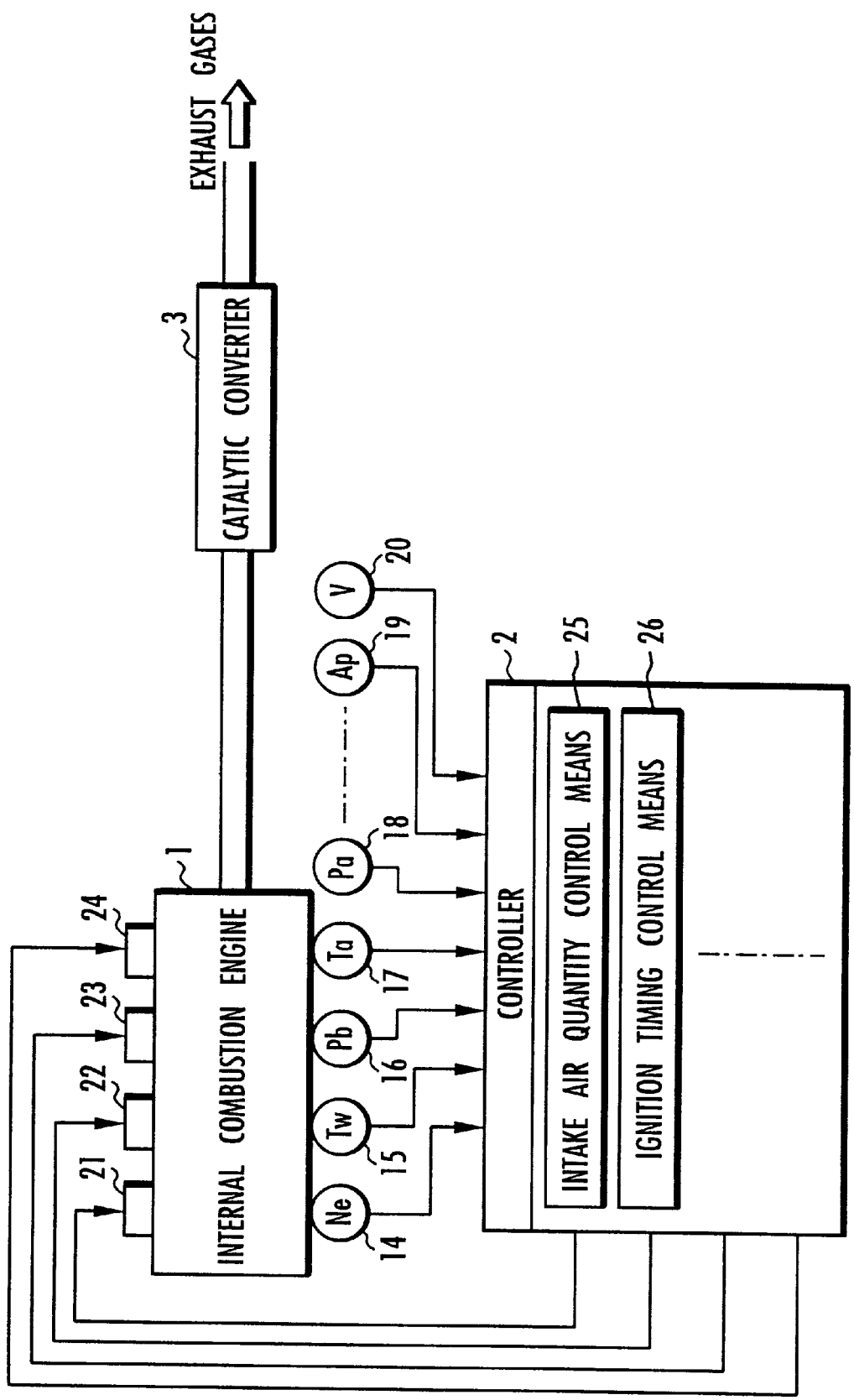
FIG. 1 is a block diagram of a control system for controlling an internal combustion engine according to the present invention.

FIG. 1 shows in block form a control system for controlling an internal combustion engine 1 according to the present invention. In FIG. 1, the control system includes a controller 2 for controlling operation of the internal combustion engine 1.

The internal combustion engine 1 is mounted as a propulsion source on a vehicle such as an automobile, a hybrid vehicle or the like (not shown). The internal combustion engine 1 burns a mixture of air and fuel and emits exhaust gases through a catalytic converter 3 comprising a three-way catalyst into the atmosphere.

Figure 2:
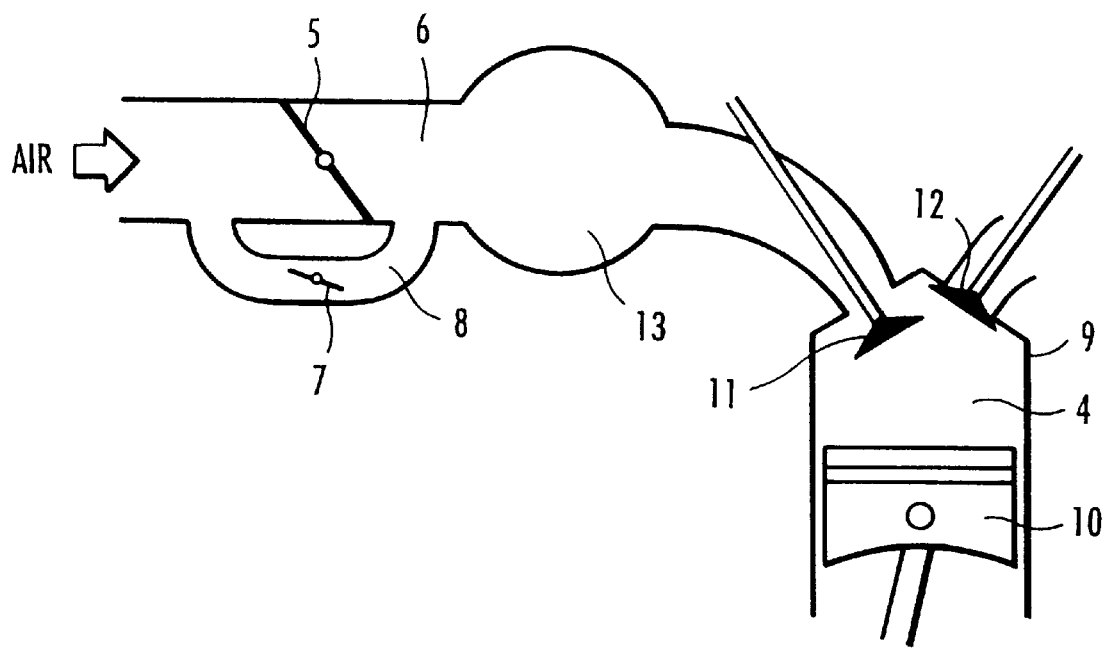
FIG. 2 is a schematic view of an intake system of the internal combustion engine controlled by the control system shown in FIG. 1.

FIG. 2 schematically shows an intake system of the internal combustion engine 1. As shown in FIG. 2, the internal combustion engine 1 has a combustion chamber 4 which can be supplied with air via a main intake passage 6 having a throttle valve 5 and a bypass passage 8 connected to the main intake passage 6 in bypassing relation to the throttle valve 5 and having a bypass valve 7. The internal combustion engine 1 also has a cylinder 9, a piston 10 reciprocally movable in the cylinder 9, intake and exhaust valves 11, 12 openably and closably mounted in the combustion chamber 4, and a chamber 13 in the main intake passage 6.

As shown in FIG. 1, the control system includes, as ancillary components for controlling operation of the internal combustion engine 1, a rotational speed sensor 14 for detecting a rotational speed Ne (actual rotational speed) of the internal combustion engine 1, an engine temperature sensor 15 for detecting an engine temperature Tw (e.g., a coolant temperature), an intake pressure sensor 16 for detecting an intake pressure Pb which is an internal pressure of the main intake passage 6 downstream of the throttle valve 5 and the bypass valve 7, i.e., an internal pressure of the chamber 13 shown in FIG. 2 in the illustrated embodiment, an atmospheric temperature sensor 17 for detecting an atmospheric temperature Ta, an atmospheric pressure sensor 18 for detecting an atmospheric pressure Pa, an accelerator sensor 19 for detecting a manipulated quantity Ap of the accelerator pedal of the vehicle (hereinafter referred to as an "accelerator manipulated quantity"), and a vehicle speed sensor 20 for detecting a speed V of the vehicle.

The internal combustion engine 1 has, as ancillary components for operating the internal combustion engine 1, an ignition unit 21 for igniting the air-fuel mixture in the combustion chamber 4, a fuel supply unit 22 for supplying a fuel into the combustion chamber 4, a throttle valve actuator 23 for operating the throttle valve 5, and a bypass valve actuator 24 for operating the bypass valve 7.

The vehicle also has a starter motor (not shown) for starting to operate the internal combustion engine 1, a power supply battery (not shown) for supplying electric energy to various electric devices on the vehicle, and a transmission, i.e., an automatic transmission in the illustrated embodiment, for transmitting drive power from the ancillary components for controlling operation of the internal combustion engine 1 to drive wheels of the vehicle.

The controller 2, which comprises a microcomputer, controls operation of the internal combustion engine 1 with the ignition unit 21, the fuel supply unit 22, the throttle valve actuator 23, and the bypass valve actuator 24 based on output data (detected values) from the sensors 14 through 20, a predetermined program, and preset data values.

The controller 2 has, as functional components, an intake air quantity control means 25 for controlling the quantity of intake air supplied to the combustion chamber 4 by controlling the opening of the throttle valve 5 or the bypass valve 7 through the throttle valve actuator 23 or the bypass valve actuator 24, and an ignition timing control means 26 for controlling the ignition timing of the internal combustion engine 1 through the ignition unit 21.

In the present embodiment, the bypass valve 7 and the bypass passage 8 correspond respectively to a flow control valve and an intake air passage, and the opening of the bypass valve 7 corresponds to a control quantity of the flow control valve. A control cycle (control period) which is controlled by the controller 2 is a crank angle period (so-called TDC).

Operation of the control system will be described below in combination with more specific functions of the intake air quantity control means 25 and the ignition timing control means 26.

Figure 3:
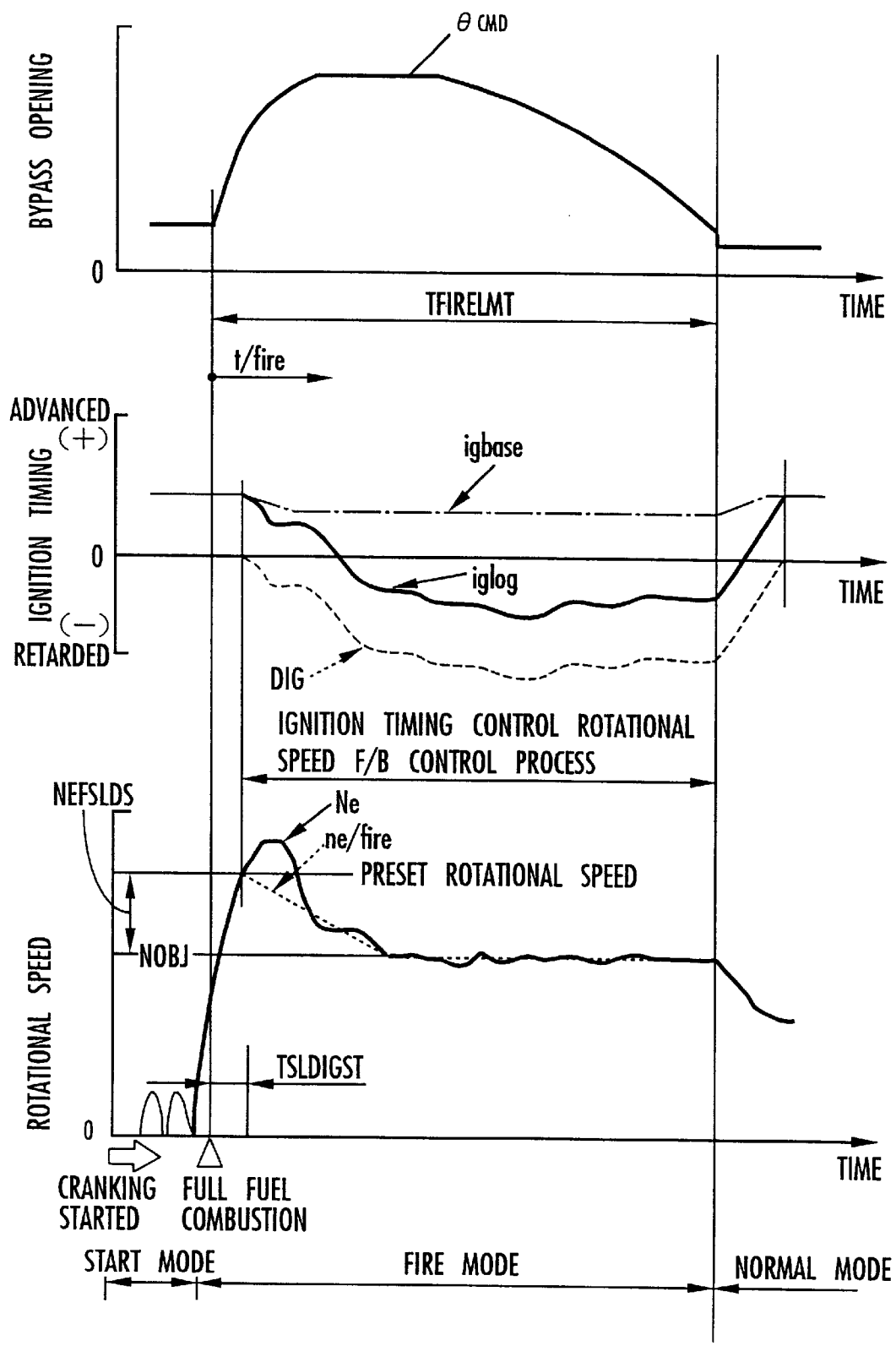
FIG. 3 is a diagram illustrative of a basic operation of the control system shown in FIG. 1.

First, a basic operation of the control system will briefly be described below with reference to FIG. 3. FIG. 3 shows, by way of example, time-dependent changes in the opening of the bypass valve 7 (hereinafter referred to as a "bypass opening"), the ignition timing, and the rotational speed respectively in upper, middle, and lower diagram sections, after the internal combustion engine 1 has started to operate until it operates in an idling mode.

In FIG. 3, when the control system is activated by pressing a start switch (not shown) while the internal combustion engine 1 is not in operation, the control system first enters an operation mode to start the internal combustion engine 1 (hereinafter referred to as a "start mode") by cranking the internal combustion engine 1 with a starter motor (not shown). In the start mode, the bypass opening and the ignition timing are controlled as shown, and the rotational speed Ne of the internal combustion engine 1 varies as shown.

In the control system, the opening of the throttle valve 5 while the internal combustion engine 1 is in operation is commensurate with the accelerator manipulated quantity Ap. When the accelerator pedal (not shown) is not depressed (Ap=0, at this time, the internal combustion engine 1 is idling while the vehicle is stopping), the opening of the throttle valve 5 is nil, i.e., the throttle valve 5 is closed. At this time, intake air is supplied to the combustion chamber 4 through only the bypass passage 8. FIG. 3 shows the operation of the internal combustion engine 1 when intake air is supplied to the combustion chamber 4 through only the bypass passage 8.

When a complete fuel combustion in the internal combustion engine 1 is confirmed in the start mode, the control system enters an operation mode (hereinafter referred to as a "FIRE mode") for quickly activating the catalytic converter 3 while the internal combustion engine 1 is idling.

In the FIRE mode, a command value θCMD for the bypass opening greater than in a normal idling mode, i.e., an idling mode other than the FIRE mode, is successively generated according to the pattern of time-dependent changes shown in the upper diagram section of FIG. 3, for example. The bypass opening is controlled by the bypass valve actuator 24 according to the generated command value θCMD for thereby making the amount of intake air introduced into the combustion chamber 4 greater than in the normal idling mode.

Basically, the control system operates in the FIRE mode until an elapsed time t/fire from the start of the FIRE mode (an elapsed time after the amount of intake air has started to increase, hereinafter referred to as a "FIRE elapsed time t/fire") reaches a predetermined limit time TFIRELMT (hereinafter referred to as a "FIRE mode limit time TFIRELMT").

The command value θCMD for the bypass opening in the FIRE mode is basically established so as to be able to supply exhaust gases having an amount of heat energy sufficient to increase the temperature of and activate the catalytic converter 3 within the FIRE mode limit time TFIRELMT (the amount of heat energy of the exhaust gases is essentially proportional to the amount of intake take introduced into the internal combustion engine 1). Furthermore, the command value θCMD for the bypass opening is established to operate the internal combustion engine 1 stably and smoothly in the idling mode while keeping the fuel combustion and emission of the internal combustion engine 1 in good conditions in the FIRE mode.

As the amount of intake air increases, i.e., the bypass opening increases, in the FIRE mode, the rotational speed Ne (actual rotational speed) of the internal combustion engine 1 immediately after the amount of intake air has started to increase rises according to the solid-line curve in the lower diagram section of FIG. 3. When the rotational speed Ne reaches a preset rotational speed (NOBJ+ NEFSLDS) which is higher than a predetermined idling rotational speed NOBJ (constant) to be finally maintained as an appropriate rotational speed in the FIRE mode, by a given value FEFSLDS, the ignition timing of the internal combustion engine 1 is controlled according to the solid-line curve in the middle diagram section of FIG. 3 so as to converge the rotational speed Ne to a target rotational speed ne/fire according to a feedback control process. This feedback control process will hereinafter be referred to as an "ignition timing control rotational speed F/B control process". The ignition timing control rotational speed F/B control process is also started when the FIRE elapsed time t/fire reaches a predetermined value TSLDIGST (see the lower diagram section of FIG. 3), as well as when the rotational speed Ne reaches the preset rotational speed (NOBJ+NEFSLDS).

In the ignition timing control rotational speed F/B control process, the target rotational speed ne/fire is established according to a pattern indicated by the broken line in the lower diagram section of FIG. 3. The target rotational speed ne/fire decreases from the preset rotational speed (NOBJ+ NEFSLDS) toward the idling rotational speed NOBJ at a predetermined downward gradient. After the target rotational speed ne/fire has reached the idling rotational speed NOBJ, the target rotational speed ne/fire is maintained at the idling rotational speed NOBJ. The idling rotational speed NOBJ is selected to be higher than the rotational speed in the normal idling mode.

In the ignition timing control rotational speed F/B control process, a corrective quantity DIG (this corrective quantity DIG is an ignition timing difference command value described later on) for the ignition timing as indicated by the broken line in the middle diagram section of FIG. 3 is determined according to a feedback control process so as to converge the rotational speed Ne (actual rotational speed) of the internal combustion engine 1 to the target rotational speed ne/fire thus established. Then, a basic command value igbase (indicated by the dot-and-dash line in the middle diagram section of FIG. 3) for the ignition timing is corrected by the corrective quantity DIG to determine a command value iglog for the ignition timing. The basic command value igbase for the ignition timing corresponds to a command value for the ignition timing in a normal operation mode of the internal combustion engine 1 (an operation mode other than the FIRE mode), and represents an advanced value.

In the ignition timing control rotational speed F/B control process, the ignition timing of the internal combustion engine 1 is controlled by the ignition unit 21 according to the command value iglog which has been produced by correcting the basic command value igbase for thereby converging the rotational speed Ne of the internal combustion engine 1 to the target rotational speed ne/fire (finally to the idling rotational speed NOBJ) according to the feedback control process.

At this time, the rotational speed Ne of the internal combustion engine 1 tends to be higher than the target rotational speed ne/fire because of the increased amount of intake air described above. Therefore, the corrective quantity DIG determined by the ignition timing control rotational speed F/B control process corrects the ignition timing so as to be retarded from the basic command value igbase. Consequently, the ignition timing iglog produced by correcting the basic command value igbase with the corrective quantity DIG ($\leq 0$) is of a retarded value as indicated by the solid line in the middle diagram section of FIG. 3.

As described above, in the FIRE mode performed when the internal combustion engine 1 idles initially after it has started to operate, the rotational speed NE of the internal combustion engine 1 is controlled to reach the target rotational speed ne/fire (finally the idling rotational speed NOBJ) by increasing the amount of intake air with the controlled bypass opening and retarding the ignition timing according to the ignition timing control rotational speed F/B control process, while the amount of heat energy of the exhaust gases emitted from the internal combustion engine 1 when the air-fuel mixture is burned in the combustion chamber 4 is made greater than in the normal idling mode. When the exhaust gases with the increased amount of heat energy are supplied to the catalytic converter 3, the catalytic converter 3 is increased in temperature and activated quickly, and hence can quickly provide a desired exhaust gas purification capability.

The FIRE mode for increasing the amount of intake air and performing the ignition timing control rotational speed F/B control process is continuously carried out until the FIRE elapsed time t/fire reaches the FIRE mode limit time TFIRELMT, except when the accelerator pedal of the vehicle is depressed while in the FIRE mode. Subsequently, the control system enters the normal operation mode of the internal combustion engine 1. In the normal operation mode, the bypass opening is controlled at an opening (<the bypass opening in the FIRE mode, see a right-hand portion of the upper diagram section of FIG. 3) for operating the internal combustion engine 1 in the normal idling mode, for example. After the end of the FIRE mode, the ignition timing of the internal combustion engine 1 is gradually returned to a normal advanced ignition timing determined by the basic command value igbase, as shows in a right-hand portion of the middle diagram section of FIG. 3.

When the accelerator pedal is depressed to start moving the vehicle or race the internal combustion engine 1 during the FIRE mode (before the FIRE elapsed time t/fire reaches the FIRE mode limit time TFIRELMT), so that the internal combustion engine 1 operates in a mode other than the idling mode, the control system interrupts the FIRE mode.

When the control system interrupts the FIRE mode, the amount of intake air is continuously increased by controlling the bypass opening in order to reliably increase the temperature of and activate the catalytic converter 3. However, in order to achieve a desired power output capability of the internal combustion engine 1, the ignition timing is returned to the normal advanced ignition timing determined by the basic command value igbase (the ignition timing control rotational speed F/B control process is interrupted). If the internal combustion engine 1 is to be operated in the idling mode again within the FIRE mode limit time TFIRELMT, the ignition timing control rotational speed F/B control process is resumed. Therefore, the interruption of the FIRE mode is basically equivalent to the interruption of the ignition timing control rotational speed F/B control process. A partial control process for increasing the amount of intake air by controlling the bypass opening is also interrupted.

The basic operation of the control system according to the present embodiment has been described above.

Details of the operation of the control system in view of the basic operation thereof will be described below.

Figure 4:
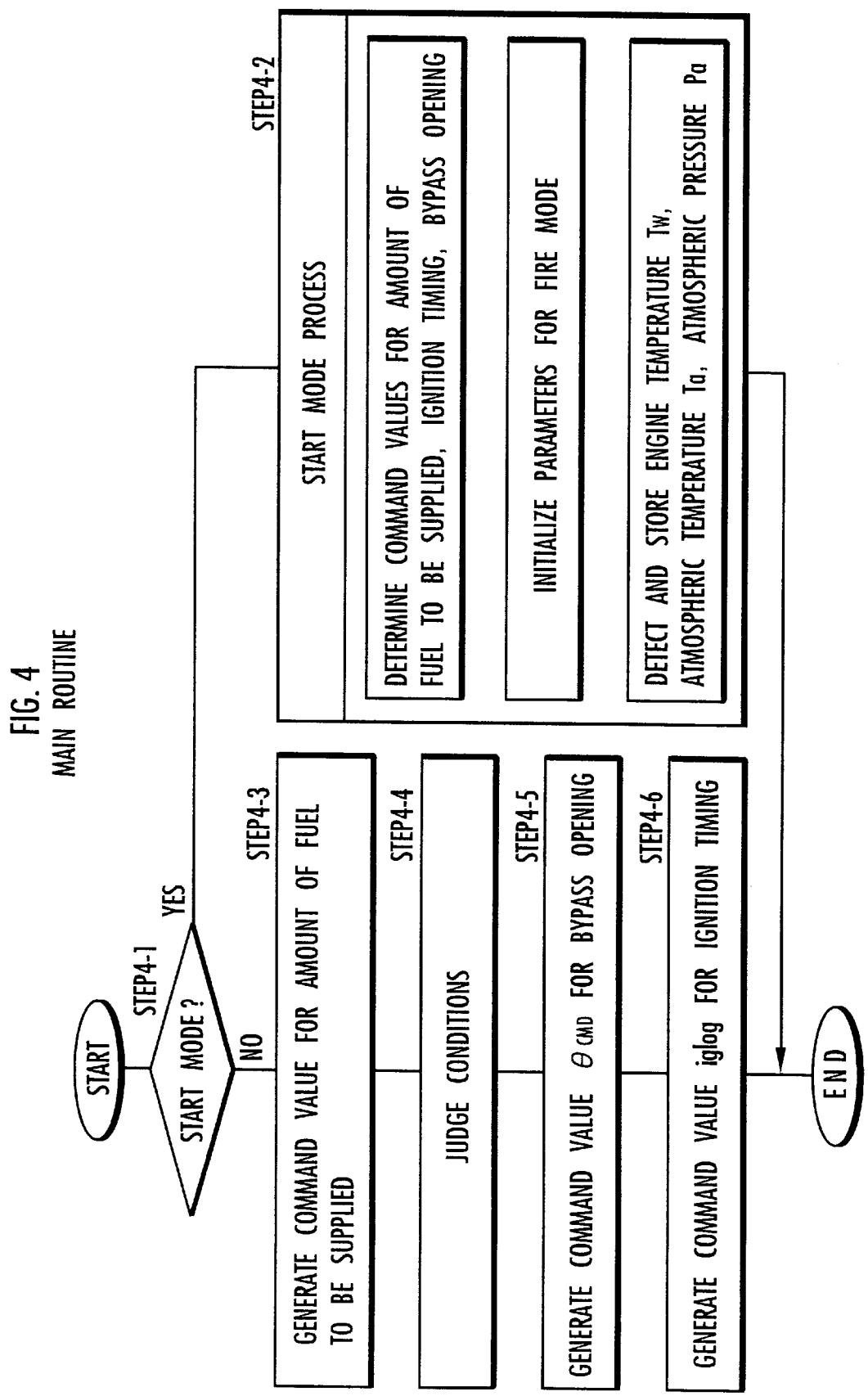
FIG. 4 is a flowchart of a main routine of the control system shown in FIG. 1.

When the control system is activated while the internal combustion engine 1 is not operating, the controller 2 executes a main routine shown in FIG. 4 in predetermined control cycles, i.e., crank angle periods (TDC).

First, the controller 2 determines whether the operation mode of the control system is the start mode or not in STEP4-1. Specifically, the controller 2 determines whether a complete fuel combustion in the internal combustion engine 1 is confirmed or not. The operation mode of the control system is the start mode after the control system is activated until the complete fuel combustion is confirmed. The complete fuel combustion is confirmed on the basis of an output signal from the rotational speed sensor 14, i.e., a detected value of the rotational speed Ne.

If the operation mode of the control system is the start mode in STEP4-1, then the controller 2 executes a start mode process for starting the internal combustion engine 1 in each control cycle in STEP4-2.

In the start mode process, the controller 2 determines command values for the ignition timing, the amount of fuel to be supplied, and the bypass opening, which are suitable for starting the internal combustion engine 1, based on output signals (detected values) of the sensors 14 through 20, predetermined maps, and equations. According to the determined command values, the controller 2 operates the ignition unit 21, the fuel supply unit 22, and the bypass valve actuator 24 to control the ignition timing, the amount of fuel to be supplied, and the bypass opening, while at the same time energizing the starter motor (not shown) to crank the internal combustion engine 1 thereby to start the internal combustion engine 1.

In the start mode process, the controller 2 initializes various parameters (described later on) such as flags to be used in a control process of the FIRE mode.

In the start mode process, furthermore, an engine temperature Tw, an atmospheric temperature Ta, and an atmospheric pressure Pa at the time the internal combustion engine 1 is started are detected respectively by the engine temperature sensor 15, the atmospheric temperature sensor 17, and the atmospheric pressure sensor 18, and stored in a memory (not shown).

If the operation mode of the control system is not the start mode in STEP4-1, i.e., if a complete fuel combustion in the internal combustion engine 1 is confirmed, then the controller 2 generates a command value for the amount of fuel to be supplied to the internal combustion engine 1 in each control cycle in STEP4-3. Then, the controller 2 judges conditions to determine whether the control process of the FIRE mode is to be carried out or not, i.e., whether the operation mode is to be set to the FIRE mode or the normal mode, in STEP4-4. Thereafter, the intake air quantity control means 25 generates a command value θCMD for the bypass opening in STEP4-5. The ignition timing control means 26 generates a command value iglog for the ignition timing of the internal combustion engine 1 in STEP4-6.

The controller 2 generates a command value for the amount of fuel to be supplied to the internal combustion engine 1 in STEP4-3 as follows: First, the controller 2 determines a basic amount of fuel to be supplied based on a predetermined map from the rotational speed Ne (actual rotational speed) of the internal combustion engine 1 detected by the rotational speed sensor 14 and the intake pressure Pb of the internal combustion engine 1 detected by the intake pressure sensor 16. The controller 2 then corrects the basic amount of fuel to be supplied depending on the engine temperature Tw and the atmospheric temperature Ta detected respectively by the engine temperature sensor 15 and the atmospheric temperature sensor 17, thereby generating the command value for the amount of fuel to be supplied to the internal combustion engine 1 in a manner to be commensurate with the amount of intake air introduced into the combustion chamber 4 of the internal combustion engine 1.

The generated command value for the amount of fuel to be supplied is given from the controller 2 to the fuel supply unit 22 in each control cycle, and the fuel supply unit 22 supplies an amount of fuel to the internal combustion engine 1 according to the given command value.

Figure 5:
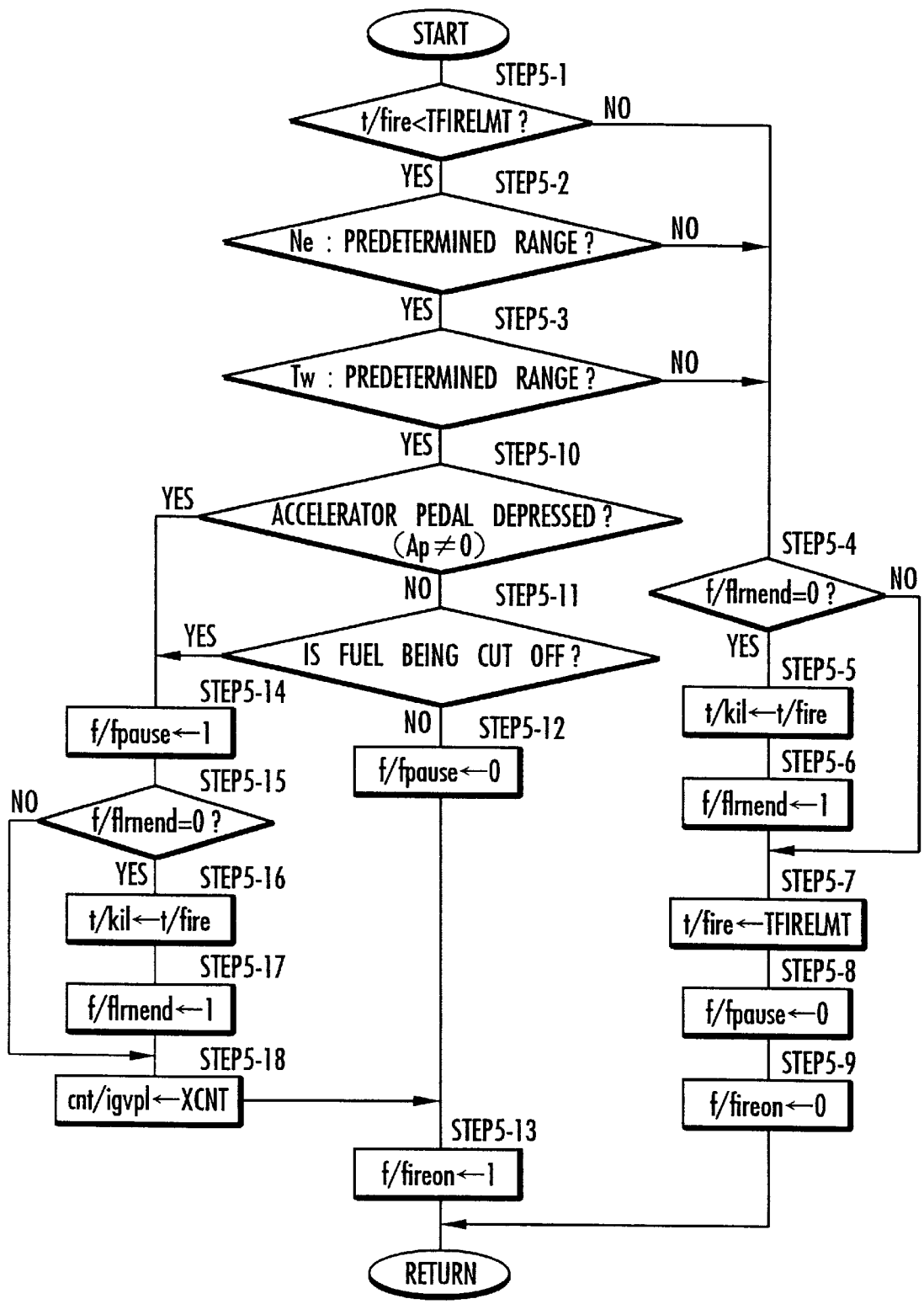
FIG. 5 is a flowchart of the processing sequence of a step in the main routine shown in FIG. 4.

In STEP4-4, conditions are judged according to a processing sequence shown in FIG. 5.

As shown in FIG. 5, the controller 2 determines whether the present FIRE elapsed time t/fire is within the FIRE mode limit time TFIRELMT (t/fire<TFIRELMT) or not in STEP5-1, whether the present rotational speed Ne detected by the rotational speed sensor 14 is within a predetermined normal range or not in STEP5-2, and whether the engine temperature Tw detected by the engine temperature sensor 15 is within a predetermined normal range or not in STEP5-3. The FIRE elapsed time t/fire determined in STEP5-1 is initialized to "0" in the start mode process in STEP4-2, and starts being measured from the time the start mode is ended (a control cycle in which a complete fuel combustion in the internal combustion engine 1 is confirmed).

If the conditions in STEPs 5-1 through 5-3 are not satisfied, i.e., if the present FIRE elapsed time t/fire has reached the FIRE mode limit time TFIRELMT, the present rotational speed Ne is abnormally high or low, or the temperature Tw is abnormally high or low, then the controller 2 determines whether a learning calculation process, to be described later on, i.e., a process of calculating a basic learning corrective coefficient vpskisld, to be described later on, is to be ended by judging a flag f/flrnend (hereinafter referred to as a "learning calculation end flag f/flrnend") which is "1" when the learning calculation process is to be ended and "0" when the learning calculation process is not to be ended, in STEP5-4. If f/flrnend=0, then the controller 2 holds the value of the present FIRE elapsed time t/fire as the value of a parameter t/kil in STEP5-5, and sets the learning calculation end flag f/flrnend to "1" in STEP5-6. The parameter t/kil serves to represent the FIRE elapsed time t/fire at the time the process of calculating the basic learning corrective coefficient vpskisld is finished. The parameter t/kil will hereinafter be referred to as a "learning end time parameter t/kil".

The learning calculation end flag f/flrnend and the learning end time parameter t/kil are initialized to "0" in the start mode process in STEP4-2.

Then, the controller 2 forcibly fixes the value of the FIRE elapsed time t/fire to the FIRE mode limit time TFIRELMT in STEP5-7, and sets a flag f/fpause, which is "1" when the FIRE mode is to be interrupted and "0" when the FIRE mode is not to be interrupted (hereinafter referred to as a "FIRE interruption flag f/fpause"), and a flag f/fireon, which is "1" when the FIRE mode is to be executed and "0" when the FIRE mode is not to be executed (hereinafter referred to as a "FIRE mode execution on/off flag f/fireon"), to "0" in STEPs 5-8, 5-9. Thereafter, control returns to the main routine shown in FIG. 4. If the FIRE mode is not to be executed (f/fireon=0), then it means that the control system is to be operated in the normal mode.

If the conditions in STEPs 5-1 through 5-3 are satisfied, then the controller 2 determines whether the accelerator pedal of the vehicle is depressed or not based on an output signal from the accelerator sensor 19 (the manipulated quantity Ap of the accelerator pedal) in STEP5-10, and determines whether the internal combustion engine 1 is in a fuel cutting process or not in STEP5-11. The fuel cutting process is a process in which the supply of fuel to the internal combustion engine 1 is cut off while the vehicle is being decelerated. When the accelerator pedal of the vehicle is depressed, the controller 2 controls the throttle valve actuator 23 to adjust the opening of the throttle valve 5 to an opening commensurate with the manipulated quantity:Ap.

If neither one of the conditions in STEPs 5-10, 5-11 is satisfied, then the internal combustion engine 1 is basically to operate in the idling mode. In this case, the controller 2 sets the FIRE interruption flag f/fpause to "0" in STEP5-12. Then, the controller 2 sets the FIRE mode execution on/off flag f/fireon to "1" in STEP5-13. Thereafter, control returns to the main routine shown in FIG. 4.

If either one of the conditions in STEPs 5-10, 5-11 is satisfied, then the controller 2 sets the FIRE interruption flag f/fpause to "1" in order to interrupt the FIRE mode in STEP5-14, and determines the value of the learning calculation end flag f/flrnend in STEP5-15. Only if f/flrnend=0, the controller 2 holds the present value of the FIRE elapsed time t/fire as the value of the learning end time parameter t/kil in STEP5-16, and sets the learning calculation end flag f/flrnend to "1" in STEP5-17.

Then, the controller 2 sets a count-down timer cnt/igvpl used in a process of controlling the ignition timing after the interruption of the FIRE mode is finished, to be described later on), to a predetermined initial value to be described later on), to a predetermined initial value XCNT in STEP5-18. Thereafter, control executes STEP5-13 and returns to the main routine shown in FIG. 4.

The status in which either one of the conditions in STEPs 5-10, 5-11 is satisfied, i.e., the status in which the FIRE interruption flag f/fpause to "1" in order to interrupt the FIRE mode, is basically a status in which the accelerator pedal of the vehicle is depressed to start or run the vehicle within the FIRE interruption flag f/fpause, i.e., a status in which the internal combustion engine 1 is actuating it load, or a status in which the internal combustion engine 1 is racing. However, when the vehicle is started within the FIRE interruption flag f/fpause and thereafter decelerated, there may be an occasion in which neither one of the conditions in STEPs 5-10, 5-11 is satisfied. The status in which the FIRE mode is interrupted is more accurately a status in which the internal combustion engine 1 operates in a mode other than the idling mode while the air-fuel mixture is combusted therein.

In the process of judging conditions in STEP4-4 as described above, after the internal combustion engine 1 has started (after the start mode is finished), insofar as the rotational speed Ne and the engine temperature Tw are in an appropriate range, the operation mode of the control system is set to the FIRE mode (f/fireon=1) until the FIRE elapsed time t/fire reaches the FIRE mode limit time TFIRELMT. In the FIRE mode, the amount of intake air is increased by controlling the bypass opening and the ignition timing control rotational speed F/B control process is carried out parallel to each other, except when the FIRE mode is interrupted.

If the rotational speed Ne or the engine temperature Tw is abnormally high or low for some reason, the operation mode of the control system is set to the normal mode immediately after the internal combustion engine 1 has started or the FIRE mode is canceled (ended) and operation mode is set to the normal mode (f/fireon=0). In the normal mode, the bypass opening and the ignition timing are controlled at values for operating the internal combustion engine 1 normally, i.e., in a mode other than the FIRE mode. When the operation mode is set to the normal mode, since the controller 2 forcibly fixes the value of the FIRE elapsed time t/fire to the FIRE mode limit time TFIRELMT in STEP5-7, the condition in STEP5-1 will not subsequently be satisfied until the internal combustion engine 1 is started again (the FIRE elapsed time t/fire is initialized only in the start mode). Therefore, the operation mode is set to the FIRE mode only until the FIRE mode limit time TFIRELMT elapses after the internal combustion engine 1 has started.

If the vehicle is run by depressing the accelerator pedal or the internal combustion engine 1 races while the operation mode is being set to the FIRE mode (f/fireon=1), i.e., if the internal combustion engine 1 is to operated in a mode other than the idling mode (either one of the conditions in STEPs 5-10, 5-11 is satisfied), then the FIRE interruption flag f/fpause is set to "1". In this case, the FIRE mode is interrupted, i.e., whereas the amount of intake air is increased by controlling the bypass opening, the ignition timing control rotational speed F/B control process is performed. If neither one of the conditions in STEPs 5-10, 5-11 is satisfied and the FIRE interruption flag f/fpause is reset to "0" while the operation mode is the FIRE mode and interrupted (f/fireon=1 and f/fpause=1) (this is basically a case for resuming the idling mode), then the interruption of the FIRE mode is canceled, and the ignition timing control rotational speed F/B control process is resumed.

If the FIRE mode is interrupted by depressing the accelerator pedal (the condition in STEP5-10 is satisfied), then the opening of the throttle valve 5 is made commensurate with the manipulated quantity Ap of the accelerator pedal (>0). In this case, therefore, the combustion chamber 4 of the internal combustion engine 1 is supplied with intake air via both the bypass valve 7 and the throttle valve 5.

Although not employed in the present embodiment, the operation mode of the control system may not be set to the FIRE mode until a slight time elapses after the start mode is ended.

A process of generating a command value θCMD for the bypass opening in STEP4-5 shown in FIG. 4 will be described below.

Prior to describing specific details of this process, a basic concept of the process will first be described below.

In the control system, major processes that the intake air quantity control means 25 carries out for generating a command value θCMD for the bypass opening in the FIRE mode include a process (hereinafter referred to as a "standard opening command value generating process") of generating a standard command value θ0 for the bypass opening (hereinafter referred to as a "standard opening command value θ0"), a process (hereinafter referred to as a "amount-of-intake-air F/B control correcting process") of correcting a command value for the bypass opening according to a feedback control process in order to converge an accumulated value of the actual amount of intake air introduced into the combustion chamber 4 to a predetermined target value, a process (hereinafter referred to as a "learning correcting process") of learning a corrective quantity for the command value for the bypass opening according to the amount-of-intake-air F/B control correcting process each time the FIRE mode is performed, and correcting the command value for the bypass opening based on the learned corrective quantity, a process (hereinafter referred to as an "atmospheric condition correcting process") of correcting the command value for the bypass opening depending on the atmospheric pressure Pa and the atmospheric temperature Ta detected respectively by the atmospheric pressure sensor 18 and the atmospheric temperature sensor 17, and a process (hereinafter referred to as an "ignition-timing-dependent correcting process") of correcting the command value for the bypass opening depending on the ignition timing controlled by the ignition timing control rotational speed F/B control process. Basic concepts of these processes will be described below.

First, the standard opening command value generating process is described below.

In the control system according to the embodiment, the amount of intake air is increased in the FIRE mode primarily for the purpose of quickly increasing the temperature of and activating the catalytic converter 3. It is necessary to increase the amount of intake air so as to be able to supply the catalytic converter 3 with exhaust gases having an amount of heat energy (the amount of heat energy of the exhaust gases is essentially proportional to the amount of intake air introduced into the combustion chamber 4) which is capable of reliably increasing the temperature of and activating the catalytic converter 3 within the FIRE mode limit time TFIRELMT.

The amount of intake air starts to be increased immediately after the internal combustion engine 1 has started, and while the ignition timing is being controlled so as to be retarded from the normal ignition timing by the ignition timing control rotational speed F/B control process. If a pattern of time-dependent changes in the increase of the amount of intake air is inappropriate, then the combustion and emission statuses of the internal combustion engine 1 may be impaired. Therefore, the amount of intake air needs to be increased in the FIRE mode in order to operate the internal combustion engine 1 stably and smoothly without impairing combustion and emission statuses of the internal combustion engine 1 in the FIRE mode.

The standard opening command value generating process generates the standard opening command value θ0, which serves as a basis for the command value for the bypass opening to be given to the bypass valve actuator 24 for increasing the amount of intake air, in a feed-forward manner in each control cycle (TDC) depending on the engine temperature Tw and the FIRE elapsed time t/fire when the internal combustion engine 1 starts (in the start mode).

The standard opening command value generating process is carried out as follows:

When the internal combustion engine 1 starts (in the start mode), a basic value i/ftbl of the standard opening command value θ0, which is a maximum value of the standard opening command value θ0 while the control system is operating in the FIRE mode, is determined on the basis of a predetermined data table from the engine temperature Tw detected by the engine temperature sensor 15.

In this embodiment, the basic value i/ftbl when the shifted position of the shift lever of the automatic transmission (not shown) of the vehicle is in a N (neutral) range in the FIRE mode is different from the basic value i/ftbl when the shifted position of the shift lever of the automatic transmission (not shown) of the vehicle is in a D (drive) range in the FIRE mode.

Specifically, when the shifted position of the automatic transmission is in the N range, a value ifiret (hereinafter referred to as an "N range basic value ifiret") determined according to a data table indicated by the solid line a in FIG. 6 from the engine temperature Tw at the start of the internal combustion engine 1, is determined as the basic value i/ftbl of the standard opening command value θ0.

Figure 6:
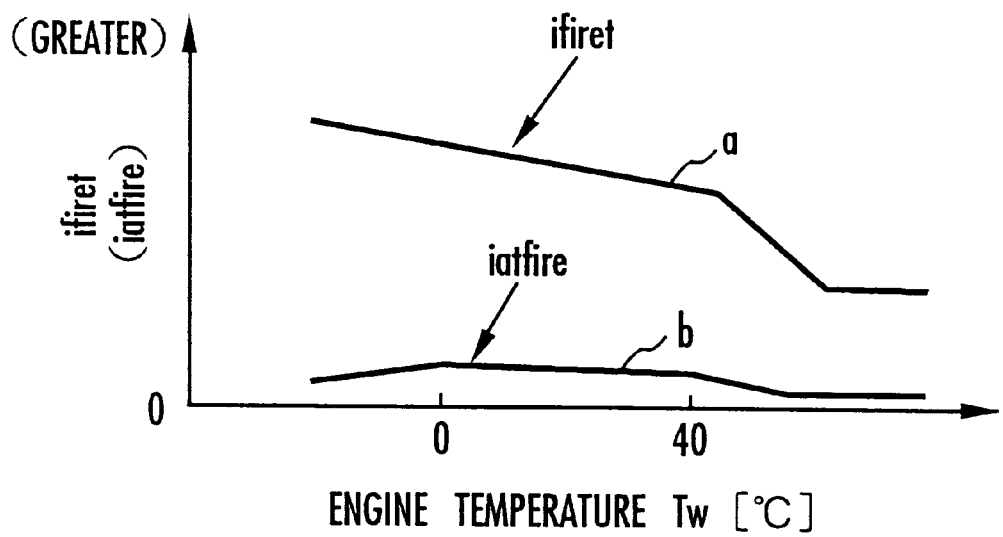
FIG. 6 is a diagram illustrative of an operation of the control system shown in FIG. 1.

The data table indicated by the solid line a in FIG. 6 is basically established such that as the engine temperature Tw is higher, the N range basic value ifiret is lower. This is because the engine temperature Tw at the start of the internal combustion engine 1 corresponds to the initial temperature of the catalytic converter 3, and as the engine temperature Tw is higher, the amount of heat energy required to increase the temperature of and activate the catalytic converter 3 as desired, i.e., the amount of intake air introduced into the internal combustion engine 1, may be smaller.

When the shifted position of the automatic transmission is in the D range, a value which is the sum of a value iatfire (hereinafter referred to as an "D range corrective value iatfire") determined according to a data table indicated by the solid line b in FIG. 6 from the engine temperature Tw at the start of the internal combustion engine 1, and the N range basic value ifiret is determined as the basic value i/ftbl (=ifiret+iatfire) of the standard opening command value θ0.

The data table indicated by the solid line b in FIG. 6 is basically established such that at an arbitrary engine temperature Tw at the start of the internal combustion engine 1, the basic value fitbl in the D range is set so as to be slightly higher than the N range basic value ifiret. This is because in the D range, a load for absorbing the drive power of the internal combustion engine 1 is greater than in the N range, resulting in a reduction in the rotational speed of the internal combustion engine 1, and the amount of heat energy of the exhaust gases is smaller than in the N range.

In the present embodiment, the engine temperature Tw at the start of the internal combustion engine 1 is used as corresponding to the initial temperature of the catalytic converter 3, i.e., the temperature of the catalytic converter 3 at the start of the internal combustion engine 1. When the internal combustion engine 1 starts to operate, the initial temperature of the catalytic converter 3 may directly be detected, and the basic value i/ftbl of the standard opening command value θ0 may be determined from the detected temperature in the same manner as described above.

In this embodiment, since the vehicle has the automatic transmission, the different basic values i/ftbl are used respectively in the N range and the D range. If a manual transmission is employed in the vehicle, no such different basic values i/ftbl may be used, but a single basic value i/ftbl may be used depending on the engine temperature Tw at the start of the internal combustion engine 1 or the initial temperature of the catalytic converter 3 in the same manner as described above.

The basic value i/ftbl of the standard opening command value θ0 is determined as described above. In the standard opening command value generating process, furthermore, a corrective coefficient km/fire ($\leq 1$) for correcting (by multiplication) the basic value i/ftbl is determined in each control cycle according to a predetermined data table (time table) shown in FIG. 7 from the FIRE elapsed time t/fire. A value produced when the basic value i/ftbl is multiplied by the corrective coefficient km/fire is determined as the standard opening command value θ0 (=i/ftbl·km/fire).

Figure 7:
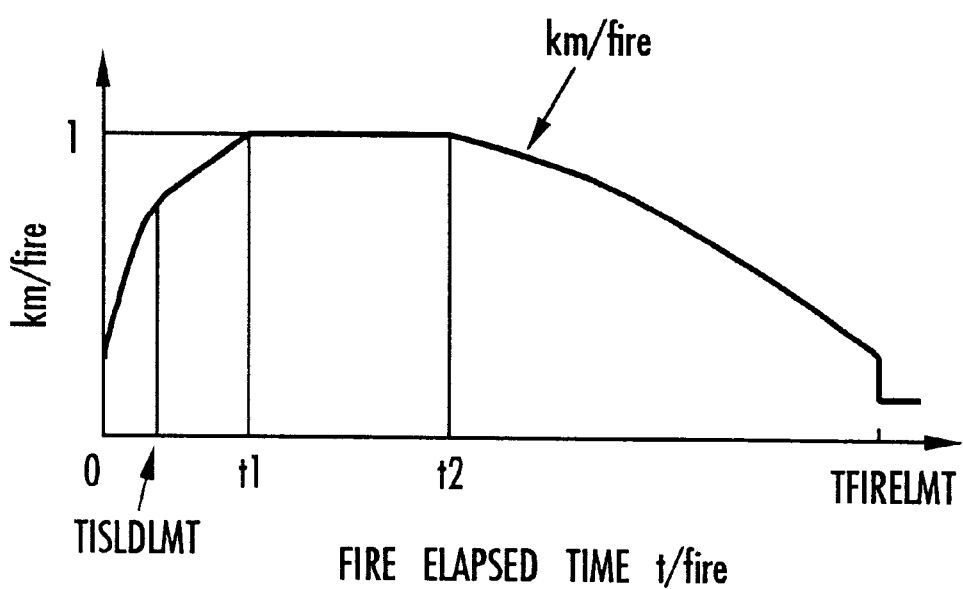
FIG. 7 is a diagram illustrative of an operation of the control system shown in FIG. 1.

In the data table shown in FIG. 7, during an initial stage (t/fire: 0–t1) of the FIRE mode, the corrective coefficient km/fire is gradually increased to "1" in order to increase the standard opening command value θ0 gradually toward the basic value i/ftbl. Then, after the standard opening command value θ0 has reached the basic value i/ftbl (after the corrective coefficient km/fire has reached "1"), the corrective coefficient km/fire is set to "1" so as to maintain the standard opening command value θ0 at the basic value i/ftbl for a predetermined time (t/fire: t1–t2). Thereafter (t/fire: t2–TFIRELMT), the corrective coefficient km/fire is gradually reduced in order to gradually reduce the standard opening command value θ0. The standard opening command value θ0 is gradually reduced for the following reason:

When the internal combustion engine 1 is warmed up to a certain extent, the friction of various components of the internal combustion engine 1 is gradually reduced, and the rotational speed Ne of the internal combustion engine 1 tends to increase. As a result, the ignition timing controlled by the ignition timing control rotational speed F/B control process becomes more retarded. At this time, when the ignition timing of the internal combustion engine 1 reaches a retarded limit value at which the ignition timing can be controlled while the internal combustion engine 1 is operating normally, it is no longer possible to suppress the increasing tendency of the rotational speed Ne of the internal combustion engine 1. To protect the rotational speed Ne against being unduly increased, after the FIRE elapsed time t/fire has reached the preset time t2 and the FIRE mode has proceeded to a certain extent, i.e., after the internal combustion engine 1 has been warmed up to a certain extent, the standard opening command value θ0 (the amount of intake air introduced into the internal combustion engine 1) is gradually reduced for thereby preventing the rotational speed Ne from tending to increase due to the reduced friction.

The details of the standard opening command value generating process have been described above.

In the control system, basically, the bypass opening is controlled according to the standard opening command value θ0 that is generated in a feed-forward fashion for thereby operating the internal combustion engine 1 stably and appropriately increasing the temperature of and activating the catalytic converter 3 as desired.

The amount-of-intake-air F/B control correcting process and the atmospheric condition correcting process will be described below.

The standard opening command value θ0 determined by the standard opening command value generating process is determined uniquely in a certain reference correlation of the actual opening of the bypass valve 7 and the actual amount of intake air introduced into the combustion chamber 4 to the command value for the bypass opening given to the bypass valve actuator 24, and is determined under ideal conditions that the atmospheric pressure Pa is a standard atmospheric pressure, e.g., one atmospheric pressure and the atmospheric temperature Ta is a standard atmospheric pressure, e.g., a normal temperature of 25° C.

The actual opening of the bypass valve 7 or the actual amount of intake air with respect to the command value for the bypass opening are liable to vary due to variations of the operating characteristics or time-dependent characteristic changes of the bypass valve actuator 24 and the bypass valve 7 (such variations in the amount of intake air will hereinafter be referred to as "variations due to structural factors").

Even in the absence of such variations due to structural factors, the actual amount of intake air with respect to the command value for the bypass opening varies depending on the atmospheric pressure Pa. The actual amount of intake air with respect to the command value θCMD for the bypass opening also varies depending on the atmospheric temperature Ta though the atmospheric temperature Ta is less influential than the atmospheric pressure Pa (such variations in the amount of intake air depending on the atmospheric pressure Pa and the atmospheric temperature Ta will hereinafter be referred to as "variations due to atmospheric conditions).

Thus, when the command value for the bypass opening is constant (the bypass opening is constant), the actual amount of intake air is smaller as the atmospheric pressure Pa is lower, and since the atmospheric density is smaller as the atmospheric temperature Ta is higher, the actual amount of intake air (the mass of intake air) is smaller as the atmospheric temperature Ta is higher.

When the amount of intake air varies, the amount of heat energy (which is essentially proportional to the amount of intake air) of the exhaust gases emitted by the internal combustion engine 1 also varies, and hence the pattern of the temperature increase of the catalytic converter 3 also varies. In some cases, therefore, the catalytic converter 3 cannot reliably be increased in temperature and activated quickly by increasing the amount of intake air in the FIRE mode, and the catalytic converter 3 cannot have a desired purification capability in the FIRE mode.

The amount-of-intake-air F/B control correcting process and the atmospheric condition correcting process serve to eliminate the above drawbacks. The amount-of-intake-air F/B control correcting process is a process for compensating for variations due to structural factors, and the atmospheric condition correcting process is a process for compensating for variations due to atmospheric conditions.

The amount-of-intake-air F/B control correcting process for compensating for variations due to structural factors will first be described below.

The amount-of-intake-air F/B control correcting process has the following basic concept: Amount-of-heat-energy data representing the amount of heat energy actually given to the catalytic converter 3 by the exhaust gases from the internal combustion engine 1 is detected or predicted successively in each control cycle in the FIRE mode. The command value for the bypass opening is corrected according to a feedback control process in order to converge the value of the amount-of-heat-energy data to a predetermined target value (corresponding to a target amount of heat energy to be applied to the catalytic converter 3). Based on the corrected command value, the bypass opening is controlled to equalize the actual amount of heat energy applied to the catalytic converter 3 to a target amount of heat energy corresponding to the target value for the amount-of-heat-energy data. In this manner, variations in the pattern of the temperature increase of the catalytic converter are eliminated.

The amount-of-heat-energy data representing the amount of heat energy actually given to the catalytic converter 3 may be represented, for example, by an amount of intake air or an amount of supplied fuel (which is basically proportional to the amount of heat energy given to the catalytic converter 3 in each control cycle (at an instantaneous point)) in each control cycle (at an instantaneous point), or their integrated value (which is proportional to an integrated value of the amount of heat energy at instantaneous points given to the catalytic converter 3), or an increase in the temperature of the catalytic converter 3 (which is proportional to an integrated value of the amount of heat energy at instantaneous points given to the catalytic converter 3 by the temperature increase from the initial temperature of the catalytic converter 3).

In this embodiment, the integrated value of the amount of intake air is used as the amount-of-heat-energy data. The integrated value of the actual amount of intake air introduced into the internal combustion engine 1 in the FIRE mode is predicted, and a target value for the integrated value is established in each control cycle as follows:

With respect to the estimation of the integrated value of the amount of intake air, an amount of intake air introduced into the combustion chamber 1 per TDC or control cycle is substantially proportional to the internal pressure of the chamber 13, i.e., the intake pressure Pb, as shown in FIG. 2.

In this embodiment, an predicted value gair/pre (hereinafter referred to as an "predicted amount gair/pre of intake air") for the amount of intake air per control cycle is determined according to the following equation (1):

$$gair/pre = Pb \cdot Gal \quad (1)$$

where the coefficient Gal is a predetermined value (constant value).

The predicted amount gair/pre of intake air is accumulated in successive control cycles according to the equation (2) shown below in the FIRE mode to determine an integrated value qair/pre of the amount of intake air (hereinafter referred to as a "predicted integrated amount qair/pre of intake air").

$$qair/pre(k) = qair/pre(k-1) + gair/pre \quad (2)$$

where k represent a control cycle number.

Alternatively, an integrated value of the actual amount of intake air may be obtained by directly detecting the amount of intake air in each control cycle with an air flow sensor and integrating the detected amounts of intake air.

A target value for the integrated value of the amount of intake air (hereinafter referred to as a "target integrated amount qair/cmd of intake air"), which corresponds to a target value for the integrated value of the amount of heat energy given to the catalytic converter 3, can be established in various patterns for appropriately increasing the temperature of and activating the catalytic converter 3. However, since the target value therefor affects the amount of intake air introduced into the internal combustion engine 1 in the FIRE mode and hence the combustion and emission statuses of the internal combustion engine 1, it is necessary to take into account the stability of operation of the internal combustion engine 1.

In the present embodiment, the target integrated amount qair/cmd of intake air is established on the basis of the standard opening command value θ0 which has been determined to appropriately increase the temperature of and activate the catalytic converter 3 and operate the internal combustion engine 1 stably under the ideal conditions.

Specifically, the standard opening command value θ0 has been established so as to be able to appropriately increase the temperature of and activate the catalytic converter 3 and operate the internal combustion engine 1 stably under the ideal conditions that the actual bypass opening and amount of intake air are uniquely determined with respect to the command value for the bypass opening and the atmospheric pressure Pa and the atmospheric temperature Ta are constant standard atmospheric pressure and atmospheric temperature, respectively. Stated otherwise, the standard opening command value θ0 serves to determine an optimum-amount of intake air to be drawn into the combustion chamber 4 in order to appropriately increase the temperature of and activate the catalytic converter 3 and operate the internal combustion engine 1 stably.

Under the above ideal conditions, the amount of intake air introduced in each control cycle into the combustion chamber 4 at the time the bypass opening is controlled according to the standard opening command value θ0 may be established as a target amount gair/cmd of intake air in each control cycle, and an accumulated value of the target amount gair/cmd of intake air may be established as the target integrated amount qair/cmd of intake air.

The target amount gair/cmd of intake air and the target integrated amount qair/cmd of intake air may be determined from the standard opening command value θ0 in each control cycle as follows:

If it is assumed that an actual bypass opening is represented by θ, then an amount Gi of air passing through the bypass valve 7 per unit time (constant time) is generally expressed, using the atmospheric pressure Pa upstream of the bypass valve 7 and the intake pressure Pb downstream of the bypass valve 7, according to the following equation (3):

$$Gi = Ci \cdot \theta \cdot \sqrt{Pa - Pb} \tag{3}$$

where Ci is a coefficient depending on the atmospheric density which depends on the atmospheric temperature Ta, and the term of θ represents the bypass opening θ here though it strictly indicates the effective opening area at the bypass valve 7. The coefficient Ci may be selected to correct any effect which the bypass opening θ used instead of the effective opening area has.

When the bypass opening is controlled according to the standard opening command value θ0 under the ideal conditions, the bypass opening θ becomes θ=θ0 and the atmospheric pressure Pa becomes Pa=standard atmospheric pressure (constant) in the equation (3), and the coefficient Ci is basically a constant value depending on the standard atmospheric pressure. In the steady operating state of the internal combustion engine 1 in the FIRE mode, any variations in the intake pressure Pb are relatively small, and the intake pressure Pb is generally of a constant value. In the steady operating state of the internal combustion engine 1 in the FIRE mode, furthermore, the throttle valve 5 is basically closed, and the amount of intake air introduced into the combustion chamber 4 can be regarded as being equal to the amount Gi of intake air passing through the bypass valve 7.

Thus, the amount of intake air introduced per unit time (constant time) into the combustion chamber 4 when the bypass opening is controlled according to the standard opening command value θ0 under the ideal conditions is proportional to the standard opening command value θ0.

Accordingly, the amount of intake air introduced per control cycle (TDC) into the combustion chamber 4 when the bypass opening is controlled according to the standard opening command value θ0 under the ideal conditions, i.e., the target amount gair/cmd of intake air, can be determined according to the following equation (4):

$$gair/cmd = \theta 0 \cdot \frac{1}{Ne} \cdot Ga2 \tag{4}$$

The equation (4) includes the term of the reciprocal (1/Ne) of the rotational speed Ne of the internal combustion engine 1 because the time of one control cycle (one TDC) is inversely proportional to the rotational speed Ne. A parameter Ga2 in the equation (4) is a constant determined according to the standard atmospheric pressure, the standard atmospheric temperature, and the standard intake pressure Pb in the steady operating state of the internal combustion engine 1 in the FIRE mode.

In this embodiment, the target amount gair/cmd of intake air determined according to the equation (4) is accumulated in successive control cycles according to the equation (5) below while in the FIRE mode, thereby determining the target integrated amount qair/cmd of intake air.

$$qair/cmd(k) = qair/cmd(k-1) + gair/cmd \tag{5}$$

Since the target integrated amount qair/cmd of intake air thus determined is determined according to the standard opening command value θ0, it depends on the engine temperature Tw at the start of the internal combustion engine 1 or the initial temperature of the catalytic converter 3. The amount of intake air to be introduced per control cycle into the combustion chamber 4 in accordance with the target integrated amount qair/cmd of intake air, i.e., the target amount gair/cmd of intake air, varies depending on the FIRE elapsed time t/fire in the same pattern of time-dependent changes as the standard opening command value θ0.

The target integrated amount qair/cmd of intake air may be established in advance by a time table, and may be determined from the FIRE elapsed time t/fire in each control cycle using such a time table.

In the control system, the amount-of-intake-air F/B control correcting process is basically performed as follows: A corrective quantity for the command value for the bypass opening is determined according to the feedback control process in order to converge the predicted integrated amount qair/pre of intake air determined as described above (which corresponds to the integrated value of the amount of heat energy actually given to the catalytic converter 3) to the target integrated amount qair/cmd of intake air (which corresponds to the target value for the integrated value of the amount of heat energy to be given to the catalytic converter 3), i.e., to eliminate any difference between the predicted integrated amount qair/pre of intake air and the target integrated amount qair/cmd of intake air. The standard opening command value θ0 is corrected by the corrective quantity thus determined for thereby compensating for variations of the amount of intake air due to structural factors and hence eliminating variations of the pattern of the temperature increase of the catalytic converter 3.

In the amount-of-intake-air F/B control correcting process, it is preferable to make variable the rate at which the difference between the predicted integrated amount qair/pre of intake air and the target integrated amount qair/cmd of intake air is eliminated, i.e., the rate at which the predicted integrated amount qair/pre of intake air is converged to the target integrated amount qair/cmd of intake air, under the existing conditions. For the purpose of making the above rate variable under the existing conditions, a sliding mode control process, or more specifically an adaptive sliding mode control process, as a response designating control process capable of setting the rate to a desired rate, is employed in the above feedback control process.

In the present embodiment, an algorithm of the amount-of-intake-air F/B control correcting process for correcting the command value for the bypass opening in order to converge the predicted integrated amount qair/pre of intake air to the target integrated amount qair/cmd of intake air, using the adaptive sliding mode control process (hereinafter referred to as an "intake adaptive SLD control process"), is constructed as follows: In the following description, an integrated value of the actual amount of intake air introduced into the combustion chamber 4, including the predicted integrated amount qair/pre of intake air, is referred to as an integrated amount Qa of intake air, and a target value for the integrated amount Qa of intake air is referred to as a target integrated amount q (corresponding to the target integrated amount qair/cmd of intake air). The command value for the bypass opening is generally referred to as an opening command $\Theta$.

The actual amount of intake air introduced into the combustion chamber 4 in each control cycle is represented by Gcyl, and the correlation between the amount Gcyl of intake air and the opening command $\Theta$ is expressed by a discrete-system (discrete-time system) model (primary autoregressive model) of a time lag of first order, as indicated by the following equation (6):

$$Gcyl(k+1)=\alpha \cdot Gcyl(k)+\beta \cdot \Theta(k) \qquad (6)$$

where $\alpha$, $\beta$ are model parameters depending on the atmospheric pressure Pa, the atmospheric temperature Ta, the intake pressure Pb, and the rotational speed Ne, etc.

Since the integrated amount Qa of intake air in each control cycle is represented by the following equation (7):

$$Qa(k)=Qa(k-1)+Gcyl(k) \qquad (7)$$

The following equation (8) is derived from the equations (7) and (6):

$$Qa(k+1)=Qa(k)+Gcyl(k+1)=Qa(k)+\alpha \cdot Gcyl(k)+\beta \cdot \Theta(k) \qquad (8)$$

Because Gcyl(k) is Gcyl(k)=Qa(k)−Qa(k−1) according to the equation (7), Gcyl(k)=Qa(k)−Qa(k−1) is put in the equation (8) and the equation (8) is modified into the following equation (9):

$$Qa(k+1)=Qa(k)+\alpha \cdot (Qa(k)-Qa(k-1))+\beta \cdot \Theta(k)=(1+\alpha) \cdot Qa(k)-\alpha \cdot (Qa(k-1))+\beta \cdot \Theta(k)$$

$$\therefore Qa(k+1)=a1 \cdot Qa(k)+b1 \cdot Qa(k-1)+C1 \cdot \Theta(k) \ (a1=1+\alpha, b1=-\alpha, C1=\beta) \qquad (9)$$

The equation (9) expresses a system for generating the integrated amount Qa of intake air from the opening command $\Theta$, i.e., a system to be controlled by the intake adaptive SLD control process, in terms of a discrete-system model (secondary autoregressive model, hereinafter referred to as an "intake-side controlled model"). The intake-side controlled model expresses the integrated amount Qa(k+1) of intake air in each control cycle as the output of the system to be controlled by the intake adaptive SLD control process, using time-series data Qa(k), Qa(k−1) of the integrated amount Qa of intake air in past control cycles and the opening command $\Theta(k)$ as the input of the system to be controlled by the intake adaptive SLD control process. In the equation (9), coefficients a1, a2 relative to the integrated amounts Qa(k), Qa(k−1) of intake air and a coefficient b1 relative to the opening command $\Theta(k)$ are model parameters defining the behavioral characteristics of the intake-side controlled model.

According to the present embodiment, an algorithm of the intake adaptive SLD control process is constructed, based on the intake-side controlled model, as follows:

In the intake adaptive SLD control process, a switching function $\sigma 1$ required for the sliding mode control process is defined by a linear function according the equation (10), shown below, where time-series data Eq(k), Eq(k−1) in each control cycle of the difference Eq=Qa−q between the integrated amount Qa of intake air and the target integrated amount q are variables.

$$\sigma 1(k)=s1 \cdot (Qa(k)-q(k))+s2 \cdot (Qa(k-1)-q(k-1))=s1 \cdot Eq(k)+s2 \cdot Eq(k-1) \qquad (10)$$

where s1, s2 are coefficient parameters of the terms of the switching function $\sigma 1$. These coefficient parameters s1, s2 are selected to satisfy the condition of the following inequality (11):

$$-1 < \frac{s2}{s1} < 1 \qquad (11)$$

(when $s1 = 1$, $-1 < s2 < 1$)

In this embodiment, the coefficient parameter s1 is set to s1=1 for the sake of brevity. Furthermore, the value of the coefficient parameter s2 (more generally, the value of s2/s1) is variably selected, as described later on.

Figure 8:
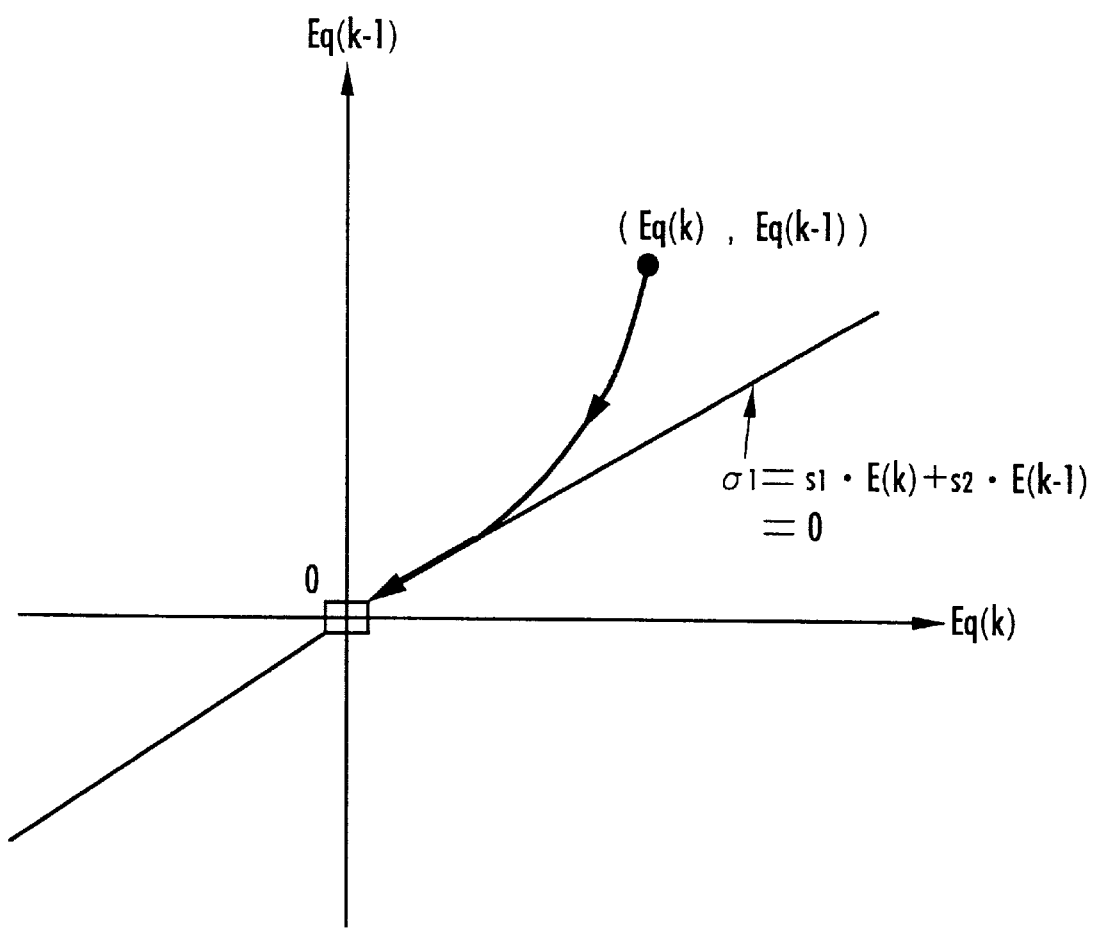
FIG. 8 is a diagram illustrative of an operation of the control system shown in FIG. 1.

With the switching function $\sigma 1$ thus defined, if state quantities (Eq(k), Eq(k−1)) comprising the set of the time-series data Eq(k), Eq(k−1) of the difference Eq=Qa−q are converged onto a switching curve (also referred to as a sliding curve) defined by $\sigma 1=0$ as shown in FIG. 8 and remain converged, then the state quantities (Eq(k), Eq(k−1)) can be converged to a balanced point on the switching curve $\sigma 1=0$, i.e., a point where Eq(k)=Eq(k−1)=0, highly stably without being affected by disturbances.

In the present embodiment, the phase space relative to the switching function $\sigma 1$ is two-dimensional (the state quantities (Eq(k), Eq(k−1)) have two components), so that the switching curve $\sigma 1=0$ is represented by a straight line. If the phase space is three-dimensional, then the switching curve becomes a plane and may be referred to as a sliding plane. If the phase space is four-dimensional or n-dimensional where n is greater than four, then the switching curve is a hyperplane that cannot be geometrically illustrated.

A control input generated by the intake adaptive SLD control process as an input to be given to the controlled model according to the equation (9), i.e., the opening command $\Theta$, for converging the integrated amount Qa of intake air to the target integrated amount q is basically the sum of an equivalent control input $\Theta$eq determined according to a control law for converging the state quantities (Eq(k), Eq(k−1)) onto the switching curve $\sigma 1=0$, a reaching law input $\Theta$rch determined according to a reaching law which is a control law for converging the state quantities (Eq(k), Eq(k−1)) onto the switching curve $\sigma 1=0$, and an adaptive law input $\Theta$adp determined according to an adaptive law (adaptive algorithm) which is a control law for eliminating the effect of disturbances or the like when the state quantities (Eq(k), Eq(k−1)) are converged onto the switching curve σ1=0 (see the following equation (12)).

$$\Theta = \Theta eq + \Theta rch + \Theta adp \tag{12}$$

In a normal sliding mode control process, the adaptive law is not considered, and the adaptive law input Θadp is omitted.

The equivalent control input Θeq is given by the following equation (13):

$$\Theta eq(k) = \frac{-1}{s1 \cdot b1} \cdot [(s1 \cdot (a1 - 1) + s2) \cdot Qa(k) + \\ (s1 \cdot a2 - s2) \cdot Qa(k-1) - s1 \cdot (q(k+1) - q(k)) - \\ s2 \cdot (q(k) - q(k-1))] \tag{13}$$

The equation (13) can be derived on the basis of the condition σ1(k)=σ1(k−1) for converging the state quantities (Eq(k), Eq(k−1)) onto the switching curve σ1=0 and the equation (9) of the intake-side controlled model.

Various schemes are considered for determining the reaching law input Θrch and the adaptive law input Θadp. In this embodiment, the reaching law input Θrch and the adaptive law input Θadp are made proportional to the value of the switching function σ1 and the integrated value (integral) of the value of the switching function σ1, and are determined by the following respective equations (14), (15):

$$\Theta rch(k) = \frac{-1}{s1 \cdot b1} \cdot F1 \cdot \sigma 1(k) \tag{14}$$

$$\Theta adp(k) = \frac{-1}{s1 \cdot b1} \cdot F2 \cdot \sum_{i=0}^{k} \sigma 1(i) \tag{15}$$

F1 in the equation (14) is a coefficient for defining a gain relative to the reaching law, and may be established to satisfy the inequality (16) shown below. For reducing chattering upon converging the value of the switching function σ1 onto the switching curve σ1=0, the coefficient F1 should preferably be established to satisfy the following inequality (16)':

$$0 < F1 < 2 \tag{16}$$

$$0 < F1 < 1 \tag{16'}$$

F2 in the equation (15) is a coefficient for defining a gain relative to the adaptive law, and may be established to satisfy the equation (17) shown below. ΔT in the equation (17) represent a control cycle (control period).

$$F2 = J \cdot \frac{2 - F1}{\Delta T} \tag{17}$$

$$(0 < J < 2)$$

According to the algorithm of the intake adaptive SLD control process employed in the present embodiment, it is possible to control the amount of intake air in the FIRE mode for converging the integrated amount Qa of intake air to the target integrated amount q by determining the equivalent control input Θeq, the reaching law input Θrch, and the adaptive law input Θadp, and generating their sum as the opening command Θ according to the equations (13) through (15).

In order to determine the equivalent control input Θeq, the reaching law input Θrch, and the adaptive law input Θadp according to the equations (13) through (15), it is necessary to identify values of the model parameters a1, a2, b1 of the intake controlled model expressed by the equation (9). However, since the values of these model parameters a1, a2, b1 tend to be affected by various factors in the FIRE mode, it is liable to be complex to optimally identify their values.

According to the present embodiment, there is constructed a simplified algorithm of the intake adaptive SLD control process, from which the model parameters a1, a2, b1 have been eliminated, as follows:

With respect to the reaching law input Θrch and the adaptive law input Θadp, only the model parameter included in the equations (14), (15) for determining the reaching law input Θrch and the adaptive law input Θadp is b1. Replacing (F1/b1) with Fx in the equation (14) and replacing (F2/b1) with Fy in the equation (15), the equations (14), (15) can be modified into the following equations (18), (19):

$$\Theta rch(k) = \frac{-1}{s1} \cdot Fx \cdot \sigma 1(k) \tag{18}$$

$$\Theta adp(k) = \frac{-1}{s1} \cdot Fy \cdot \sum_{i=0}^{k} \sigma 1(i) \tag{19}$$

Therefore, the reaching law input Θrch and the adaptive law input Θadp can be determined, without using the model parameter b1, according to the equations (18), (19).

The coefficients Fx, Fy in the equations (18), (19) may be determined by experimentation and simulation in view of the stability and quick response of the convergence of the value of the switching function σ1 onto the switching curve σ1=0.

With respect to the equivalent control input Θeq, the equation (13) for determining the equivalent control input Θeq can be modified into the following equation (20), using the difference Eq=Qa−q:

$$\Theta eq(k) = \tag{20}$$
$$\frac{-1}{s1 \cdot b1}[(s1 \cdot (a1 - 1) + s2) \cdot Eq(k) + (s1 \cdot a2 - s2) \cdot Eq(k-1)] + \\ \frac{-1}{b1} \cdot [-q(k+1) + a1 \cdot q(k) + a2 \cdot q(k-1)]$$

In the equation (20), the term including the first brackets is a feedback term based on the difference Eq between the integrated amount Qa of intake air and the target integrated amount q, and the term including the second brackets is a feed-forward term based on only the target integrated amount q. The feedback term and the feed-forward term are represented respectively by Θeq/fb, Θeq/ff and expressed according to the following equations (21), (22):

$$\Theta eq/fb = \frac{-1}{s1 \cdot b1}[(s1 \cdot (a1 - 1) + s2) \cdot Eq(k) + \\ (s1 \cdot a2 - s2) \cdot Eq(k-1)] \tag{21}$$

$$\Theta eq/ff = \frac{-1}{b1}[-q(k+1) + a1 \cdot q(k) + a2 \cdot q(k-1)] \tag{22}$$

The feed-forward term Θeq/ff is an input (opening command Θ) to be given to the controlled model in such a state that the difference Eq is steadily "0". The standard opening command value θ0 serves to determine the target integrated amount q in this embodiment, and is established in a feed-forward manner such that the amount of intake air and hence the integrated amount of intake air will uniquely be determined to be a target value thereof with respect to the standard opening command value θ0.

Therefore, the feed-forward term Θeq/ff in the equation (20) can be replaced with the standard opening command value θ0 which does not include the model parameters a1, a2, b1.

The equivalent control input Θeq including the feedback term Θeq/fb is a control input for converging the state quantities (Eq(k), Eq(k−1)) onto the switching curve σ1=0. According to studies conducted by the inventors of the present invention, the equivalent control input Θeq is highly stable in such a state that the state quantities (Eq(k), Eq(k−1)) are present in the vicinity of the switching curve σ1=0, in the control system according to the present embodiment. In the present embodiment, furthermore, the stability of the convergence of the state quantities (Eq(k), Eq(k−1)) onto the switching curve σ1=0 can be increased by using the adaptive law input Θadp.

In control system according to the present embodiment, therefore, it is considered that controllability will not practically be impaired even if the feedback term Θeq/fb is omitted.

In view of the above analysis, the equivalent control input Θeq may be modified by omitting the feedback term Θeq/fb thereof and replacing the feed-forward term Θeq/ff with the standard opening command value θ0. The equivalent control input Θeq thus modified can be determined without using the model parameters a1, a2, b1.

In this embodiment, the equivalent control input Θeq in the intake adaptive SLD control process is expressed by the following equation (23):

$$\Theta eq = \theta 0 \tag{23}$$

In the amount-of-intake-air F/B control correcting process, an input to be given to the controlled model determined in the intake adaptive SLD control process in order to compensate for variations in the amount of intake air due to structural factors, i.e., the opening command Θ, is determined according to the following equation (24):

$$\Theta(k) = \theta 0(k) + \Theta rch(k) + \Theta adp(k) \tag{24}$$

$$= \theta 0(k) + \frac{-1}{s1}\left[Fx \cdot \sigma 1(k) + Fy \cdot \sum_{i=0}^{k}\sigma 1(i)\right]$$

Stated otherwise, the sum (=Θrch+Θadp) of the reaching law input Θrch and the adaptive law input Θadp determined according to the equations (18), (19) is determined as a corrective quantity i/sld for the command value for the bypass opening (hereinafter referred to as an "SLD opening corrective quantity i/sld") according to the equation (25) shown below. By then correcting the standard opening command value θ0 with the SLD opening corrective quantity i/sld, i.e., adding the SLD opening corrective quantity i/sld to the standard opening command value θ0, the opening command Θ for compensating for variations in the amount of intake air due to structural factors is determined.

$$i/sld(k) = \Theta rch(k) + \Theta adp(k) \tag{25}$$

-continued $$= \frac{-1}{s1}\left[Fx \cdot \sigma 1(k) + Fy \cdot \sum_{i=0}^{k}\sigma 1(i)\right]$$

The value of the switching function σ1 required to determine the SLD opening corrective quantity i/sld (=Θrch+Θadp) is determined according to the following equation (26) which employs the predicted integrated amount qair/pre of intake air determined according to the equation (2) as the integrated amount Qa of intake air according to the equation (10) and which employs the target integrated amount qair/cmd of intake air determined according to the equation (5) as the target integrated amount q:

$$\sigma 1(k) = s1 \cdot Eq(k) + s2 \cdot Eq(k-1) = s1 \cdot (qair/pre(k) - qair/cmd(k)) + s2 \cdot (qair/pre(k-1) - qair/cmd(k-1)) \tag{26}$$

In this embodiment, while the FIRE mode is being interrupted with the FIRE interruption flag f/fpause being set to "1", the calculation of the SLD opening corrective quantity i/sld is interrupted, i.e., the SLD opening corrective quantity i/sld is kept at its value immediately prior to the interruption of the FIRE mode. However, the calculation of the predicted integrated amount qair/pre of intake air and the target integrated amount qair/cmd of intake air is continued (the calculation of the predicted integrated amount qair/pre of intake air is not while the internal combustion engine 1 is in the fuel cutting process). If the interruption of the FIRE mode is canceled prior to the elapse of the FIRE mode limit time TFIRELMT, then the calculation of the SLD opening corrective quantity i/sld and the correction of the standard opening command value θ0 depending thereon are resumed.

The foregoing process is performed for the following reasons: While the FIRE mode is being interrupted, the vehicle is propelled or the internal combustion engine 1 is raced by depressing the accelerator pedal. In this condition, since the throttle valve 5 is opened to an opening depending on the accelerator manipulated quantity Ap, the actual amount of intake air introduced into the combustion chamber 4 is the sum of the amount of intake air passing through the bypass valve 7 and the amount of intake air passing through the throttle valve 5.

In this condition, the predicted integrated amount qair/pre of intake air is equal to an integrated value of the amount of intake air passing through both the bypass valve 7 and the throttle valve 5. It is not preferable to control the bypass opening in order to converge the predicted integrated amount qair/pre of intake air to the target integrated amount qair/cmd of intake air determined depending on the standard opening command value θ0 for the bypass valve 7, for the purpose of achieving a desired power output capability of the internal combustion engine 1 depending on the depression of the accelerator pedal. In this embodiment, therefore, the calculation of the SLD opening corrective quantity i/sld is interrupted while the FIRE mode is being interrupted.

Moreover, while the FIRE mode is being interrupted, since the actual amount of intake air introduced into the combustion chamber 4 is equal to the sum of the amount of intake air passing through the bypass valve 7 and the amount of intake air passing through the throttle valve 5, the amount of heat energy applied to the catalytic converter 3 is further increased. Though the catalytic converter 3 may be sufficiently increased in temperature and activated while the FIRE mode is being interrupted, the interruption of the FIRE mode may often be canceled, and the catalytic converter 3 may not be sufficiently increased in temperature and activated when the interruption of the FIRE mode is canceled. In this embodiment, therefore, while the FIRE mode is being interrupted, the calculation of the predicted integrated amount gair/pre of intake air and the target integrated amount qair/cmd of intake air is continued, and after the interruption of the FIRE mode is canceled, the calculation of the SLD opening corrective quantity i/sld is resumed to correct the standard opening command value θ0. In this manner, the catalytic converter 3 is reliably increased in temperature and activated during the interruption of the FIRE mode. However, since the air drawn into the combustion chamber 4 does not contribute to the heat energy given to the catalytic converter 3 while the internal combustion engine 1 is in the fuel cutting process, the calculation of the predicted integrated amount qair/pre of intake air is not calculated while the internal combustion engine 1 is in the fuel cutting process.

The calculation of the SLD opening corrective quantity i/sld is interrupted, i.e., the SLD opening corrective quantity i/sld is kept at its value immediately prior to the interruption of the FIRE mode, even when the ignition-timing-dependent correcting process, described later on, is performed. The reason for this is as follows: The ignition-timing-dependent correcting process, whose details will be described later on, is a process of correcting the opening command Θ so as to be reduced in a feed-forward manner with respect to the standard opening command value θ0. If the SLD opening corrective quantity i/sld is calculated when the ignition-timing-dependent correcting process is carried out, then the SLD opening corrective quantity i/sld is calculated in a manner to cancel the reduction in the opening command Θ corrected by the ignition-timing-dependent correcting process.

The basic concept of the amount-of-intake-air F/B control correcting process has been described above.

A stage immediately after the amount of intake air introduced into the internal combustion engine 1 starts being increased, i.e., a stage in which the bypass opening is increased, is immediately after the internal combustion engine 1 starts operating. If the standard opening command value θ0 is corrected largely by the SLD opening-corrective quantity i/sld in this stage, then the combustion and emission statuses in the combustion chamber 4 of the internal combustion engine 1 may be impaired. In this embodiment, furthermore, since the target integrated amount qair/cmd of intake air is premised on a steady intake state of the internal combustion engine 1, the reliability of the target integrated amount qair/cmd of intake air is considered to be poor in the stage immediately after the amount of intake air introduced into the internal combustion engine 1 starts being increased. Therefore, in the stage immediately after the amount of intake air introduced into the internal combustion engine 1 starts being increased, the difference Eq between the target integrated amount qair/cmd of intake air and the predicted integrated amount gair/pre of intake air tends to be large, and hence the SLD opening corrective quantity i/sld also tends to be large.

In view of the above considerations, according to the amount-of-intake-air F/B control correcting process, the values of the target integrated amount qair/cmd of in-take air and the predicted integrated amount qair/pre of intake air are forcibly set to "0" (Eq =0) until a predetermined time TISLDLMT (hereinafter referred to as an "SLD correction limit time TISLDLMT", see FIG. 7) elapses, i.e., until the FIRE elapsed time t/fire≧TISLDLMT, after the amount of intake air introduced into the internal combustion engine 1 starts being increased, i.e., after the FIRE mode starts being carried out. With such a setting, the value of the SLD opening corrective quantity i/sld is kept as "0", and hence the standard opening command value θ0 is not corrected by the SLD opening corrective quantity i/sld, immediately after the internal combustion engine 1 starts to operate until the FIRE elapsed time t/fire reaches the SLD correction limit time TISLDLMT.

In the amount-of-intake-air F/B control correcting process, immediately after the standard opening command value θ0 starts being actually corrected by the SLD opening corrective quantity i/sld, if the standard opening command value θ0 is corrected abruptly, then the combustion status and emission capability of the internal combustion engine 1 may be impaired. In this embodiment, therefore, based on the response designating characteristics of the intake adaptive SLD control process used in the amount-of-intake-air F/B control correcting process, the rate of reduction of the difference Eq (hereinafter referred to as an "intake difference Eq") between the target integrated amount qair/cmd of intake air and the predicted integrated amount qair/pre of intake air, i.e., the rate at which the predicted integrated amount qair/pre of intake air is converged to the target integrated amount qair/cmd of intake air, is variably established as described below.

In the intake adaptive SLD control process, the state quantities (Eq(k), Eq(k−1)) relative to the intake difference Eq are converged onto the switching curve σ1=0, the following equation (27) is satisfied as is apparent from the equation (10):

$$Eq(k) = -\frac{s2}{s1} \cdot Eq(k-1) = -pole/i \cdot Eq(k-1) \qquad (27)$$

Therefore, the value of the ratio (s2/s1) (−1<s2/s1<1) of the coefficient parameters s1, s2 of the switching function σ1 determines the rate of reduction of the intake difference Eq to "0" (as the |s2/s1| approaches "0", the rate of reduction increases). Consequently, it is possible to designate the rate of reduction of the intake difference Eq with the value of the ratio (s2/s1). This is referred to as the response designating characteristics of the intake adaptive SLD control process.

Increasing the rate of reduction of the intake difference Eq is equivalent to increasing the gain of the feedback control according to the intake adaptive SLD control process. The equation (27) expresses a system of a time lag of first order without inputs, and the ratio (s2/s1) corresponds to a pole of the system of a time lag of first order (the ratio (s2/s1) will hereinafter be referred to as a "pole pole/i"). In this embodiment, the coefficient parameter s1 is set to s1=1, with pole/i=s2. The reduction of the intake difference Eq to "0" is preferably aperiodic. In this embodiment, therefore, s2/s1=pole/i<0 (if s2/s1>0, then the reduction of the intake difference Eq to "0" is oscillatory as can be seen from the equation (27)).

Figure 9:
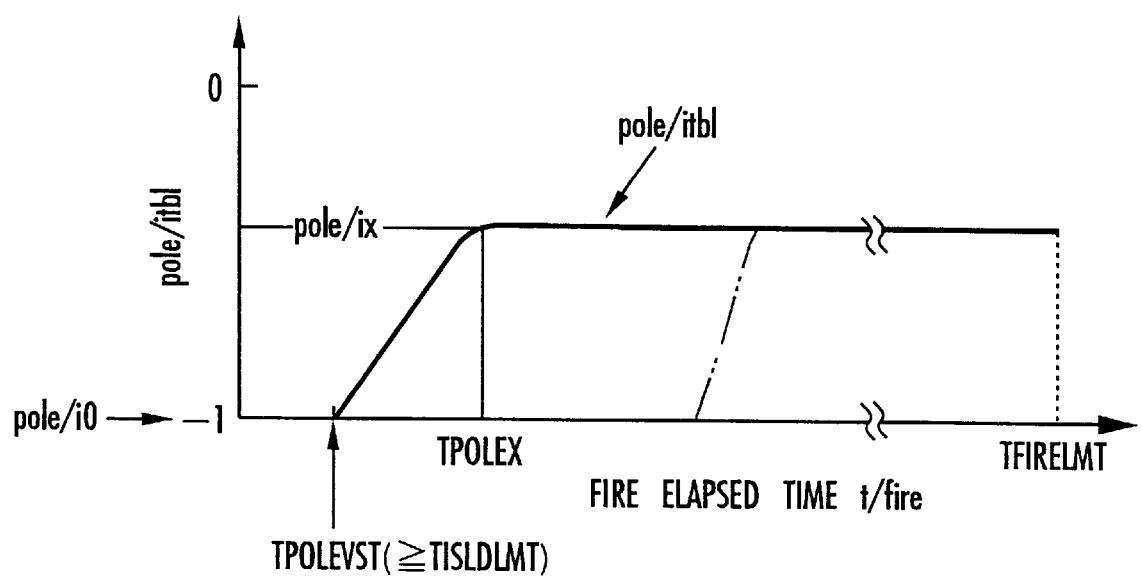
FIG. 9 is a diagram illustrative of an operation of the control system shown in FIG. 1.

In the amount-of-intake-air F/B control correcting process, based on the response designating characteristics of the intake adaptive SLD control process, a value pole/itbl (hereinafter referred to as a "pole table value pole/itbl") determined in each control cycle from the FIRE elapsed time t/fire based on a predetermined data table (time table) shown in FIG. 9 is basically established as the value of the pole pole/i. In this manner, the value of the pole pole/i is established variably depending on the FIRE elapsed time t/fire.

In the data table shown in FIG. 9, after the FIRE elapsed time t/fire reaches a predetermined value TPOLEVST (TPOLEVST≧SLD correction limit time TISLDLMT), as the FIRE elapsed time t/fire increases, the pole table value pole/itbl and the pole pole/i are gradually increased from a predetermined lower limit value pole/i0 (<0,="−1" in the embodiment) to a predetermined steady value pole/ix (pole/i0<pole/ix<0), i.e., the absolute value of the pole table value pole/itbl is gradually reduced. After the pole table value pole/itbl has reached the steady value pole/ix, i.e., after the FIRE elapsed time t/fire has reached a predetermined value TPOLEX shown in FIG. 9, the pole table value pole/itbl maintained at the steady value pole/ix. Consequently, immediately after the standard opening command value θ0 starts to be corrected by the SLD opening corrective quantity i/sld, the rate of reduction of the intake difference Eq is gradually increased, i.e., the predicted integrated amount qair/pre of intake air is slowly converged to the target integrated amount qair/cmd of intake air, and until the FIRE elapsed time t/fire reaches the predetermined value TPOLEX, the rate of reduction of the intake difference Eq is made lower than after the FIRE elapsed time t/fire reaches the predetermined value TPOLEX.

The pole pole/i is increased by the pole table value pole/itbl as described above basically in an initial stage after the internal combustion engine 1 starts to operate, i.e., a stage in which the amount of intake air increases.

According to the present embodiment, while the FIRE mode is being interrupted, the amount-of-intake-air F/B control correcting process, or more accurately the process of calculating the SLD opening corrective quantity i/sld, is not carried out. In this condition, the pole pole/i is set to the lower limit value pole/i0 of the pole table value pole/itbl. When the interruption of the FIRE mode is canceled, the pole pole/i is gradually returned from the lower limit value pole/i0 to the pole table value pole/itbl (see the imaginary-line curve in FIG. 9).

The atmospheric condition correcting process for compensating for variations in the amount of intake air due to atmospheric conditions will be described below.

The atmospheric pressure of the atmospheric conditions will first be described below. It is assumed that the atmospheric temperature is constant and the bypass opening is equal to the opening command Θ.

If it is assumed that the pressure in the combustion chamber 4 of the internal combustion engine 1 is represented by Pcyl and the opening (effective opening area) of the intake valve 11 (see FIG. 2) by Acyl, then the amount Gcyl of intake air introduced into the combustion chamber 4 is expressed by the following equation (28), using the pressure Pcyl, the opening Acyl, and the intake pressure Pb:

$$Gcyl = Ci \cdot Acyl \cdot \sqrt{Pb - Pcyl} \qquad (28)$$

where Ci is a coefficient depending on the atmospheric density as described above with respect to the equation (3).

In the internal combustion engine 1, the pressure Pcyl in the combustion chamber 4 and the opening Acyl of the intake valve 11 are basically constant. The coefficient Ci may be considered to be constant if the atmospheric temperature Ta is constant.

It can be seen from the equation (28) that in order to make the amount Gcyl of intake air in the combustion chamber 4 independent of the atmospheric pressure, it is necessary that the intake pressure Pb do not change depending on the atmospheric pressure Pa.

The amount Gi of air passing through the bypass valve 7 depending on the opening command Θ for the bypass opening is expressed by the following equation (29), as with the equation (3):

$$Gi = Ci \cdot \Theta \cdot \sqrt{Pa - Pb} \qquad (29)$$

When the atmospheric pressure Pa is a standard atmospheric pressure (hereinafter referred to as a "standard atmospheric pressure Pa0"), the amount Gi0 of air (hereinafter referred to as a "standard amount Gi0 of air", which corresponds to the target amount gair/cmd of intake air) passing through the bypass valve 7 at the time the opening command Θ is set to the standard opening command value θ0 (which is determined on the basis of the standard atmospheric pressure Pa0) is expressed by the following equation (30):

$$Gi0 = Ci \cdot \theta 0 \cdot \sqrt{Pa0 - Pb0} \qquad (30)$$

where Pb0 represents an intake pressure (hereinafter referred to as a "standard intake pressure Pb0") generated in the chamber 13 (see FIG. 2) when the bypass opening is equalized to the standard opening command value θ0 under the standard atmospheric pressure Pa0.

According to the known characteristic equation of gases, the condition for the intake pressure Pb in the chamber 13 not to vary is that the amount of air flowing into the chamber 13, i.e., the amount Gi of air passing through the bypass valve 7, be equal to the amount of air flowing out of the chamber 13, i.e., the amount Gcyl of intake air introduced into the combustion chamber 4.

From the foregoing, the opening command Θ for keeping the amount Gcyl of intake air introduced into the combustion chamber 4 unchanged when the atmospheric pressure Pa varies with respect to the standard atmospheric pressure Pa0 may be determined such that the intake pressure Pb in the equation (29) is equalized to the standard intake pressure Pb0 and the amount Gi of air expressed by the equation (29) is equalized to the standard amount Gi0 (equation 30) of air.

That is, the opening command Θ may be determined to satisfy the following equation (31):

$$Ci \cdot \Theta \cdot \sqrt{Pa - Pb0} = Ci \cdot \theta 0 \cdot \sqrt{Pa0 - Pb0} \qquad (31)$$

When solving the equation (31) for the opening command Θ, the following equation (32) is obtained:

$$\Theta = \theta 0 \cdot \sqrt{\frac{Pa0 - Pb0}{Pa - Pb0}} \qquad (32)$$

$$= \theta 0 \cdot kpa$$

$$\left( kpa = \sqrt{\frac{Pa0 - Pb0}{Pa - Pb0}} \right)$$

Basically, therefore, it is possible to compensate for variations in the amount of intake air depending on the atmospheric pressure by correcting the standard opening command value θ0 to determine the opening command Θ based on the equation (32). Specifically, an opening command to compensate for variations in the amount of intake air depending on the atmospheric pressure can be determined by multiplying the opening command by the value kpa of the square root (hereinafter referred to as an "atmospheric pressure corrective coefficient kpa") in the equation (32) for thereby correcting the opening command.

In the present embodiment, since the standard opening command value θ0 is varied with time as described above, the standard intake pressure Pb0 used in the equation (32) also varies. Thus, for accurately compensating for variations in the amount of intake air depending on the atmospheric pressure, it is preferable to vary the value of the standard intake pressure Pb0 depending on the standard opening command value θ0 using a predetermined data table or the like. In this embodiment, however, because any variations in the intake pressure Pb are actually small while the internal combustion engine 1 is steadily operating in the FIRE mode, and in view of stability of the control system, a predetermined value (fixed value) is used as the standard intake pressure Pb0 in the equation (32).

In the present embodiment, moreover, in order to reduce the processing load on the controller 2, the equation (32) is not actually directly calculated, but the following process is performed:

In each control cycle, a parameter ratio/dpa (hereinafter referred to as an "atmospheric pressure correcting parameter ratio/dpa") defined from the predetermined standard atmospheric pressure Pa0, the standard intake pressure Pb0, and the atmospheric pressure Pa detected by the atmospheric pressure sensor 18 when the internal combustion engine 1 starts to operate (in the start mode), i.e., the value in the square root sign in the equation (32), is determined by the following equation (33):

$$ratio/dpa = \frac{Pa0 - Pb0}{Pa - Pb0} \quad (33)$$

Figure 10:
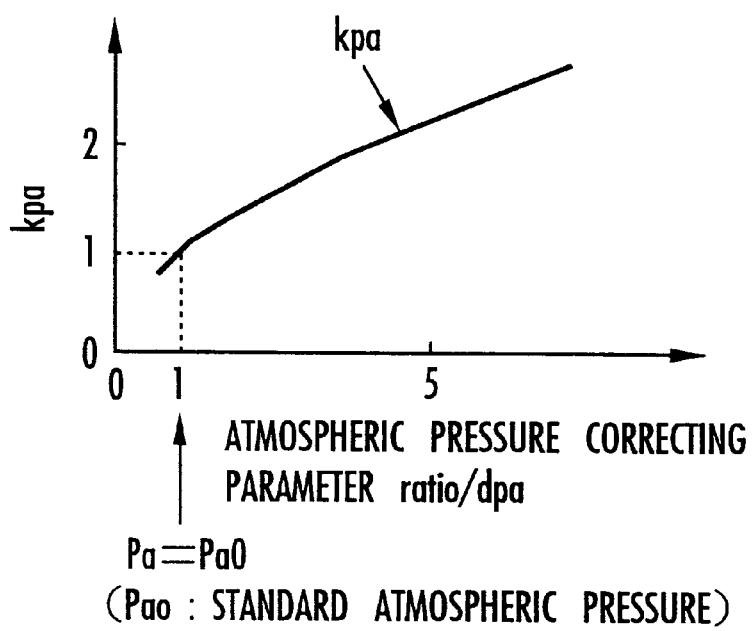
FIG. 10 is a diagram illustrative of an operation of the control system shown in FIG. 1.

A data table shown in FIG. 10 is prepared which contains square roots calculated of various values of the atmospheric pressure correcting parameter ratio/dpa. The square root of the atmospheric pressure correcting parameter ratio/dpa which has previously been determined is determined as the atmospheric pressure corrective coefficient kpa. The opening command is then corrected, i.e., multiplied, by the atmospheric pressure corrective coefficient kpa.

The atmospheric pressure corrective coefficient kpa is "1" if the atmospheric pressure Pa detected by the atmospheric pressure sensor 18 is the standard atmospheric pressure Pa0, and becomes smaller as the atmospheric pressure Pa goes higher.

The basic concept of the process of compensating for variations in the amount of intake air due to the atmospheric pressure in the atmospheric condition correcting process has been described above.

The atmospheric temperature of the atmospheric conditions will be described below. As can be seen from the equation (28), the amount Gcyl of intake air introduced into the combustion chamber 4 is affected by the coefficient Ci depending on the atmospheric density, and is higher as the atmospheric density is greater. Since the atmospheric density is smaller as the atmospheric temperature is higher, the amount Gcyl of intake air introduced into the combustion chamber 4 is smaller as the atmospheric temperature is higher.

In order to keep the amount Gcyl of intake air introduced into the combustion chamber 4 unchanged even when the atmospheric temperature varies, the opening command Θ may be corrected so that the bypass opening will be greater as the atmospheric temperature is higher.

In this embodiment, a corrective coefficient kta (hereinafter referred to as an "atmospheric temperature corrective coefficient kta") is determined based on an experimentally established data table shown in FIG. 11 from the atmospheric temperature Ta detected by the atmospheric temperature sensor 17 when the internal combustion engine 1 starts to operate (in the start mode), and the opening command is corrected, i.e., multiplied, by the atmospheric temperature corrective coefficient kta.

In this embodiment, the amount of intake air at a standard atmospheric temperature Ta0 (for example, 25° C.) is used as a reference. Therefore, the atmospheric temperature corrective coefficient kta is "1" when the detected atmospheric temperature Ta is the standard atmospheric temperature Ta0, and has a higher value as the atmospheric temperature Ta is higher.

The basic concept of the process of compensating for variations in the amount of intake air due to the atmospheric temperature in the atmospheric condition correcting process has been described above.

The learning correcting process will be described below.

As described above, in order to compensate for variations in the amount of intake air due to structural factors, the SLD opening corrective quantity i/sld is determined in each control cycle according to the amount-of-intake-air F/B control correcting process using the intake adaptive SLD control process, and the standard opening command value θ0 is corrected by the SLD opening corrective quantity i/sld. If the actual amount of intake air with respect to the standard opening command value θ0 suffer relatively large variations from a standard amount of intake air corresponding to the standard opening command value θ0, then the SLD opening corrective quantity i/sld insofar as the integrated amount Qa of intake air (the predicted integrated amount qair/pre of intake air) is not converged to the target integrated amount q (the target integrated amount qair/cmd of intake air) is large, and its time-dependent changes are also large. Therefore, in the initial stage of the FIRE mode, the pattern of time-dependent changes of the opening command Θ determined by correcting the standard opening command value θ0 with the SLD opening corrective quantity i/sld, and hence the pattern of time-dependent changes of the actual amount of intake air may deviate largely from the pattern of time-dependent changes of the standard opening command value θ0 (the pattern of time-dependent changes of the target amount of intake air).

Particularly in the initial stage of the FIRE mode (immediately after the internal combustion engine 1 starts to operate), the combustion status of the air-fuel mixture in the combustion chamber 4 tends to be unstable, and when the pattern of time-dependent changes of the opening command Θ deviates largely from the pattern of time-dependent changes of the standard opening command value θ0, the combustion and emission statuses of the internal combustion engine 1 may possibly be impaired.

According to the learning correcting process, the SLD opening corrective quantity i/sld determined in each control cycle while in the FIRE mode is learned, and a corrective coefficient kilearn (hereinafter referred to as a "learning corrective coefficient kilearn") for correcting the standard opening command value θ0 by multiplication is determined for the entire period of operation of a next FIRE mode. The standard opening command value θ0 is multiplied by the learning corrective coefficient kilearn to generate an opening command Θ which exhibits stable time-dependent changes matching the pattern of time-dependent changes of the standard opening command value θ0.

The learning corrective coefficient kilearn is determined as follows:

From the SLD opening corrective quantity i/sld determined in each control cycle during operation of each FIRE mode, a corrective quantity gair/sld (hereinafter referred to as an "SLD intake corrective quantity gair/sld") for the actual amount of intake air corresponding to the SLD opening corrective quantity i/sld is determined in each control cycle according to the following equation (34):

$$gair/sld = i/sld \cdot \frac{1}{Ne} \cdot Ga2 \quad (34)$$

The equation (34) is similar to the equation (4) for determining actual the amount of intake air (per TDC) corresponding to the target amount gair/cmd of intake air, i.e., the standard opening command value θ0. Ga2 in the equation (34) is identical to Ga2 in the equation (4).

The SLD intake corrective quantity gair/sld is accumulated in each control cycle according to the following equation (35) to determine an integrated value qair/sld of the SLD intake corrective quantity gair/sld (hereinafter referred to as an "SLD integrated intake corrective quantity qair/sld"):

$$\text{qair/sld}(k)=\text{qair/sld}(k-1)+\text{gair/sld} \quad (35)$$

Then, a value determined from the ratio (qair/sld / qair/cmd) of the SLD integrated intake corrective quantity qair/sld to the target integrated amount qair/cmd of intake air according to the following equation (36) is determined as a basic value vpskisld of the learning corrective coefficient kilearn (hereinafter referred to as a "basic learning corrective coefficient vpskisld"):

$$vpskisld = 1 + \frac{qair/sld(k)}{qair/cmd(k)} \quad (36)$$

The basic learning corrective coefficient vpskisld is basically calculated in each control cycle until the FIRE mode is finished. However, when the FIRE mode is interrupted or the ignition-timing-dependent correcting process is carried out, the calculation of the SLD opening corrective quantity i/sld is interrupted. Therefore, the calculation of the basic learning corrective coefficient vpskisld is finished before the FIRE mode is interrupted or the ignition-timing-dependent correcting process is carried out, i.e., before the learning calculation end flag f/flrnend is set to "1".

The basic learning corrective coefficient vpskisld finally determined in each FIRE mode is then subjected to a filtering process according to the following equation (37) to determine a learning corrective coefficient kilearn for correcting the standard opening command value θ0 in a next FIRE mode:

$$\text{kilearn}(j)=\text{kilearn}(j-1)\cdot[1+Cki\cdot(vpskisld-1)] \quad (37)$$

where kilearn(j) represents a learning corrective coefficient kilearn to be newly determined in the present FIRE mode, kilearn(j−1) represents a learning corrective coefficient kilearn determined in the preceding FIRE mode, and Cki represents a predetermined constant of "1" or less.

If the FIRE elapsed time t/fire (which is the value of the parameter t/kil established in STEP5—5, STEP5-16, etc. of the flowchart shown in FIG. 5) at the time the final basic learning corrective coefficient vpskisld is determined in each FIRE mode does not reach a predetermined time, then the determined basic learning corrective coefficient vpskisld is not used to determine (update) a learning corrective coefficient kilearn, but the value of the present learning corrective coefficient kilearn is maintained. This is because the reliability of the basic learning corrective coefficient vpskisld which is produced when the FIRE elapsed time t/fire is short is poor.

The basic concept of the learning corrective process has been described above.

The ignition-timing-dependent correcting process will be described below.

As described above, when the internal combustion engine 1 is warmed up to a certain extent, i.e., when the FIRE elapsed time t/fire increases to a certain value, the friction of various components of the internal combustion engine 1 is gradually reduced, and the rotational speed Ne of the internal combustion engine 1 tends to increase. According to the present embodiment, in order to prevent the rotational speed Ne from tending to increase and also to prevent the ignition timing from being controlled by the ignition timing control rotational speed F/B control process to become excessively retarded, the standard opening command value θ0 is gradually reduced (see FIG. 7).

The manner in which the friction of various components of the internal combustion engine 1 is reduced as the internal combustion engine 1 is warmed up is influenced by various factors. The friction may start being lowered more quickly than expected or may be lowered at a greater rate than expected.

With the friction being thus reduced in varying patterns, the tendency of the rotational speed Ne of the internal combustion engine 1 to increase cannot sufficiently be suppressed even when the standard opening command value θ0 is gradually reduced. As a result, the ignition timing controlled by the ignition timing control rotational speed F/B control process reaches a retarded limit value at which the ignition timing can actually be controlled, and the rotational speed Ne cannot be feedback-controlled at the target rotational speed ne/fire.

The ignition-timing-dependent correcting process is a process for preventing such a feedback control failure from occurring. Specifically, when the command value for the ignition timing which is determined by the ignition timing control rotational speed F/B control process as described later on becomes retarded beyond a certain threshold value that is slightly more advanced than the retarded limit value, the ignition-timing-dependent correcting process corrects the standard opening command value θ0 so as to be reduced a predetermined amount in each control cycle until such a condition disappears, i.e., until the command value for the ignition timing returns to an advanced value greater than the threshold value.

Figure 12:
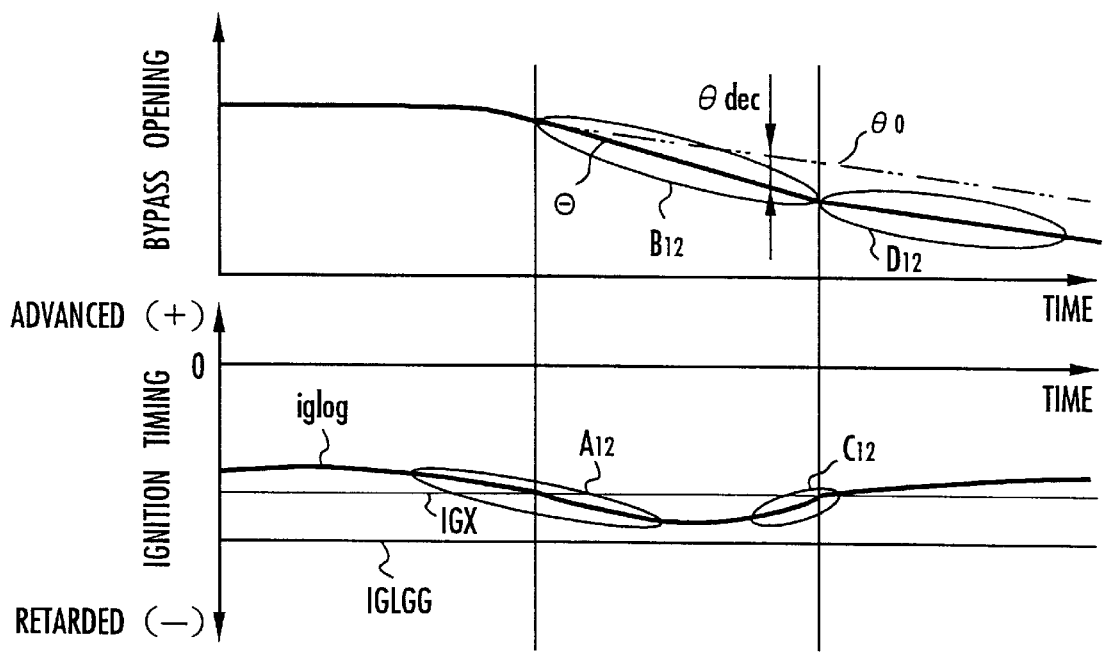
FIG. 12 is a diagram illustrative of an operation of the control system shown in FIG. 1.

For example, while the bypass opening is being controlled according to the standard opening command value θ0 as shown in an upper diagram section of FIG. 12, if the command value iglog for the ignition timing determined according to the ignition timing control rotational speed F/B control process becomes more retarded than a threshold value IGX that is slightly greater than a retarded limit value IGLGG as shown in an area A12 in a lower diagram section of FIG. 12, then the opening command Θ is reduced from the standard opening command value θ0 by a certain corrective quantity θdec (hereinafter referred to as an "ignition-timing-dependent opening corrective quantity θdec") (Θ=θ0−θdec), as shown in the upper diagram section of FIG. 12.

As shown in an area B12 in the upper diagram section of FIG. 12, the ignition-timing-dependent opening corrective quantity θdec is increased a certain value Δθdec (>0, hereinafter referred to as an "opening reduction unit quantity Δθdec") in each control cycle until the command value iglog for the ignition timing becomes more advanced than the threshold value IGX (see the equation in STEP15-9 shown in FIG. 15).

After the command value iglog for the ignition timing becomes more advanced than the threshold value IGX, as shown in an area C12 in the lower diagram section of FIG.

12, the ignition-timing-dependent opening corrective quantity θdec is maintained at a value when the command value iglog for the ignition timing becomes more advanced than the threshold value IGX, i.e., the process of increasing the ignition-timing-dependent opening corrective quantity θdec by the opening reduction unit quantity Δθdec is stopped, and the opening command Θ is reduced from the standard opening command value θ0 by the ignition-timing-dependent opening corrective quantity θdec.

Figure 13:
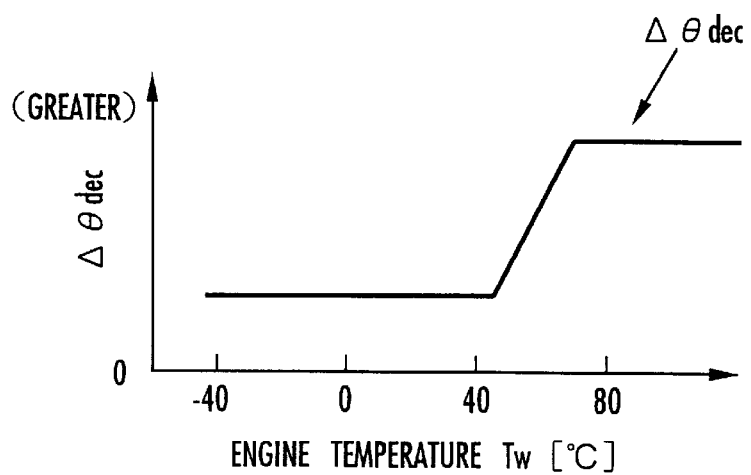
FIG. 13 is a diagram illustrative of an operation of the control system shown in FIG. 1.

In this embodiment, the opening reduction unit quantity Δθdec by which to increase the ignition-timing-dependent opening corrective quantity θdec is determined based on a predetermined data table shown in FIG. 13 from the engine temperature Tw at the start of the internal combustion engine 1. When the engine temperature Tw at the start of the internal combustion engine 1 is in a high temperature range, then the friction tends to be greater than when the engine temperature TW is in middle and low temperature ranges. In the data table shown in FIG. 13, the opening reduction unit quantity Δθdec is greater in the high temperature range than in the middle and low temperature ranges.

The basic concept of the ignition-timing-dependent correcting process has been described above.

Based on the details described above, the process of generating the command value θCMD for the bypass opening (opening command), which is carried out by the intake air quantity control means 25, in STEP4-5 shown in FIG. 4 will be described in specific detail below.

Figure 14:
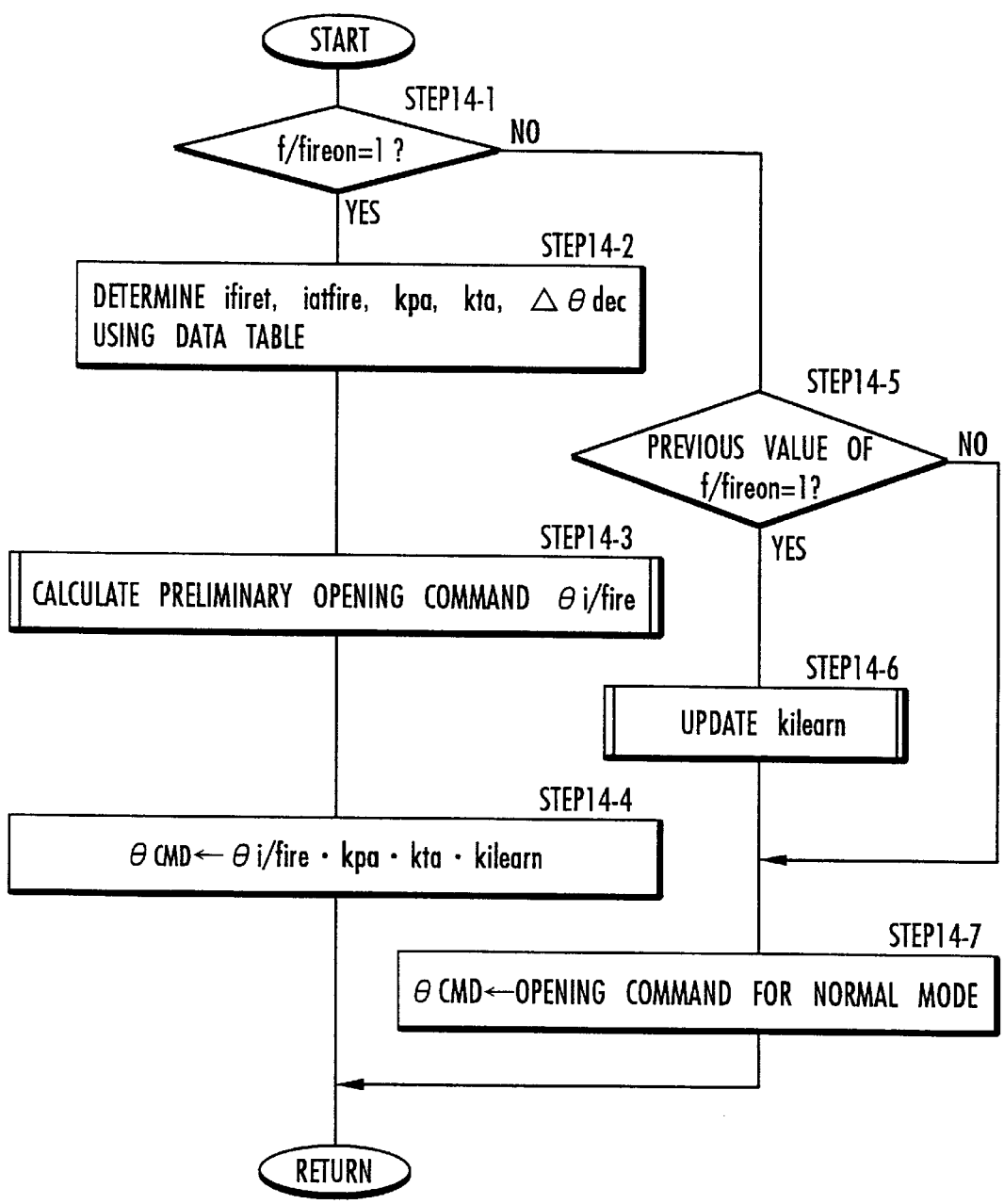
FIG. 14 is a flowchart of the processing sequence of a step in the main routine shown in FIG. 4.

As shown in FIG. 14, the value of the FIRE mode execution on/off flag f/fireon determined in each control cycle, i.e., the value established in the present control cycle, in the condition judgement process in STEP4—4 is determined in STEP14-1.

If f/fireon=1, i.e., if the operation mode is the FIRE mode, then the N range basic value ifiret and the D range corrective value iatfire used to determine the standard opening command value θ0 according to the standard opening command value generating process, the atmospheric pressure corrective coefficient kpa and the atmospheric temperature corrective coefficient kta used in the atmospheric condition correcting process, and the opening reduction unit quantity Δθdec used in the ignition-timing-dependent correcting process are determined using the predetermined data tables described above in STEP14-2.

Specifically, the N range basic value ifiret and the D range corrective value iatfire are determined on the basis of the data table shown in FIG. 6 from the engine temperature Tw at the start of the internal combustion engine 1 which has been acquired in the start mode (STEP4-2).

The atmospheric pressure correcting parameter ratio/dpa is calculated according to the equation (33) from the atmospheric pressure Pa at the start of the internal combustion engine 1 which has been acquired in the start mode, the standard atmospheric pressure Pa0, and the standard intake pressure Pb0, and the atmospheric pressure corrective coefficient kpa (=the square root of the parameter ratio/dpa) is determined on the basis of the data table shown in FIG. 10 from the atmospheric pressure correcting parameter ratio/dpa.

Figure 11:
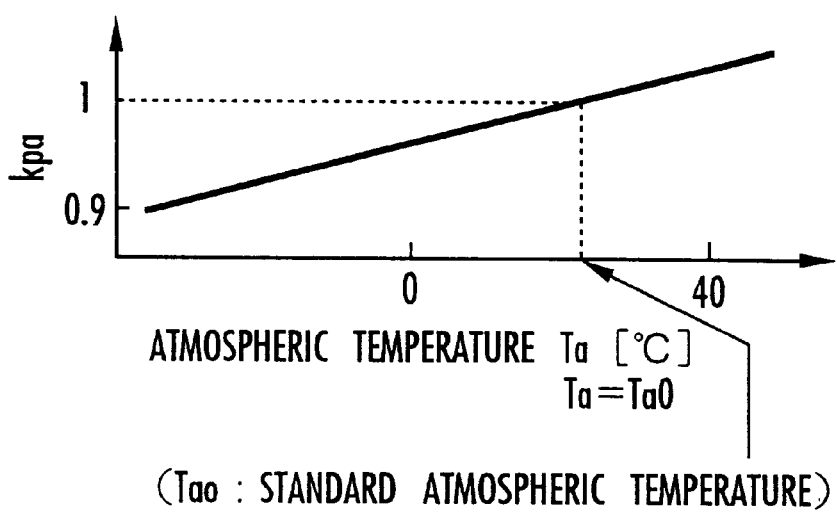
FIG. 11 is a diagram illustrative of an operation of the control system shown in FIG. 1.

The atmospheric temperature corrective coefficient kta is determined on the basis of the data table shown in FIG. 11 from the atmospheric temperature Ta at the start of the internal combustion engine 1 which has been acquired in the start mode.

The opening reduction unit quantity Δθdec is determined on the basis of the data table shown in FIG. 13 from the engine temperature Tw at the start of the internal combustion engine 1 which has been acquired in the start mode.

These determining processes in STEP14-2 may have been carried out in advance in the start mode.

Then, the intake air quantity control means 25 carries out the amount-of-intake-air F/B control correcting process and the ignition-timing-dependent correcting process on the standard opening command value θ0 to calculate a preliminary opening command θi/fire in STEP14-3.

Figure 15:
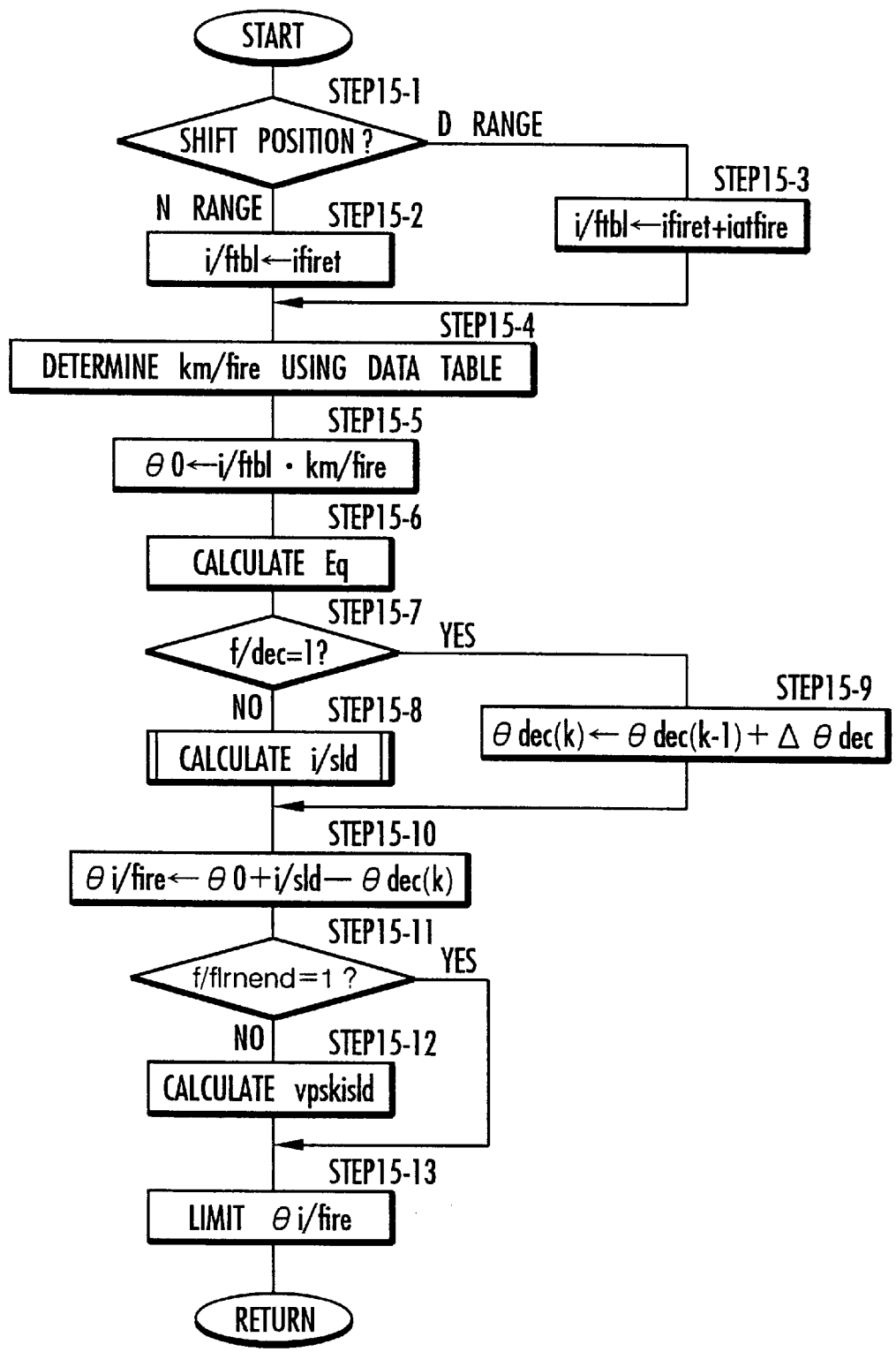
FIG. 15 is a flowchart of a subroutine in the processing sequence shown in FIG. 14.

More specifically, as shown in FIG. 15, the intake air quantity control means 25 determines a present (present control cycle) shifted position of the automatic transmission detected by a sensor (not shown) in STEP15-1. If the shifted position is in the N range, then the intake air quantity control means 25 sets the basic value i/ftbl of the standard opening command value θ0 to the N range basic value ifiret determined in STEP14-2 in STEP15-2. If the shifted position is in the D range, then the intake air quantity control means 25 sets the basic value i/ftbl to the sum of the N range basic value ifiret and the D range corrective value iatfire determined in STEP14-2 in STEP15-3.

Then, the intake air quantity control means 25 determines the corrective coefficient km/fire in the present control cycle based on the data table shown in FIG. 7 from the present FIRE elapsed time t/fire in STEP15-4. The intake air quantity control means 25 multiplies the basic value i/ftbl determined in STEP15-2 or 15-3 by the corrective coefficient km/fire to determine the standard opening command value θ0 in STEP15-5. In this manner, the standard opening command value θ0 is determined in each control cycle in the FIRE mode.

Figure 16:
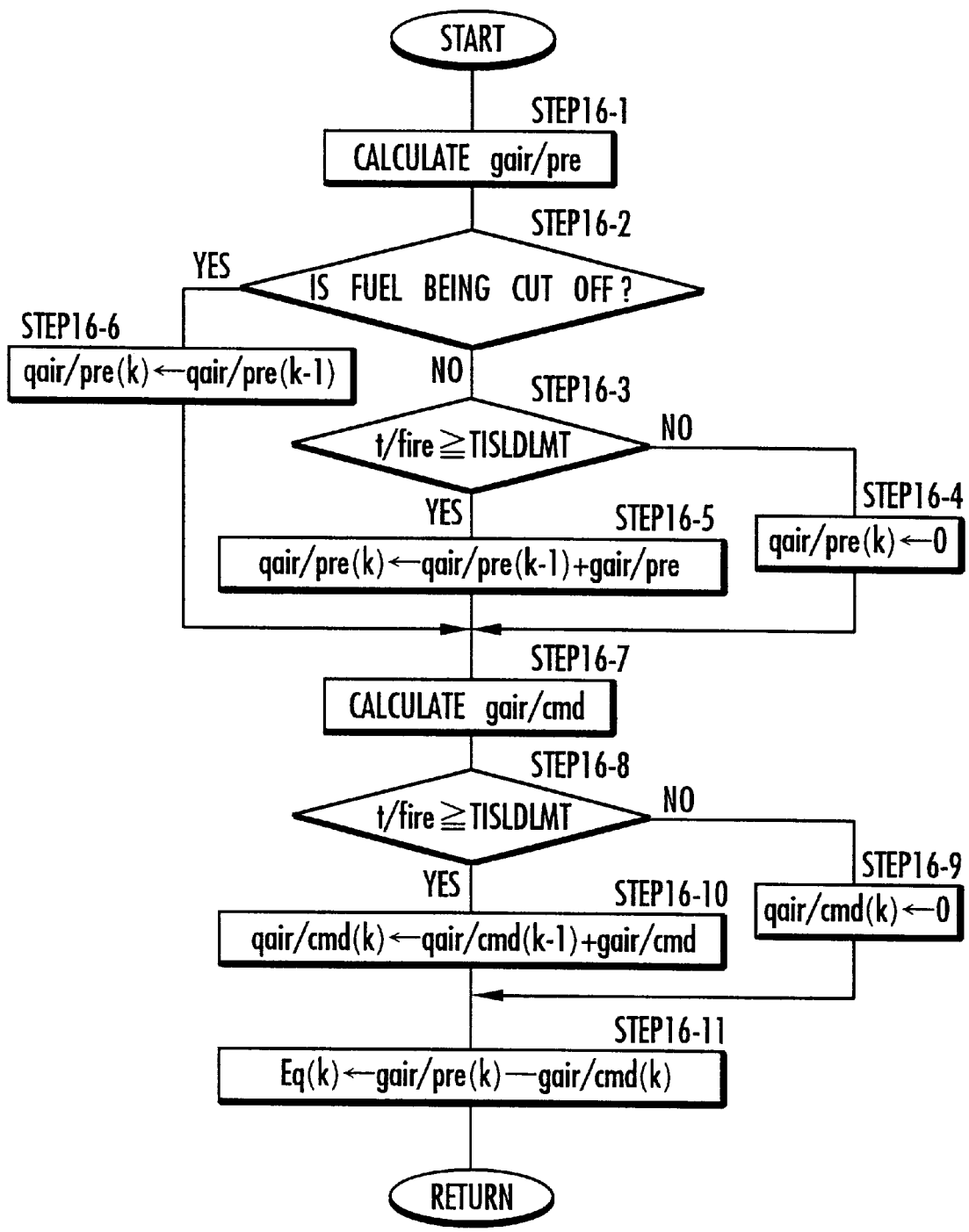
FIG. 16 is a flowchart of a subroutine in the subroutine shown in FIG. 15.

Then, the intake air quantity control means 25 calculates the intake difference Eq according to a subroutine shown in FIG. 16 in STEP15-6.

As shown in FIG. 16, the intake air quantity control means 25 determines an predicted amount gair/pre of intake air (an predicted value of the amount of intake value per TDC) in the present control cycle according to the equation (1) from the present intake pressure Pb detected by the intake pressure sensor 16 and the predetermined value Gal in STEP16-1.

The intake air quantity control means 25 determines whether the internal combustion engine 1 is in the fuel cutting process or not in STEP16-2. If the internal combustion engine 1 is not in the fuel cutting process, then the intake air quantity control means 25 determines whether the present FIRE elapsed time t/fire has reached the SLD correction limit time TISLDLMT or not in STEP16-3.

If t/fire<TISLDLMT, then the intake air quantity control means 25 forcibly sets the value of the predicted integrated amount qair/pre(k) of intake air in the present control cycle to "0" in STEP16-4. If t/fire >TISLDLMT, then the intake air quantity control means 25 accumulates the predicted amount gair/pre of intake air to determine an predicted integrated amount qair/pre(k) of intake air according to the equation (2) in STEP16-5.

If the internal combustion engine 1 is in the fuel cutting process in STEP16-2, then since the air drawn into the combustion chamber 4 at the time does not contribute to the heat energy given to the catalytic converter 3, i.e., since the air-fuel mixture is not combusted in the combustion chamber 4 while the internal combustion engine 1 is in the fuel cutting process, the intake air quantity control means 25 keeps the present value of the present predicted integrated amount qair/pre(k) of intake air in STEP16-6.

The above processing in STEP16-1 through STEP16-6 successively determines the predicted integrated amount qair/pre(k) of intake air, which corresponds to an integrated amount of heat energy actually given to the catalytic converter 3 in the FIRE mode (including its interruption) after it has started, from elapse of the SLD correction limit time TISLDLMT except when the internal combustion engine 1 is in the fuel cutting process.

Therefore, until the SLD correction limit time TISLD-LMT elapses, i.e., immediately after the internal combustion engine 1 starts to operate, the value of the predicted integrated amount qair/pre(k) of intake air is forcibly set to "0".

In order to limit the value of the predicted integrated amount qair/pre(k) of intake air until the SLD correction limit time TISLDLMT elapses, the value of the predicted amount gair/pre of intake air may be forcibly limited to "0" until the SLD correction limit time TISLDLMT elapses, and the equation (2) may be calculated using the limited value of the predicted amount gair/pre of intake air. According to this process, the value of the predicted integrated amount qair/pre(k) of intake air is also forcibly limited to "0" until the SLD correction limit time TISLDLMT elapses.

After the predicted integrated amount qair/pre(k) of intake air has thus been determined, the intake air quantity control means 25 determines a target amount gair/cmd of intake air in the present control cycle (a target value for the amount of intake air per TDC) according to the equation (4) from the standard opening command value θ0 determined in STEP15-5, the present rotational speed Ne detected by the rotational speed sensor 14, and a predetermined value Ga2 in STEP16-7.

The intake air quantity control means 25 makes the same decision as in STEP16-3 in STEP16-8. If t/fire<TISLDLMT, then the intake air quantity control means 25 forcibly sets the target integrated amount qair/cmd(k) of intake air in the present control cycle to "0" in STEP16-9. If t/fire≧TISLDLMT, then the intake air quantity control means 25 accumulates the target amount gair/pre of intake air in each control cycle to determine a target integrated amount qair/cmd(k) of intake air according to the equation (5) in STEP16-10.

The above processing in STEP16-7 through STEP16-10 successively determines the target integrated amount qair/cmd(k) of intake air, which corresponds to a target value of the integrated value of the amount of heat energy actually given to the catalytic converter 3, after the FIRE mode has started, from elapse of the SLD correction limit time TISLDLMT, including the interruption of the FIRE mode.

Immediately after the internal combustion engine 1 starts to operate until the SLD correction limit time TISLDLMT elapses, the value of the target integrated amount qair/cmd (k) of intake air is forcibly set to "0", as with the predicted integrated amount qair/pre(k) of intake air.

In order to limit the value of the target integrated amount qair/cmd(k) of intake air until the SLD correction limit time TISLDMT elapses, the value of the target amount gair/cmd of intake air may be forcibly limited to "0" until the SLD correction limit time TISLDLMT elapses, and the equation (5) may be calculated using the limited value of the target amount gair/cmd of intake air.

After the predicted integrated amount qair/pre(k) of intake air and the target integrated amount qair/cmd(k) of intake air have thus been determined, the intake air quantity control means 25 calculates their difference (qair/pre(k)−qair/cmd (k)) to determine the intake difference Eq(k) in the present control cycle in STEP16-11. Then, control goes back to the subroutine shown in FIG. 15.

After having determined the intake difference Eq, the intake air quantity control means 25 determines the value of a flag f/dec in STEP15-7 shown in FIG. 15. The flag f/dec is a flag relative to the ignition-timing-dependent correcting process. The flag f/dec is f/dec=1 when the command value iglog for the ignition timing is more retarded than the threshold value IGX (see FIG. 12) in a process (described later on) of generating the command value iglog for the ignition timing, and f/dec=0 when the command value iglog for the ignition timing is more advanced than the threshold value IGX in the process of generating the command value iglog for the ignition timing. The flag f/dec will hereinafter be referred to as an "ignition timing determining flag f/dec". The ignition timing determining flag f/dec is initialized to "0" in the start mode process (STEP4-2).

Figure 17:
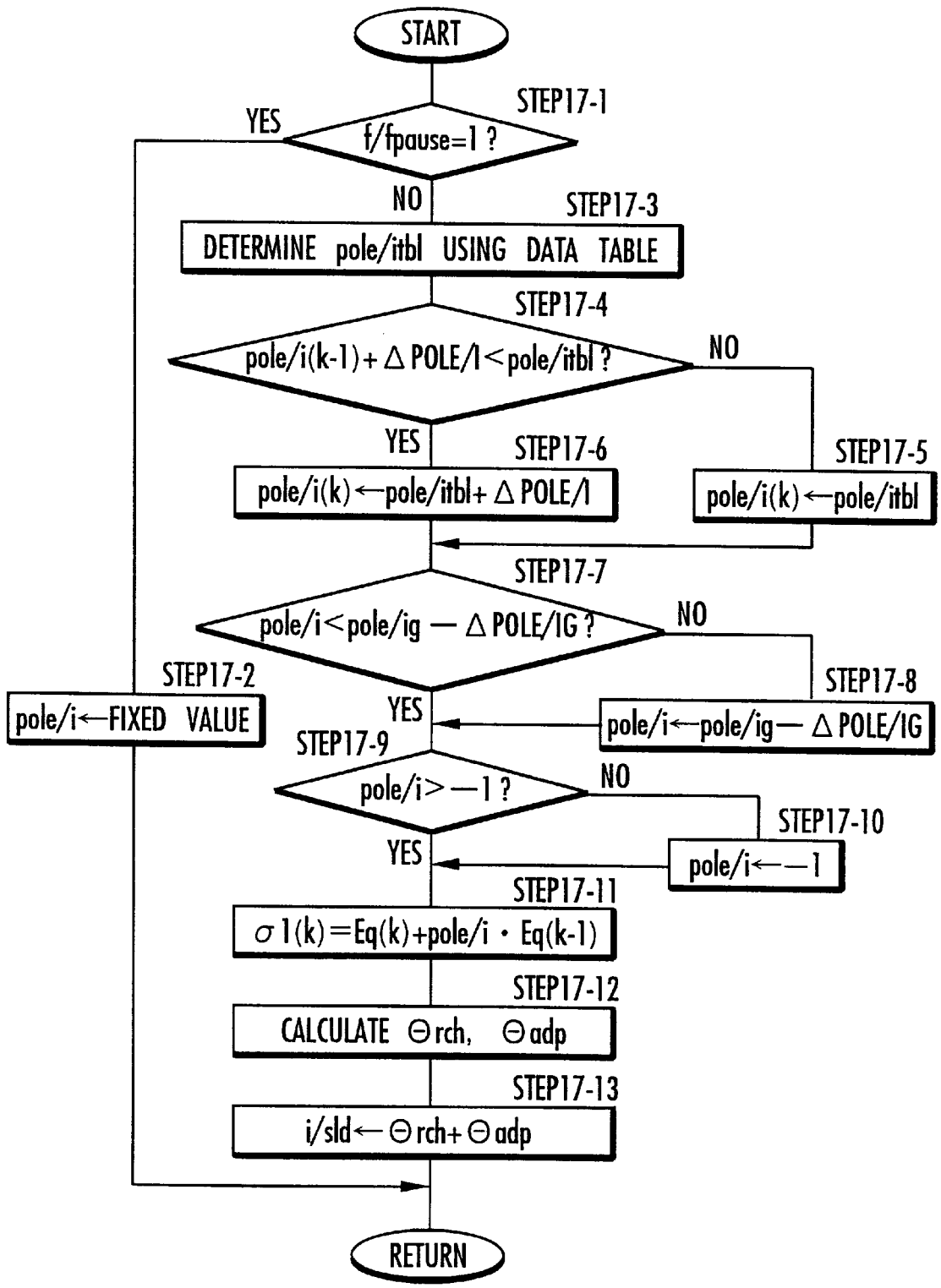
FIG. 17 is a flowchart of a subroutine in the processing sequence shown in FIG. 14.

If f/dec=0, i.e., if the command value iglog for the ignition timing is more advanced than the threshold value IGX, then the intake air quantity control means 25 calculates the SLD opening corrective quantity i/sld with respect to the amount-of-intake-air F/B control correcting process according to a subroutine shown in FIG. 17 in STEP15-8.

The intake air quantity control means 25 determines the present value of the FIRE interruption flag f/fpause in STEP17-1. If f/fpause=1, i.e., if the FIRE mode is to be interrupted, then the intake air quantity control means 25 sets (initializes) the pole pole/i which determines the rate of reduction of the intake difference Eq in the amount-of-intake-air F/B control correcting process to the lower limit value pole/i0 (see FIG. 9) in STEP17-2, after which control returns to the subroutine shown in FIG. 15.

Therefore, while the FIRE mode is being interrupted, the SLD opening corrective quantity i/sld is maintained at the present value (the value before the FIRE mode starts being interrupted).

The SLD opening corrective quantity i/sld and the pole pole/i are initialized respectively to "0" and "lower limit value pole/i0" in the start mode process (STEP4-2).

If f/fpause=0, i.e., if the FIRE mode is not to be interrupted, in STEP17-1, then the intake air quantity control means 25 determines the pole table value pole/itbl in the present control cycle based on the data table shown in FIG. 9 from the present FIRE elapsed time t/fire in STEP17-3.

Then, the intake air quantity control means 25 basically establishes the pole table value pole/itbl determined in STEP17-3 as the value of the pole pole/i for determining the rate of reduction of the intake difference Eq. The intake air quantity control means 25 carries out the following process for returning the pole pole/i, which has been set to the lower limit value pole/i0 (="−1" in this embodiment) while the FIRE mode is being interrupted, gradually to the pole table value pole/itbl depending on the FIRE elapsed time t/fire after the interruption of the FIRE mode is canceled:

The intake air quantity control means 25 compares a value (pole/i(k−1)+ΔPOLE/I) which represents the sum of the present value pole/i(k−1) of the pole pole/i and a preset unit incremental value ΔPOLE/I (>0) with the pole table value pole/itbl determined in STEP17-3 in STEP17-4. If pole/i(k−1)+ΔPOLE/I≧pole/itbl, then the intake air quantity control means 25 establishes the pole table value pole/itbl determined in STEP17-3 as the value of the pole pole/i(k) in the present control cycle in STEP17-5. If pole/i(k−1) +ΔPOLE/I<pole/itbl, then the intake air quantity control means 25 establishes the value (pole/i(k−1)+ΔPOLE/I) as the value of the pole pole/i(k) in the present control cycle in STEP17-6.

After the interruption of the FIRE mode is canceled by the above process, the pole pole/i gradually returns from the lower limit value pole/i0 to the pole table value pole/itbl depending on the FIRE elapsed time t/fire by the unit incremental value ΔPOLE/I.

If the FIRE mode is not interrupted immediately after the internal combustion engine 1 has started to operate, then basically the pole pole/i is set to the pole table value pole/itbl, and varies as the FIRE elapsed time t/fire increases in the same pattern as with the pole table value pole/itbl (the unit incremental value ΔPOLE/I is established so as to vary the pole pole/i in this manner).

After having established the value of the pole pole/i, the intake air quantity control means 25 compares the value of the pole pole/i with a value which is produced by subtracting a predetermined small value ΔPOLE/IG (>0) from a pole pole/ig established in the ignition timing control rotational speed F/B control process (described later on) in STEP17-7. The pole pole/ig is a parameter which defines the rate of reduction of the difference between the rotational speed Ne of the internal combustion engine 1 and the target rotational speed ne/fire in the ignition timing control rotational speed F/B control process.

If pole/i<pole/ig−ΔPOLE/IG, then control proceeds to STEP17-9. If pole/i≧pole/ig−ΔPOLE/IG, then the intake air quantity control means 25 sets the value of the pole pole/i forcibly to (pole/ig−ΔPOLE/IG) in STEP17-8. Thus, the value of the pole pole/i is set to a value which is always smaller than the pole pole/ig (<0) that is established as described later on in the ignition timing control rotational speed F/B control process (more accurately, 1>|pole/i|>|pole/ig|>0). The reason for the above setting of the value of the pole pole/i is as follows:

In this embodiment, the intake adaptive SLD control process (feedback control process) for converging the predicted integrated amount qair/pre of intake air to the target integrated amount qair/cmd of intake air, and the ignition timing control rotational speed F/B control process for converging the rotational speed Ne of the internal combustion engine 1 to the target rotational speed ne/fire are carried out independently of each other, and both control processes affect the rotational speed Ne of the internal combustion engine 1. Generally, the response of a change in the amount of intake air with respect to a change in the bypass opening based on the intake adaptive SLD control process is slower than the response of a change in the rotational speed Ne with respect to a change in the ignition timing based on the ignition timing control rotational speed F/B control process. Therefore, if the rate of reduction of the intake difference Eq relative to the intake adaptive SLD control process is made greater than the rate of reduction of the difference between the rotational speed Ne and the target rotational speed ne/fire according to the ignition timing control rotational speed F/B control process, both control processes interfere with each other, tending to render the rotational speed Ne unstable.

In view of the above drawback, according to the present embodiment, the pole pole/i relative to the intake adaptive SLD control process is established such that |pole/i|>|pole/ig|, thereby making the rate of reduction of the intake difference Eq relative to the intake adaptive SLD control process smaller than the rate of reduction of the difference between the rotational speed Ne and the target rotational speed ne/fire according to the ignition timing control rotational speed F/B control process for thereby preventing both control processes from interfering with each other.

In STEP17-9, the intake air quantity control means 25 compares the value of the pole pole/i with "−1". If pole/i≦−1 (this condition may be produced by the processing in STEP17-8), then the intake air quantity control means 25 forcibly sets the value of the pole pole/i to "−1" in STEP17-10, and then control goes to STEP17-11.

In STEP17-11, the intake air quantity control means 25 determines the switching function σ1 from the value thus determined of the pole pole/i, the intake difference Eq(k) in the present control cycle and the intake difference Eq(k−1) in the previous control cycle which have been determined in STEP15-6 according to the equation (10) (specifically, an equation similar to the equation (10) except that the coefficient parameters s1, s2 in the equation (10) are replaced respectively with "1" and "pole/i").

Using the value of the switching function σ1, the intake air quantity control means 25 calculates the equations (18), (19) (s1=1 in this case) to determine values of the reaching law input Θrch and the adaptive law input Θadp in the intake adaptive SLD control process in STEP17-12. Then, the intake air quantity control means 25 adds the determined values of the reaching law input Θrch and the adaptive law input Θadp thereby to determine the SLD opening corrective quantity i/sld in the present control cycle in STEP17-13. Then, control returns to the subroutine shown in FIG. 15.

In FIG. 15, if f/dec=1 in STEP15-7, i.e., if the present command value iglog for the ignition timing is more retarded than the threshold value IGX (see FIG. 12), then the intake air quantity control means 25 increments the ignition-timing-dependent opening corrective quantity θdec by the opening reduction unit quantity Δθdec determined in STEP14-2 in each control cycle in order to perform the ignition-timing-dependent correcting process in STEP15-9.

The ignition-timing-dependent opening corrective quantity θdec is initialized to "0" in the start mode process (STEP3-2).

When the processing in STEP15-9 is carried out, the process of determining the SLD opening corrective quantity i/sld is not performed, and the SLD opening corrective quantity i/sld is maintained at its value before the ignition timing determining flag f/dec is set to "1".

Then, the intake air quantity control means 25 adds the present value of the SLD opening corrective quantity i/sld to the standard opening command value θ0 and subtracts the present ignition-timing-dependent opening corrective quantity θdec therefrom for thereby calculating the preliminary opening command θi/fire (=θ0+i/sld−θdec) based on the amount-of-intake-air F/B control correcting process and the ignition-timing-dependent correcting process in STEP15-10.

Then, the intake air quantity control means 25 determines the present value of the learning calculation end flag f/flrnend in STEP15-11. While the FIRE mode is being carried out (while the FIRE mode execution on/off flag f/fireon is set to "1"), the learning calculation end flag f/flrnend" is set to 1 so as to finish the calculation of the basic learning corrective coefficient vpskisld when the FIRE mode starts being interrupted (when the FIRE interruption flag f/fpause is set to "1") or when the command value iglog for the ignition timing is more retarded than the threshold value IGX (see FIG. 12) and the ignition-timing-dependent correcting process is to begin (when the ignition timing determining flag f/dec is set to "1") (see STEP5-17 shown in FIG. 5 and STEP22-8 shown in FIG. 22).

If f/flrnend=0, i.e., if the basic learning corrective coefficient vpskisld is to be calculated, then the intake air quantity control means 25 calculates the basic learning corrective coefficient vpskisld as described with respect to the learning correcting process in STEP15-12.

Specifically, in each control cycle, the intake air quantity control means 25 determines the SLD intake corrective quantity gair/sld according to the equation (34) from the present SLD opening corrective quantity i/sld determined in STEP5-18, the present rotational speed Ne of the internal combustion engine 1, and the predetermined value Ga2, and accumulates the determined SLD intake corrective quantity gair/sld according to the equation (35) thereby to determine the SLD integrated intake corrective quantity qair/sld. Then, the intake air quantity control means 25 calculates the basic learning corrective coefficient vpskisld according to the equation (36) from the SLD integrated intake corrective quantity gair/sld and the target integrated amount qair/cmd of intake air in each control cycle determined in STEP16-10 (see FIG. 16).

Until the FIRE elapsed time t/fire reaches the SLD correction limit time TISLDLMT, since qair/cmd=0 (at this time, the SLD integrated intake corrective quantity qair/sld is also "0"), the intake air quantity control means 25 forcibly sets the value of the basic learning corrective coefficient vpskisld to "1".

If f/flrnend=1 in STEP15-11, i.e., if the calculation of the basic learning corrective coefficient vpskisld is to be ended, the processing in STEP15-12 is skipped, and the basic learning corrective coefficient vpskisld is not calculated (in this case, the basic learning corrective coefficient vpskisld determined in a control cycle before f/flrnend=1 is determined as its final value).

After the processing in STEP5-11, STEP5-12, the intake air quantity control means 25 limits the value of the preliminary opening command θi/fire determined in STEP15-10 to a value between predetermined upper and lower limit values (when θi/fire>the upper limit value or θi/fire<the lower limit value, the intake air quantity control means 25 forcibly limits θi/fire to the upper limit value and the lower limit value, respectively) in STEP15-13. Thereafter, control returns to the subroutine shown in FIG. 14.

In FIG. 14, after having determined the preliminary opening command θi/fire, the intake air quantity control means 25 multiplies the preliminary opening command θi/fire (=θ0+i/sld−θdec) by the atmospheric pressure corrective coefficient kpa and the atmospheric temperature corrective coefficient kta which have been determined in STEP14-2, and the learning corrective coefficient kilearn determined when the preceding FIRE mode is finished (the calculation of the learning corrective coefficient kilearn will be described later on) for thereby determining a command value θCMD for the bypass opening in the present control cycle in STEP14-4. Then, control goes back to the main routine shown in FIG. 3.

The processing described above serves to determine the command value θCMD for the bypass opening in each control cycle in the FIRE mode.

If the present value of the FIRE mode execution on/off flag f/fireon is "0" in STEP14-1, i.e., if the FIRE mode is not to be carried out (basically, this is a condition after the FIRE mode is ended when the FIRE elapsed time t/fire reaches the FIRE mode limit time TFIRELMT after the start of the internal combustion engine 1), then the intake air quantity control means 25 determines the value of the FIRE mode execution on/off flag f/fireon in the preceding control cycle in STEP14-5.

Figure 18:
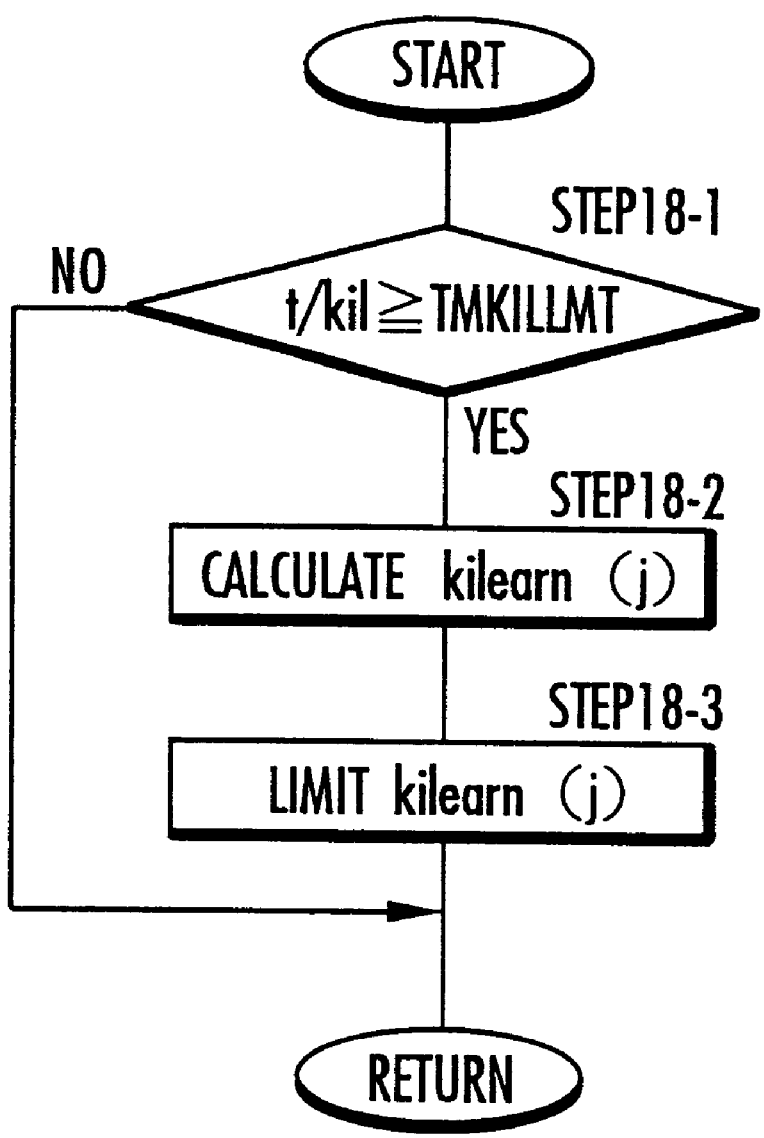
FIG. 18 is a flowchart of a subroutine in the processing sequence shown in FIG. 14.

If the value of the FIRE mode execution on/off flag f/fireon in the preceding control cycle is "1", i.e., if the FIRE mode has been performed up to the preceding control cycle, (i.e., immediately after the FIRE mode is completed), the learning corrective coefficient kilearn for correcting the opening command (STEP14-4) for a next FIRE mode is determined (updated) from the basic learning corrective coefficient vpskisld finally determined in STEP15-12 in the preceding FIRE mode in STEP14-6 according to a subroutine shown in FIG. 18.

As shown in FIG. 18, the intake air quantity control means 25 determines whether or not the learning end time parameter t/kil representing the FIRE elapsed time t/fire at the time the calculation of the basic learning corrective coefficient vpskisld is finally ended is greater than or equal to a predetermined value TMKILLMT in STEP18-1. As shown in FIG. 5, the learning end time parameter t/kil is the FIRE elapsed time t/fire when the learning calculation end flag f/flrnend switches from "0" to "1". When the FIRE mode is interrupted, the learning end time parameter t/kil is the FIRE elapsed time t/fire at the start of the interruption of the FIRE mode. When the ignition-timing-dependent correcting process is carried out during the FIRE mode, the learning end time parameter t/kil is the FIRE elapsed time t/fire at the start of the ignition-timing-dependent correcting process. When the FIRE mode is ended without the interruption of the FIRE mode or the ignition-timing-dependent correcting process, the learning end time parameter t/kil is the FIRE elapsed time t/fire, which is usually the FIRE mode limit time TFIRELMT, at the end of the FIRE mode.

Stated otherwise, the learning end time parameter t/kil is the FIRE elapsed time t/fire in which the calculation of the SLD opening corrective quantity i/sld and the corresponding correction of the standard opening command value θ0 are continuously carried out.

If t/kil<TMKILLMT in STEP18-1, then since the reliability of the finally obtained basic learning corrective coefficient vpskisld is considered to be poor, the learning corrective coefficient kilearn is maintained at the present value, and control returns to the subroutine shown in FIG. 14.

If t/kil≧TMKILLMT, i.e., if the calculation of the SLD opening corrective quantity i/sld and the corresponding correction of the standard opening command value θ0 are continuously carried out for a certain long period of time, a new learning corrective coefficient kilearn(j) is determined by the filtering process represented by the equation (37) from the basic learning corrective coefficient vpskisld finally obtained in the FIRE mode performed up to the preceding control cycle in STEP18-2. After the learning corrective coefficient kilearn(j) is forcibly limited to a value between predetermined upper and lower limit values (if kilearn(j) >the upper limit value, kilearn(j) is forcibly limited to the upper limit value, and if kilearn(j)<the lower limit value, kilearn(j) is forcibly limited to the lower limit value) in STEP18-3, control returns to the subroutine shown in FIG. 14.

The learning corrective coefficient kilearn(j) has an initial value of "1". The value of the learning corrective coefficient kilearn(j) is stored in a nonvolatile memory such as an EEPROM or the like so that it will not be lost even when the system is out of operation.

In FIG. 14, if the value of the FIRE mode execution on/off flag f/fireon in the preceding control cycle is "1" in STEP14-5, then the learning corrective coefficient kilearn is updated. If the value of the FIRE mode execution on/off flag f/fireon in the preceding control cycle is "0", then since the learning corrective coefficient kilearn has already been updated, the processing in STEP14-6 is skipped. Therefore, the learning corrective coefficient kilearn is updated only in a control cycle immediately after the FIRE mode is ended, and the updated learning corrective coefficient kilearn is used to correct the opening command for a next FIRE mode.

After having performing the processing in STEP14-5, STEP14-6, the intake air quantity control means 25 sets the opening command θCMD to an opening command for the normal mode in STEP14-7. This opening command is smaller than the opening command ECMD in the FIRE mode, and set to a given value for normally operating the internal combustion engine 1.

The processing described above with reference to FIGS. 14 through 18 is a detailed process for generating the opening command (the command value for the bypass opening) θCMD in each control cycle in STEP4-5 shown in FIG. 4. The opening command θCMD thus generated is given to the bypass valve actuator 24, which controls the opening of the bypass valve 7 according to the given opening command θCMD.

The process of generating the command value iglog for the ignition timing in STEP4-6 shown in FIG. 4 will be described below.

Prior to describing specific details of this process, a basic concept of the process will first be described below.

In the system according to the present embodiment, since the rotational speed Ne (actual rotational speed) of the internal combustion engine 1 tends to rise due to the above control process for increasing the amount of intake air in the FIRE mode, the rotational speed Ne is feedback-controlled at the target rotational speed ne/fire according to the ignition timing control rotational speed F/B control process to make the ignition timing retarded (the ignition timing control rotational speed F/B control process). At this time, as described later on, it is preferable that the rate of reduction (corresponding to the gain of the feedback control) of the difference between the rotational speed Ne and the target rotational speed ne/fire be established variably.

To this end, in the ignition timing control rotational speed F/B control process in the system according to the present embodiment, a sliding mode control process (an adaptive sliding mode control process according to this embodiment) which is a response designating control process capable of setting the rate of reduction of the difference to a desired rate, is employed as with the amount-of-intake-air F/B control correcting process.

In the present embodiment, an algorithm of the ignition-timing control rotational speed F/B control correcting process using the adaptive sliding mode control process (hereinafter referred to as an "ignition timing adaptive SLD control process"), e.g., the process of generating the command value iglog for the ignition timing to converge the rotational speed Ne to the target rotational speed ne/fire, is constructed as follows:

In this embodiment, an object to be controlled by the ignition timing adaptive SLD control process is considered to be a system for generating data representing the rotational speed Ne (actual rotational speed) from data representing the command value iglog for the ignition timing, and is expressed by a discrete-system (discrete-time system) model.

The difference DIG (=iglog−ig0, hereinafter referred to as an "ignition timing difference command value DIG") between the command value iglog for the ignition timing and a predetermined reference command value ig0 is used as data representing the command value iglog for the ignition timing, and the difference DNE (=Ne−Ne0, hereinafter referred to as a "difference rotational speed DNE") between the rotational speed Ne and a predetermined reference rotational speed Ne0 is used as data representing the rotational speed Ne.

The basic command value igbase (the command value for the ignition timing in the normal mode of operation of the internal combustion engine 1 other than the FIRE mode) shown in FIG. 3 is used as the reference command value ig0 for the ignition timing (ig0=igbase). Therefore, the corrective quantity DIG shown in FIG. 3 is the above ignition timing difference command value DIG. In this embodiment, the idling rotational speed NOBJ shown in FIG. 3 is used as the reference rotational speed relative to the rotational speed Ne (Ne0=NOBJ).

Using the ignition timing difference command value DIG and the difference rotational speed DNE, the model to be controlled by the ignition timing adaptive SLD control process is expressed by a discrete-system (discrete-time system) model (secondary autoregressive model) as represented by the following equation (38):

$$DNE(k+1) = c1 \cdot DNE(k) + c2 \cdot DNE(k-1) + d1 \cdot DIG(k) \qquad (38)$$

The model to be controlled as represented by the equation (38) (hereinafter referred to as a "rotational speed controlled model") expresses a difference rotational speed DNE(k+1) in each control cycle as an output of the rotational speed controlled model, using past time-series data DNE(K), DNE(k−1) of the difference rotational speed DNE and an ignition timing difference command value DIG(k) as an input of the rotational speed controlled model.

In the equation (38), coefficients c1, c2 relative to the respective difference rotational speeds DNE(K), DNE(k−1) and a coefficient d1 relative to the ignition timing difference command value DIG(k) are model parameters which define the actual behavioral characteristics of the rotational speed controlled model. These model parameters c1, c2, d1 are identified by experimentation and simulation so that the behavioral characteristics of the rotational speed controlled model and the behavioral characteristics of an actual controlled object expressed by the rotational speed controlled model will match each other.

Since the rotational speed controlled model is a discrete-system model, it is possible to identify the model parameters c1, c2, d1 relatively easily by using various known identifying algorithms, e.g., an algorithm for identifying the model parameters c1, c2, d1 according to the method of least squares in order to minimize the error between the difference rotational speed DNE(k+1) generated on the rotational speed controlled model and the actual difference rotational speed.

Based on the rotational speed controlled model thus constructed, an algorithm of the ignition timing adaptive SLD control process is constructed as follows:

In the ignition timing adaptive SLD control process, as in the intake adaptive sliding mode control process, a switching function σ2 required for the sliding mode control process is defined by a linear function according to the equation (39), shown below, where time-series data En(k), En(k−1) in each control cycle of the difference En=DNE−dne (hereinafter referred to as a "rotational speed difference En") between the difference rotational speed DNE and its target value dne are variables. The target value dne for the difference rotational speed DNE (hereinafter referred to as a "difference target rotational speed dne") is the difference (=ne/fire−Ne0) between the target rotational speed ne/fire shown in FIG. 3 and the reference rotational speed Ne0 (=idling rotational speed NOBJ). Therefore, the rotational speed difference En =DNE−dne is the same as the difference (=Ne−ne/fire) between the rotational speed Ne (actual rotational speed) and the target rotational speed ne/fire.

$$\sigma 2(k) = s3 \cdot (DNE(k) - dne(k)) + s4 \cdot (DNE(k-1) - dne(k-1))$$

$$= s3 \cdot En(k) + s4 \cdot En(k-1) \qquad (39)$$

where s3, s4 represent coefficient parameters of the terms of the switching function σ2, and are established to satisfy the following condition:

$$-1 < \frac{s4}{s3} < 1 \quad (40)$$

(when $s3 = 1$, $-1 < s4 < 1$)

In the present embodiment, s3=1 for the sake of brevity. The value of the coefficient parameter s4 (more generally, the value of s4/s3=pole/ig) is established variably, as described later on.

With the switching function σ2 defined as described above, as in the intake adaptive sliding mode control process, if state quantities (En(k), En(k−1)) comprising the set of the time-series data En(k), En(k−1) of the rotational speed difference En are converged onto a switching curve defined by σ2=0 and remain converged, then the state quantities (En(k), En(k−1)) can be converged to a balanced point on the switching curve σ2=0, i.e., a point where En(k)=En(k−1)=0, highly stably without being affected by disturbances.

In order to converge the difference rotational speed DNE to the difference target rotational speed dne, i.e., to converge the rotational speed Ne to the target rotational speed ne/fire, a control input generated by the ignition timing adaptive SLD control process as an input to be applied to the object to be controlled, which is modeled according to the equation (39), i.e., the ignition timing difference command value DIG, is the sum of an equivalent control input DIGeq, a reaching law input DIGrch, and an adaptive law input DIGadp, as in the intake adaptive sliding mode control process (see the following equation (41)).

$$DIG(k) = DIGeq(k) + DIGrch(k) + DIGadp(k) \quad (41)$$

As in the intake adaptive sliding mode control process, the equivalent control input DIGeq, the reaching law input DIGrch, and the adaptive law input DIGadp are given by the respective following equations (42) through (44):

$$DIGeq(k) = \frac{-1}{s3 \cdot d1} \cdot [(s3 \cdot (c1-1) + s4) \cdot DNE(k) + \quad (42)$$
$$(s3 \cdot c2 - s4) \cdot DNE(k-1) - s3 \cdot (dne(k+1) -$$
$$dne(k)) - s4 \cdot (dne(k) - dne(k-1))]$$
$$= \frac{-1}{s3 \cdot d1} \cdot [(s3 \cdot (c1-1) + s4) \cdot En(k) +$$
$$(s3 \cdot c2 - s4) \cdot En(k-1)] + \frac{-1}{d1} \cdot$$
$$[-dne(k+1) + c1 \cdot dne(k) + c2 \cdot dne(k-1)]$$

$$DIGrch(k) = \frac{-1}{s3 \cdot d1} \cdot F3 \cdot \sigma 2(k) \quad (43)$$

$$DIGadp(k) = \frac{-1}{s3 \cdot d1} \cdot F4 \cdot \sum_{i=0}^{k} \sigma 2(i) \quad (44)$$

A coefficient F3 in the equation (43), i.e., a coefficient for defining a gain relative to the reaching law, is established to satisfy the inequality (45) or more preferably (45)' shown below.

A coefficient F4 in the equation (44), i.e., a coefficient for defining a gain relative to the adaptive law, is established to satisfy the inequality (46) shown below where ΔT represents a control cycle (control period).

$$0 < F3 < 2 \quad (45)$$

-continued $$0 < F3 < 1 \quad (45)'$$

$$F4 = J' \cdot \frac{2 - F3}{\Delta T} \quad (46)$$

$$(0 < J' < 2)$$

In the ignition timing adaptive SLD control process, the equivalent control input DIGeq, the reaching law input DIGrch, and the adaptive law input DIGadp are determined according to the equations (42) through (44) in each control cycle, and their sum is calculated according to the equation (41) thereby to determine the ignition timing difference command value DIG. The ignition timing difference command value DIG is added to the reference command value ig0, i.e., the basic command value igbase in the normal operation of the internal combustion engine 1, according to the following equation (47) thereby to determine the command value iglog for the ignition timing:

$$iglog(k) = igbase(k) + DIG(k)$$
$$= igbase(k) + (DIGeq(k) + DIGrch(k) + DIGadp(k)) \quad (47)$$

The difference rotational speed dne required to determine the equivalent control input DIGeq and the value of the switching function a2 is determined as follows:

In this embodiment, when the rotational speed Ne (actual rotational speed) of the internal combustion engine 1 reaches the preset rotational speed (=NOBJ+NEFSLDS) shown in FIG. 3, or when the FIRE elapsed time t/fire reaches the predetermined value TSLDIGST, the ignition timing control rotational speed F/B control process is started. The target rotational speed ne/fire of the internal combustion engine 1 in the FIRE mode is determined according to the following equation (48) depending on an elapsed time Δt/nfb (hereinafter referred to as a "rotational speed F/B elapsed time Δt/nfb") from the start of the ignition timing control rotational speed F/B control process:

$$ne/fire(k) = NOBJ + NEFSLDS - K/NE \cdot \Delta t / nfb \quad (48)$$

$$\left( \text{if } \Delta t/nfb \geq \frac{NEFSLDS}{K/NE}, \text{ then } ne/fire(k) = NOBJ \right)$$

where K/NE represents a predetermined value (>0) which defines the degree at which the target rotational speed ne/fire decreases with time (gradient).

If the calculated result of the right-hand side of the equation (48) is lower than the idling rotational speed NOBJ (Δt/nfb>NEFSLDS/K/NE), then the target rotational speed ne/fire is fixed to the idling rotational speed NOBJ.

Thus, after the ignition timing control rotational speed F/B control process has started, the target rotational speed ne/fire gradually decreases linearly from the preset rotational speed (=NOBJ+NEFSLDS) toward the idling rotational speed NOBJ. After the target rotational speed ne/fire has reached the idling rotational speed NOBJ, the target rotational speed ne/fire is maintained at the idling rotational speed NOBJ.

Therefore, the target rotational speed ne/fire(k) in each control cycle is determined from the rotational speed F/B elapsed time Δt/nfb in the control cycle according to the equation (48). By subtracting the idling rotational speed NOBJ from the target rotational speed ne/fire(k), the difference target rotational speed dne(k) (=ne/fire(k)−NOBJ) in each control cycle is determined. Using the difference target rotational speed dne(k) and its preceding value dne(k−1) (=ne/fire(k−1)−NOBJ), i.e., the difference target rotational speed dne(k−1) determined in the preceding control cycle, the value of the switching function σ2(k) can be determined in each control cycle according to the equation (39). Using the value of the switching function σ2, the reaching law input DIGrch and the adaptive law input DIGadp can be determined according to the respective equations (43), (44).

In this embodiment, since the control cycle (TDC) is inversely proportional to the rotational speed Ne, the rotational speed F/B elapsed time (=Δt/nfb+ΔT) in a next control cycle can be predicted (hereinafter referred to as a "rotational speed F/B predicted elapsed time Δt/nfbpre") by determining a time ΔT ( 1/Ne) of one control cycle from the present rotational speed Ne and adding the time ΔT to the present rotational speed F/B elapsed time Δt/nfb. By applying the rotational speed F/B predicted elapsed time Δt/nfbpre to the equation (48), i.e., putting Δt/nfbpre in Δt/nfb in the right-hand side of the equation (48), it is possible to determine a target rotational speed ne/fire(k+1) in the next control cycle according to the following equation (49):

$$ne/fire(k+1) = NOBJ + NEFSLDS - K/NE \cdot \Delta t / nfbpre \quad (49)$$

$$\left(\text{if } \Delta t/nfbpre \geq \frac{NEFSLDS}{K/NE}, \text{ then } ne/fire(k) = NOBJ\right)$$

By subtracting the idling rotational speed NOBJ from the target rotational speed ne/fire(k+1), it is possible to determine a difference target rotational speed dne(k+1) (=ne/fire (k+1)−NOBJ) in the next control cycle.

So it is possible to determine the equivalent control input DIGeq, by applying the difference-target rotational speed dne(k+1), dne(k) and dne(k−1) determined as above to the equation (42).

While the FIRE mode is being interrupted, the ignition timing control rotational speed F/B control process is interrupted, and the command value iglog for the ignition timing is returned to the basic command value igbase in the normal operation of the internal combustion engine 1. Specifically, after the start of the interruption of the FIRE mode, the value (absolute value) of the ignition timing difference command value DIG according to the equation (47) is reduced by a predetermined unit value dec/ig in each control cycle until it becomes "0", i.e., gradually reduced to "0", for thereby returning the command value iglog for the ignition timing gradually to the basic command value igbase. When the interruption of the FIRE mode is canceled, the ignition timing control rotational speed F/B control process is immediately resumed.

In this embodiment, the command value iglog for the ignition timing is gradually returned to the basic command value igbase also when the FIRE mode is ended (the FIRE mode execution on/off flag f/fireon changes from "1" to "0") and the operation mode of the system is shifted to the normal mode.

The basic concept of the ignition timing control rotational speed F/B control process has been described above.

In the ignition timing adaptive SLD control process which is a response designating control process, the rate of reduction of the rotational speed difference En (=DNE−dne=Ne−ne/fire) can be designated by the value of the ratio (s4/s3) (hereinafter referred to as a "pole pole/ig") of the coefficient parameters s3, s4 of the switching function σ2. As the absolute value of the pole pole/ig (=s4/s3) approaches "0" within a range smaller than "1", the rate of reduction of the rotational speed difference En becomes higher. As with the intake adaptive SLD control process, s4/s3=pole/ig<0 in order to avoid an oscillatory attenuation of the rotational speed difference En.

In this embodiment, using the response designating characteristics of the ignition timing adaptive SLD control process, the rate of reduction of the rotational speed difference En is established variably as follows:

A change in the rotational speed Ne of the internal combustion engine 1 with respect to a change in the ignition timing tends to be greater as the ignition timing is more retarded. Therefore, in order to control the rotational speed Ne stably at the target rotational speed ne/fire, it is preferable that the rate of reduction of the rotational speed difference En be lower (the absolute value of the pole pole/ig be greater) as the ignition timing which is controlled is more retarded.

Figure 19:
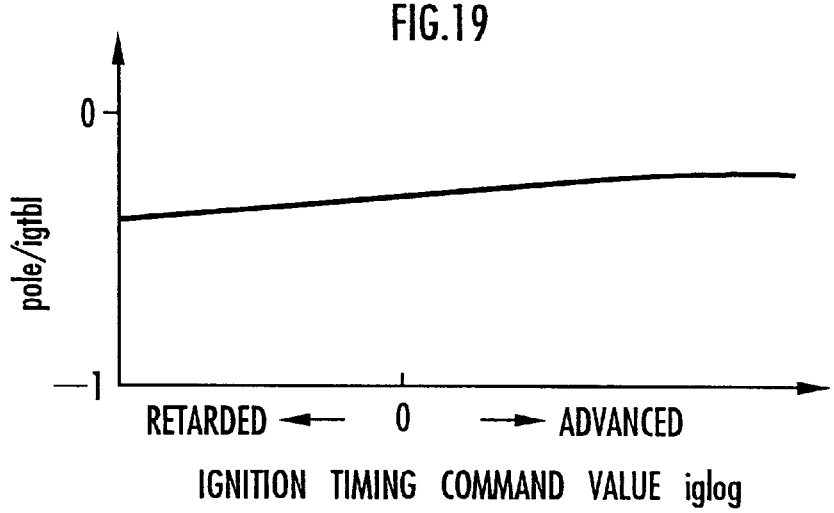
FIG. 19 is a diagram illustrative of an operation of the control system shown in FIG. 1.

In each control cycle, therefore, a basic value pole/igtbl of the pole pole/ig is determined based on a data table shown in FIG. 19 from the present command value iglog for the ignition timing (the command value iglog determined in the preceding control cycle) in each control cycle, and the basic value pole/igtbl is established as the value of the pole pole/ig. The basic value pole/igtbl (hereinafter referred to as an "ignition-timing-dependent pole basic value pole/igtbl") is established such that its absolute value |pole/igtbl| is greater as the command value iglog for the ignition timing is more retarded (−1<pole/igtbl<0).

The ignition-timing-dependent pole basic value pole/igtbl is basically established so as to be closer to "0" than the pole table value pole/itbl determined by the data table shown in FIG. 9 with respect to the intake adaptive SLD control process. Stated otherwise, the ignition-timing-dependent pole basic value pole/igtbl is established such that the rate of reduction of the rotational speed difference En defined by the ignition-timing-dependent pole basic value pole/igtbl in relation to the ignition timing adaptive SLD control process is greater than the rate of reduction of the intake difference Eq defined by the pole table value pole/itbl in relation to the intake adaptive SLD control process.

In this embodiment, before the ignition timing control rotational speed F/B control process is started, if the ignition timing is varied abruptly in order to converge the rotational speed Ne to the target rotational speed ne/fire according to the ignition timing adaptive SLD control process, then the combustion status of the internal combustion engine 1 may possibly be impaired. Therefore, in an initial stage of the ignition timing control rotational speed F/B control process, the value of the pole pole/ig should preferably be established to make the rate of reduction of the rotational speed difference En somewhat slow.

Figure 20:
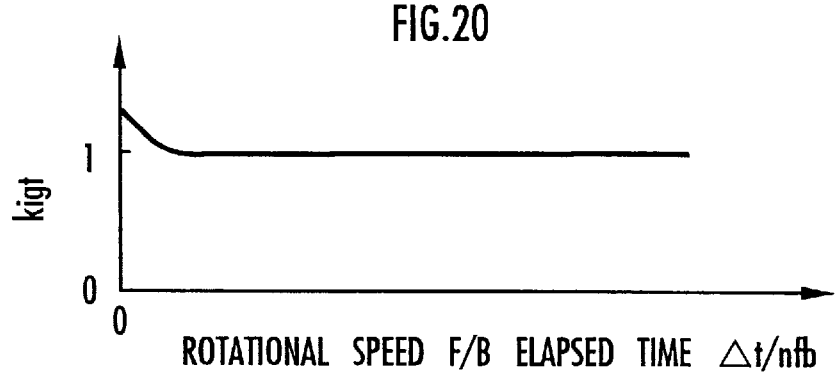
FIG. 20 is a diagram illustrative of an operation of the control system shown in FIG. 1.

Consequently, in each control cycle, a corrective coefficient kigt for correcting (by multiplication) the ignition-timing-dependent pole basic value pole/igtbl depending on the rotational speed F/B elapsed time Δt/nfb is determined based on a predetermined data table (time table) shown in FIG. 20 from the rotational speed F/B elapsed time Δt/nfb (the time elapsed from the start of the ignition timing control rotational speed F/B control process). Then, the ignition-timing-dependent pole basic value pole/igtbl is corrected by being multiplied by the corrective coefficient kigt (hereinafter referred to as a "time-dependent corrective coefficient kigt").

In the data table shown in FIG. 20, in an initial stage of the ignition timing control rotational speed F/B control process, i.e., until the rotational speed F/B elapsed time Δt/nfb reaches a predetermined value T/NFBX, the time-dependent corrective coefficient kigt is determined to be of a value (>1) so as to correct the ignition-timing-dependent pole basic value pole/igtbl in a direction to slightly increase the absolute value of the ignition-timing-dependent pole basic value pole/igtbl, i.e., in a direction to lower the rate of reduction of the rotational speed difference En. The time-dependent corrective coefficient kigt is also established such that it is of a greater value as the rotational speed F/B elapsed time Δt/nfb is shorter. Therefore, the ignition-timing-dependent pole basic value pole/igtbl is corrected so as to increase the absolute value of the ignition-timing-dependent pole basic value pole/igtbl, i.e., to lower the rate of reduction of the rotational speed difference En, as the rotational speed F/B elapsed time Δt/nfb is shorter. After the rotational speed F/B elapsed time Δt/nfb has reached the predetermined value T/NFBX, the time-dependent corrective coefficient kigt is maintained at "1", and the ignition-timing-dependent pole basic value pole/igtbl is not corrected.

Furthermore, while the FIRE mode is being interrupted, the ignition timing control rotational speed F/B control process is interrupted, and the rotational speed Ne is not feedback-controlled. Consequently, the interruption of the FIRE mode is canceled. When the ignition timing control rotational speed F/B control process is resumed, the rotational speed Ne of the internal combustion engine 1 may possibly be much higher than the target rotational speed ne/fire. However, since the rotational speed difference En is large in this condition, the command value iglog for the ignition timing determined as described above according to the ignition timing control rotational speed F/B control process abruptly becomes excessively retarded, resulting in an impaired combustion status of the internal combustion engine 1. Accordingly, when the ignition timing control rotational speed F/B control process is resumed by canceling the interruption of the FIRE mode, as long as the rotational speed Ne of the internal combustion engine 1 is much higher than the target rotational speed ne/fire, it is preferable to reduce the rate of reduction of the rotational speed difference En and avoid the determination of the ignition timing difference command value DIG which would make the command value iglog for the ignition timing excessively retarded.

Therefore, in each control cycle, a corrective coefficient kigne (hereinafter referred to as a "rotational-speed-dependent corrective coefficient kigne") for correcting (by multiplication) the ignition-timing-dependent pole basic value pole/igtbl dependent on the rotational speed Ne is determined based on a predetermined data table shown in FIG. 21 from the present rotational speed Ne of the internal combustion engine 1 in each control cycle. In the data table shown in FIG. 21, the rotational-speed-dependent corrective coefficient kigne is basically determined to be of a value (>1) so as to correct the ignition-timing-dependent pole basic value pole/igtbl in a direction to increase the absolute value of the ignition-timing-dependent pole basic value pole/igtbl, i.e., in a direction to lower the rate of reduction of the rotational speed difference En, as the rotational speed Ne is higher, i.e., as the rotational speed Ne is higher than the target rotational speed ne/fire. In order to correct the ignition-timing-dependent pole basic value pole/igtbl for a predetermined period XCNT, which is an initial value of the count-down timer cnt/igvpl in STEP5-18 shown in FIG. 5, after the ignition timing control rotational speed F/B control process is resumed, the rotational-speed-dependent corrective coefficient kigne is corrected according to the equation (50), shown below. The ignition-timing-dependent pole basic value pole/igtbl is corrected by being multiplied by the corrected rotational-speed-dependent corrective coefficient kignef (hereinafter referred to as a "rotational-speed-dependent corrected corrective coefficient kignef").

$$kignef = 1 + (kigne - 1) \cdot \frac{cnt/igvpl}{XCNT} \quad (50)$$

The count-down timer cnt/igvpl in the equation (50) is set to the predetermined period XCNT at all times during the interruption of the FIRE mode (FIRE interruption flag f/fpause=1) in STEP5-18 shown in FIG. 5. When the ignition timing control rotational speed F/B control process is resumed by canceling the interruption of the FIRE mode, the value of the count-down timer cnt/igvpl decremented by a predetermined value from the value of the predetermined period XCNT in each control cycle until finally it becomes "0", after which the count-down timer cnt/igvpl is maintained at "0". Therefore, the rotational-speed-dependent corrected corrective coefficient kignef determined by the equation (50) is of a value (≧1) dependent on the rotational speed Ne after the ignition timing control rotational speed F/B control process is resumed until the predetermined period XCNT elapses. After elapse of the predetermined period XCNT, kignef=1 (at this time, the ignition-timing-dependent pole basic value pole/igtbl is not corrected by the rotational-speed-dependent corrected corrective coefficient kignef.

The count-down timer cnt/igvpl is initialized to "0" in the start mode process (STEP3-2), and is maintained at "0" during the interruption of the FIRE mode and after the interruption of the FIRE mode is ended until the predetermined period XCNT elapses.

In this embodiment, in each control cycle, a value produced by multiplying the ignition-timing-dependent pole basic value pole/igtbl determined as described above by the time-dependent corrective coefficient kigt and the rotational-speed-dependent corrected corrective coefficient kignef according to the following equation (51) is established as the final value of the pole pole/ig:

$$pole/ig = pole/igtbl \cdot kigt \cdot kignef \quad (51)$$

The time-dependent corrective coefficient kigt is kigt>1 only in an initial stage right after the start of the ignition timing control rotational speed F/B control process, and kigt=1 otherwise. The rotational-speed-dependent corrected corrective coefficient kignef is kignef>1 only in an initial stage immediately after the interruption of the FIRE mode is canceled and when the rotational speed Ne is relatively high, and kignef=1 otherwise. Therefore, the value of the pole pole/ig established by the equation (51) is normally represented by the ignition-timing-dependent pole basic value pole/igtbl.

Based on the details described above, the process of generating the command value iglog for the ignition timing, which is carried out by the ignition timing control means 26 in STEP4-6, will be described in specific detail below.

Figure 22:
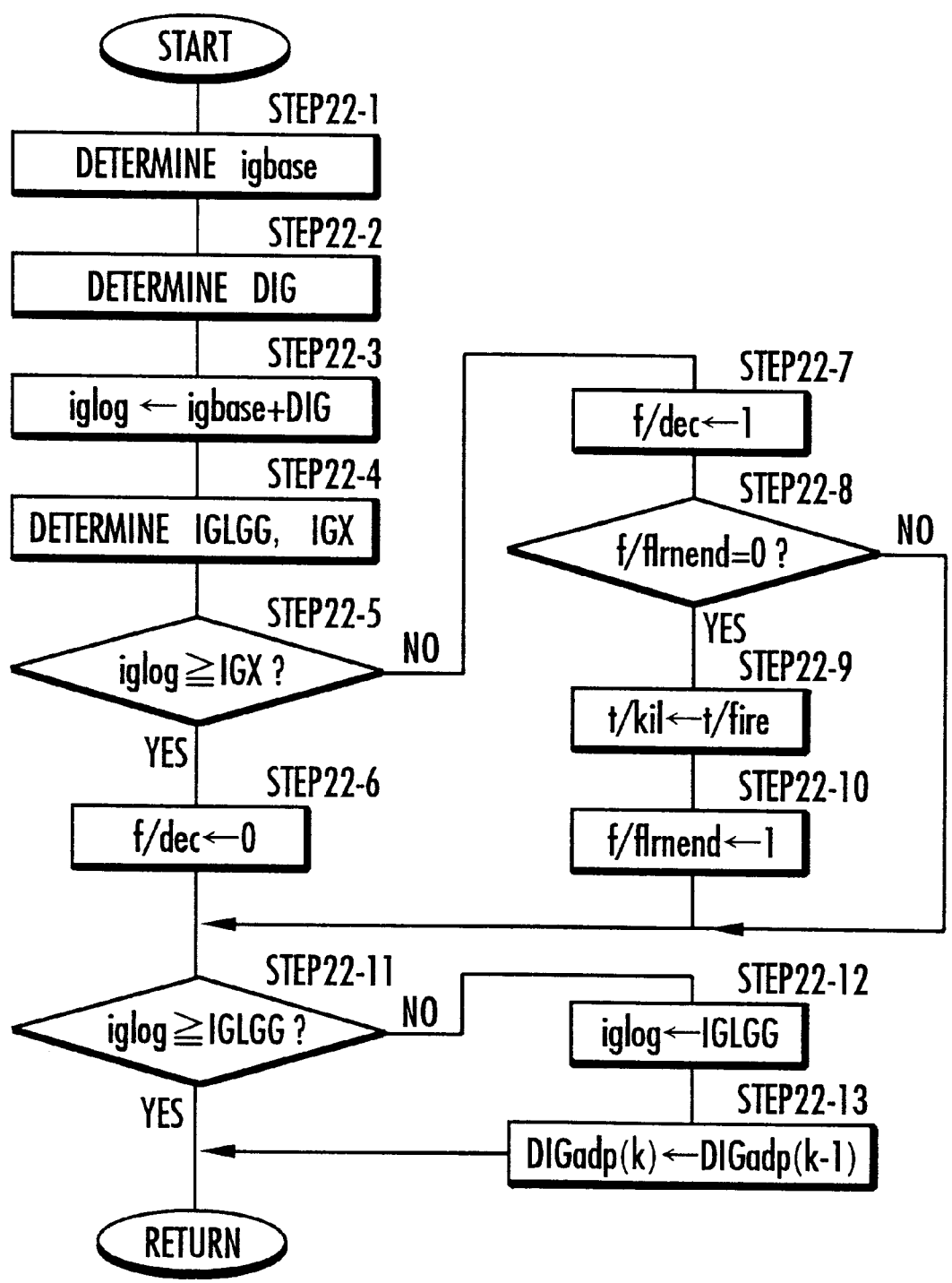
FIG. 22 is a flowchart of the processing sequence of a step in the main routine shown in FIG. 4.

The processing in STEP4-6 is illustrated as a subroutine shown in FIG. 22. As shown in FIG. 22, the ignition timing control means 26 first determines a basic command value igbase for the ignition timing in STEP22-1. The basic command value igbase is determined according to predetermined maps and equations from the present rotational speed Ne, the intake pressure Pb, the engine temperature Tw, and the atmospheric temperature Ta, etc.

Figure 23:
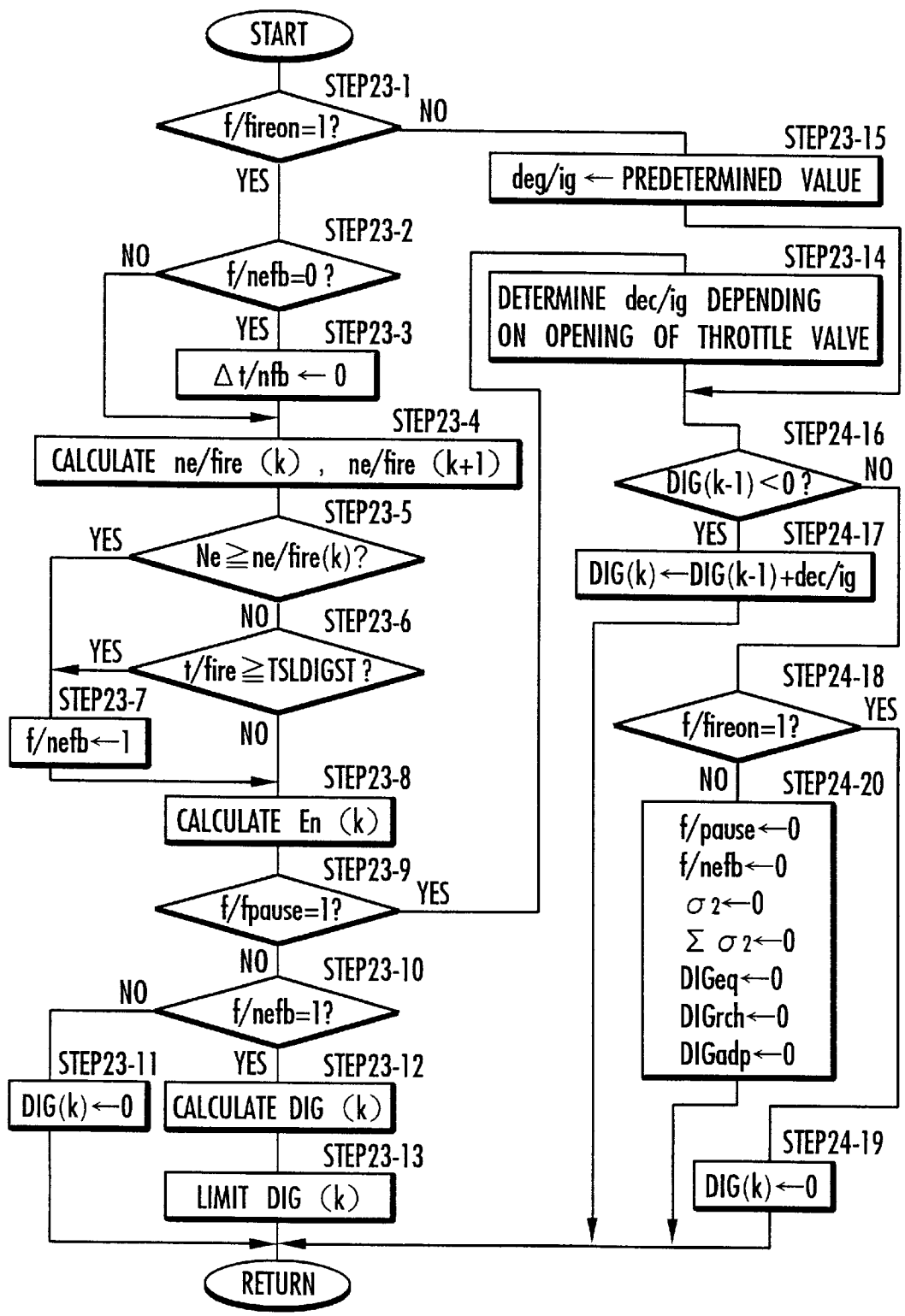
FIG. 23 is a flowchart of a subroutine in the processing sequence shown in FIG. 22.

Then, the ignition timing control means 26 carries out a process of determining the ignition timing difference command value DIG according to a subroutine shown in FIG. 23 in STEP22-2.

First, the ignition timing control means 26 determines the present value of the FIRE mode execution on/off flag f/fireon in STEP23-1.

If f/fireon=1, i.e., if the FIRE mode is to be carried out, then the ignition timing control means 26 determines the value of a flag f/nefb (hereinafter referred to as a "rotational speed F/B execution on/off flag f/nefb") in STEP23-2. The rotational speed F/B execution on/off flag f/nefb is "1" when the ignition timing control rotational speed F/B control process is to be performed, and "0" when the ignition timing control rotational speed F/B control process is not to be performed.

The rotational speed F/B execution on/off flag f/nefb is initialized to "0" in the start mode process (STEP4-2).

If f/nefb=0, i.e., if the ignition timing control rotational speed F/B control process is not to be performed, in STEP23-2, then the ignition timing control means 26 initializes the rotational speed F/B elapsed time $\Delta t/nfb$ to "0" in STEP23-3. The rotational speed F/B elapsed time $\Delta t/nfb$ starts being measured from a control cycle in which f/nefb=1 in STEP23-2 and the ignition timing control rotational speed F/B control process is to be performed. If f/nefb=1 in STEP23-2, the processing in STEP23-3 is skipped.

Then, the ignition timing control means 26 determines a target rotational speed ne/fire(k) in the present control cycle and a target rotational speed ne/fire(k+1) in the next control cycle in STEP23-4. The target rotational speed ne/fire(k) in the present control cycle is determined from the present rotational speed F/B elapsed time $\Delta t/nfb$ according to the equation (48). The target rotational speed ne/fire(k+1) in the next control cycle is determined as follows: The time $\Delta T$ of one control cycle recognized from the present rotational speed Ne of the internal combustion engine 1 (the detected value of the rotational speed sensor 14) is added to the present rotational speed F/B elapsed time $\Delta t/nfb$ thereby to determine a rotational speed F/B predicted elapsed time $\Delta t/nfbpre$, and the target rotational speed ne/fire(k+1) is determined from the rotational speed F/B predicted elapsed time $\Delta t/nfbpre$ according to the equation (49).

The target rotational speed ne/fire(k) in the present control cycle is the preset rotational speed (NOBJ+NEFSLDS) while the rotational speed F/B elapsed time $\Delta t/nfb$ is being set to "0" (f/nefb=0) in STEP23-3.

Then, the ignition timing control means 26 determines whether or not the present rotational speed Ne is equal to or higher than the present target rotational speed ne/fire(k) in STEP23-5, and then whether or not the present FIRE elapsed time t/fire is equal to or greater than the predetermined value TSLDIGST in STEP23-6.

If either one of the conditions in STEP23-5, STEP23-6 is satisfied, then the ignition timing control means 26 sets the value of the rotational speed F/B execution on/off flag f/nefb to "1" in STEP23-7. Thus, after the FIRE mode has started, when the rotational speed Ne reaches the preset rotational speed (NOBJ+NEFSLDS) or when the FIRE elapsed time t/fire reaches the predetermined value TSLDIGST, the rotational speed F/B execution on/off flag f/nefb is set to "1", making it possible to perform the ignition timing control rotational speed F/B control process.

If neither one of the conditions in STEP23-5, STEP23-6 is satisfied, then the processing in STEP23-7 is skipped, and the rotational speed F/B execution on/off flag f/nefb is maintained at "0". After the rotational speed F/B execution on/off flag f/nefb has been set to "1", it will not be returned to "0" while in the FIRE mode.

Then, the ignition timing control means 26 calculates the present rotational speed difference En(k) (=Ne−ne/fire(k)) in the present control cycle from the present rotational speed Ne and the present target rotational speed ne/fire(k) determined in STEP23-4 in STEP23-8.

Thereafter, the ignition timing control means 26 determines the value of the FIRE interruption flag f/fpause in STEP23-9. If f/fpause=0, i.e., if the FIRE mode is not to be interrupted, then the ignition timing control means 26 determines the value of the rotational speed F/B execution on/off flag f/nefb in STEP23-10.

If f/nefb=0, then the ignition timing control means 26 sets the value of the ignition timing difference command value DIG(k) in the present control cycle to "0" in STEP23-11. Thereafter, control returns to the subroutine shown in FIG. 22.

If f/nefb=1 in STEP23-10, then the ignition timing control means 26 calculates the ignition timing difference command value DIG(k) for the ignition timing control rotational speed F/B control process in STEP23-12.

Figure 24:
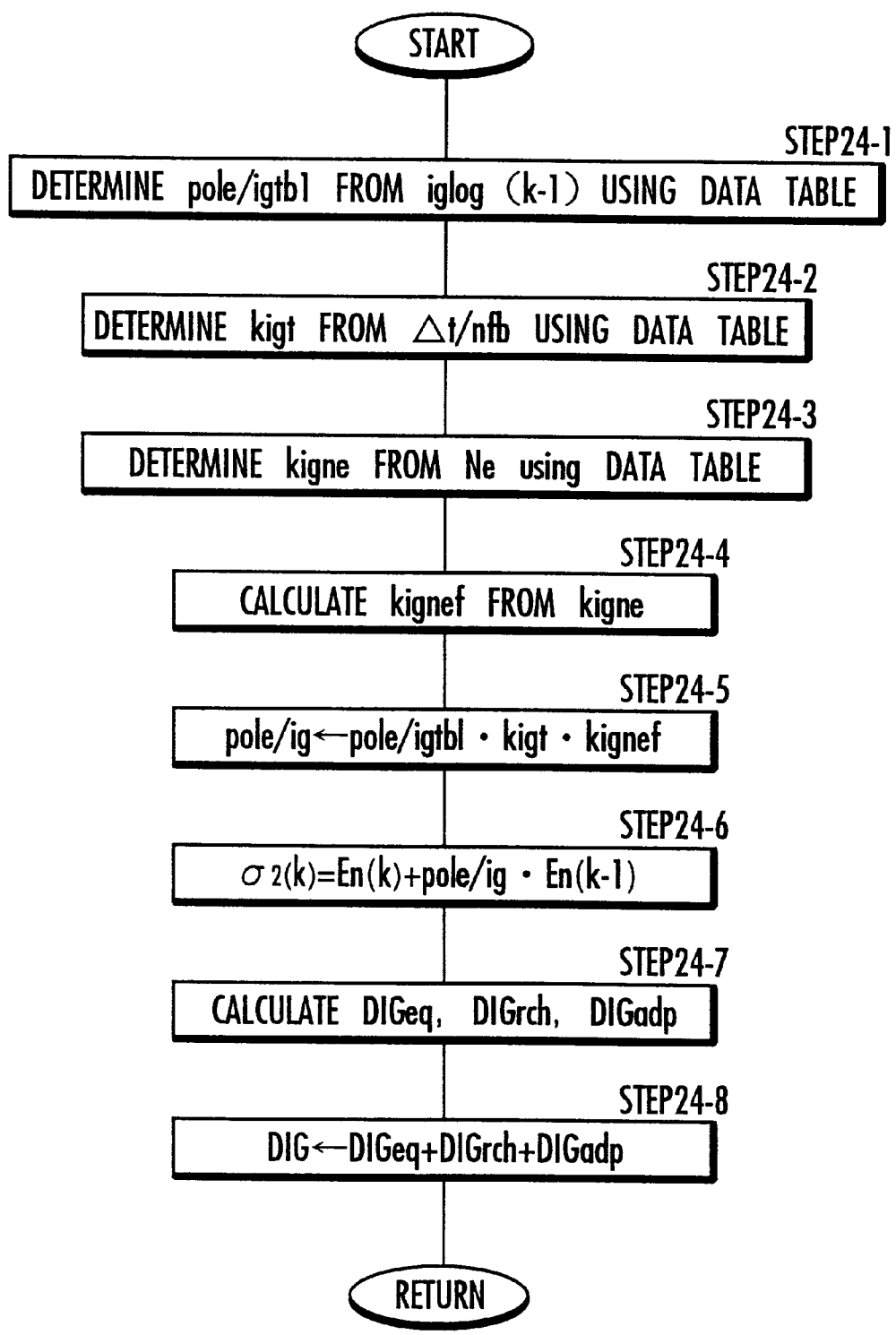
FIG. 24 is a flowchart of a subroutine in the subroutine shown in FIG. 23.

The ignition timing difference command value DIG(k) is calculated as follows:

In a subroutine shown in FIG. 24, the ignition timing control means 26 determines the ignition-timing-dependent pole basic value pole/igtbl according to the data table shown in FIG. 19 from the present command value iglog(k−1) for the ignition timing (the command value determined in the preceding control cycle) in STEP24-1.

The ignition timing control means 26 determines the time-dependent corrective coefficient kigt from the present rotational speed F/B elapsed time $\Delta t/nfb$ according to the data table shown in FIG. 20 in STEP24-2.

Figure 21:
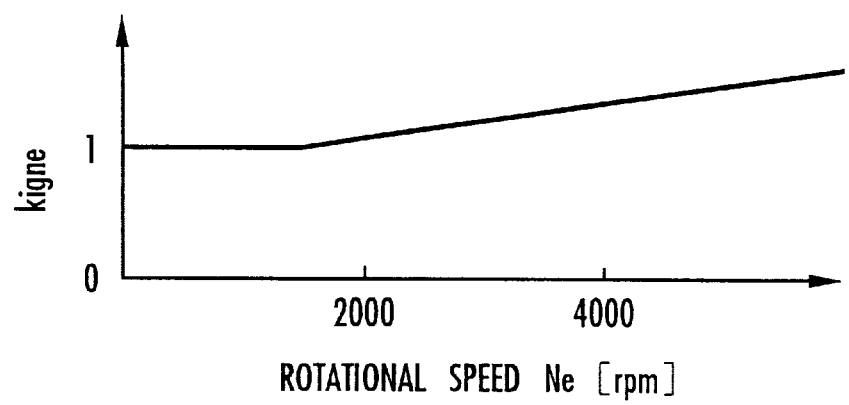
FIG. 21 is a diagram illustrative of an operation of the control system shown in FIG. 1.

The ignition timing control means 26 determines the rotational-speed-dependent corrective coefficient kigne from the present rotational speed Ne according to the data table shown in FIG. 21 in STEP24-3. Then, the ignition timing control means 26 determines the rotational-speed-dependent corrected corrective coefficient kignef according to the equation (50) from the rotational-speed-dependent corrective coefficient kigne, the present value of the count-down timer cnt/igvpl, and the predetermined period XCNT as the initial value of the count-down timer cnt/igvpl after the end of the interruption of the FIRE mode in STEP24-4.

The ignition timing control means 26 multiplies the ignition-timing-dependent pole basic value pole/igtbl determined in STEP24-1 by the time-dependent corrective coefficient kigt determined in STEP24-2 and the rotational-speed-dependent corrected corrective coefficient kignef determined in STEP24-4, i.e., calculates the equation (51), for thereby determining the value of the pole pole/ig in the present control cycle in STEP24-5.

Thereafter, the ignition timing control means 26 determines the switching function σ2(k) in the present control cycle according to the equation (39) from the rotational speed differences En(k), En(k−1) determined in STEP23-8 in the present and preceding control cycles and the present value of the pole pole/ig determined in STEP24-5 in STEP24-6. The coefficient parameters s3, s4 in the equation (39) are "1", "pole/ig", respectively.

Then, the ignition timing control means 26 determines the equivalent control input DIGeq, the reaching law input DIGrch, and the adaptive law input DIGadp in the present control cycle according to the equations (42) through (44) in STEP24-7.

More specifically, for determining the equivalent control input DIGeq, the ignition timing control means 26 determines differences of the target rotational speeds ne/fire(k), ne/fire(k+1), which have been determined in STEP23-4 in the present control cycle, and the target rotational speed ne/fire(k−1), which has been determined in STEP23-4 in the preceding control cycle, from the reference rotational speed Ne0 (=the idling rotational speed NOBJ), i.e., determines the difference rotational speeds dne(k), dne(k+1), dne(k−1). The ignition timing control means 26 then calculates the equation (42) to determine the equivalent control input DIGeq (k), using the difference rotational speeds dne(k), dne(k+1), dne(k−1), the rotational speed differences En(k), En(k−1) determined in STEP23-8 in the present and preceding control cycles, and the present value of the pole pole/ig determined in STEP24-5. The coefficient parameters s3, s4 in the equation (42) are "1", "pole/ig", respectively. The model parameters c1, c2, d1 in the equation (42) are of predetermined values identified in advance with respect to the rotational speed controlled model (see the equation (38)).

For determining the reaching law input DIGrch, the ignition timing control means 26 calculates the equation (43) using the value of the switching function σ2(k) determined in STEP24-6 to determine the reaching law input DIGrch(k). The coefficient parameter s3 in the equation (43) is "1", and the coefficient F3 in the equation (43) is a value preset to satisfy the condition of the equation (45) or (45)'.

For determining the adaptive law input DIGadp, the ignition timing control means 26 accumulates the value of the switching function σ2 determined in each control cycle in STEP24-6 in successive control cycles to determine an integrated value Σσ2 of the switching function σ2. Using the integrated value Σσ2, the ignition timing control means 26 calculates the equation (44) to determine the adaptive law input DIGadp. The coefficient parameter s3 in the equation (44) is "1", and the coefficient F4 in the equation (44) is a value preset to satisfy the condition of the equation (46).

After having determined the equivalent control input DIGeq, the reaching law input DIGrch, and the adaptive law input DIGadp in the manner described above, the ignition timing control means 26 calculates their sum according to the equation (41) thereby to determine the ignition timing difference command value DIG(k) in the present control cycle in STEP24-8. Thereafter, control goes back to the subroutine shown in FIG. 23.

In FIG. 23, after having calculated the ignition timing difference command value DIG(k) in STEP23-12, the ignition timing control means 26 limits the value of the ignition timing difference command value DIG(k) to a value between predetermined upper and lower limit values (when DIG(k) >the upper limit value or DIG(k)<the lower limit value, the ignition timing control means 26 forcibly limits DIG(k) to the upper limit value and the lower limit value, respectively) in STEP23-13. Then, control returns to the subroutine shown in FIG. 22.

If f/fpause=1 in STEP23-9, i.e., if the FIRE mode is to be interrupted, then the ignition timing control means 26 interrupts the ignition timing control rotational speed F/B control process. In order to return the command value iglog for the ignition timing gradually to the basic command value igbase, i.e., to return the ignition timing difference command value DIG gradually to "0", the ignition timing control means 26 determines a unit value dec/ig for defining the amount by which the command value iglog is to be returned in each control cycle (>0, hereinafter referred to as an "ignition timing returning unit value dec/ig") in STEP23-14.

If f/fireon=0 in STEP23-1, i.e., if the FIRE mode is to be ended or not to be carried out, then the ignition timing control means 26 determines an ignition timing returning unit value dec/ig in order to return the command value iglog for the ignition timing gradually to the basic command value igbase in STEP23-15.

In STEP23-15, the ignition timing returning unit value dec/ig is set to a predetermined value (constant value). The ignition timing returning unit value dec/ig established in STEP23-14 for interrupting the FIRE mode is determined to be a value proportional to the present opening of the throttle valve 5 (the ignition timing returning unit value dec/ig greater as the opening of the throttle valve 5 is greater).

The reason for the above ignition timing returning unit value dec/ig is as follows: The FIRE mode is interrupted basically when the accelerator pedal of the vehicle is depressed to run the vehicle or race the internal combustion engine 1. At this time, the opening of the throttle valve 5 is controlled at the opening depending o the accelerator manipulated quantity Ap. When the opening of the throttle valve 5 is large, it is preferable to return the ignition timing as quickly as possible to a normal ignition timing (which corresponds to the basic command value igbase) in order to keep a desired power output capability of the internal combustion engine 1. In STEP23-14, therefore, the ignition timing returning unit value dec/ig is determined to be a value proportional to the opening of the throttle valve 5.

The opening command given from the controller to the throttle valve actuator 23 or the detected value of the opening by a sensor (not shown) is used as the opening of the throttle valve 5 which is required to determine the ignition timing returning unit value dec/ig.

After having determined the ignition timing returning unit value dec/ig, the ignition timing control means 26 then determines whether the present value of the ignition timing difference command value DIG (which is the ignition timing difference command value DIG(k−1) determined in the preceding control cycle) is smaller than "0" or not, i.e., whether the present value of the ignition timing difference command value DIG is a retarded value or not, in STEP24-16.

If DIG(k−1)<0, i.e., if DIG(k−1) is of a retarded value, then the ignition timing control means 26 determines the sum (DIG(k−1)+dec/ig) of the present ignition timing difference command value DIG(k−1) and the ignition timing returning unit value dec/ig determined in STEP24-14 or 24-15 as an ignition timing difference command value DIG(k) in the present control cycle in STEP24-17. Then, control returns to the subroutine shown in FIG. 22. The upper limit for the ignition timing difference command value DIG(k) is set to "0", and if (DIG(k−1)+dec/ig) is greater than "0", then the value of the ignition timing difference command value DIG(k) is forcibly set to "0".

If DIG(k−1)≧0 (essentially DIG(k−1)=0) in STEP24-16, then the ignition timing control means 26 determines the value of the FIRE mode execution on/off flag f/fireon in STEP24-18. If f/fireon=1 (the FIRE mode is being interrupted), then the ignition timing control means 26 sets the ignition timing difference command value DIG(k) in the present control cycle to "0" in STEP24-19, after which control returns to the subroutine shown in FIG. 22.

While the FIRE mode is being interrupted (f/fireon=1 and f/fpause=1), the value of the integrated value Σσ2 of the switching function σ2 is held as the value immediately prior to the interruption of the FIRE mode.

If f/fireon=0 in STEP24-18, i.e., if the FIRE mode is ended, then the ignition timing control means 26 resets the values of the FIRE interruption flag f/fpause and the rotational speed F/B execution on/off flag f/nefb to "0", and initializes the ignition timing difference command value DIG(k), the value of the switching function σ2 and its integrated value Σσ2, the value of the equivalent control input DIGeq, the value of the reaching law input DIGrch, and the value of the adaptive law input DIGadp to "0" in STEP24-20. Thereafter, control returns to the subroutine shown in FIG. 22.

In FIG. 22, after having determined the ignition timing difference command value DIG in STEP22-2, the ignition timing control means 26 adds the ignition timing difference command value DIG determined in STEP22-2 to the basic command value igbase determined in STEP22-1 for thereby determining a command value iglog for the ignition timing in the present control cycle in STEP22-3.

Then, the ignition timing control means 26 determines the retarded limit value IGLGG for the ignition timing and the threshold value IGX that is slightly more advanced than the retarded limit value IGLGG as shown in FIG. 12 with respect to the ignition-timing-dependent correcting process carried out by the intake air quantity control means 25 in STEP22-4.

The retarded limit value IGLGG for the ignition timing is determined from the engine temperature Tw based on a data table (not shown) such that the internal combustion engine 1 can operate normally with advanced ignition timing greater than the retarded limit value IGLGG. The threshold value IGX is set to a value which is the sum of the retarded limit value IGLGG and a predetermined value (constant value), i.e., a value which is more advanced than the retarded limit value IGLGG by a predetermined value. The retarded limit value IGLGG is a constant value insofar as the engine temperature Tw is in a normal temperature range, but more advanced than in the normal temperature range insofar as the engine temperature Tw is in a considerably low temperature range.

After having determined the retarded limit value IGLGG for the ignition timing and the threshold value IGX, the ignition timing control means 26 compares the command value iglog determined in STEP22-3 with the threshold value IGX in STEP22-5. If the command value iglog is equal to or more advanced than the threshold value IGX (iglog≧IGX), then since the ignition-timing-dependent correcting process is not carried out, the ignition timing control means 26 sets the value of the ignition timing determining flag f/dec (see STEP15-7 shown in FIG. 15) to "0" in STEP22-6, after which control goes to STEP22-11.

If iglog<IGX in STEP22-5, the ignition timing control means 26 sets the value of the ignition timing determining flag f/dec to "1" in order to carry out the ignition-timing-dependent correcting process in STEP22-7. Then, the ignition timing control means 26 determines the value of the learning calculation end flag f/flrnend relative to the learning calculation process carried out by the intake air quantity control means 25 in STEP22-8. Only if f/flrnend=0, the ignition timing control means 26 holds the present value of the FIRE elapsed time t/fire as the value of the learning end time parameter t/kil in STEP22-9. Then, the ignition timing control means 26 sets the value of the learning calculation end flag f/flrnend to "1" in order to end the calculation of the basic learning corrective coefficient vpskisld in STEP22-10.

Then, the ignition timing control means 26 compares the command value iglog determined in STEP22-3 with the retarded limit value IGLGG determined in STEP22-4 in STEP22-11. If iglog≧IGLGG, i.e., if the command value iglog falls within the retarded limit value IGLGG, then control returns to the main routine shown in FIG. 4.

If iglog<IGLGG, i.e., if the command value iglog determined in STEP22-3 is more retarded than the retarded limit value IGLGG, then the ignition timing control means 26 forcibly sets the command value iglog to the retarded limit value IGLGG in STEP22-12. The ignition timing control means 26 holds the integrated value $\Sigma\sigma2$ of the switching function $\sigma2$ forcibly as the value determined in the control cycle immediately before iglog<IGLGG in STEP22-13. Thereafter, control returns to the main routine shown in FIG. 4. The integrated value $\Sigma\sigma2$ is held because if the calculation of the ignition timing difference command value DIG were continued by the processing in STEP23-12 with the command value iglog for the ignition timing being forcibly set to the limit value IGLGG, the integrated value $\Sigma\sigma2$ of the switching function $\sigma2$ and hence the value (absolute value) of the adaptive law input DIGadp would excessively be large.

The processing described above with reference to FIGS. 19 through 24 is a detailed process for generating the command value iglog for the ignition timing in STEP4-6 shown in FIG. 4. The command value iglog thus generated is given to the ignition unit 21, which controls the ignition timing of the internal combustion engine 1 according to the given command value iglog.

According to the operation of the system described above, in the FIRE mode, the amount of intake air introduced into the combustion chamber 4 is increased to a level higher than in the normal idling mode by controlling the bypass opening. Concurrent with this, the ignition timing control rotational speed F/B control process controls the ignition timing to be retarded so as to converge the rotational speed Ne to the predetermined target rotational speed ne/fire (finally the idling rotational speed NOBJ). Therefore, the amount of heat energy given to the catalytic converter 3 by exhaust gases generated by the internal combustion engine 1 upon combustion of the air-fuel mixture is made greater than in the normal idling mode, so that it is possible to quickly increase the temperature of and activate the catalytic converter 3, and at the same time to keep the rotational speed Ne which tends to increase due to the increased amount of intake air at an appropriate level.

With respect to increasing the amount of intake air, the command value for the bypass opening is corrected by the amount-of-intake-air F/B control correcting process using the intake adaptive SLD control process in order to converge the predicted integrated amount qair/pre of intake air corresponding to the integrated value of the amount of heat energy actually given, from instant to instant, to the catalytic converter 3 after the amount of intake air has started to be increased, to the target integrated amount qair/cmd of intake air corresponding to the target integrated value of the amount of heat energy to be actually given to the catalytic converter 3.

Figure 25:
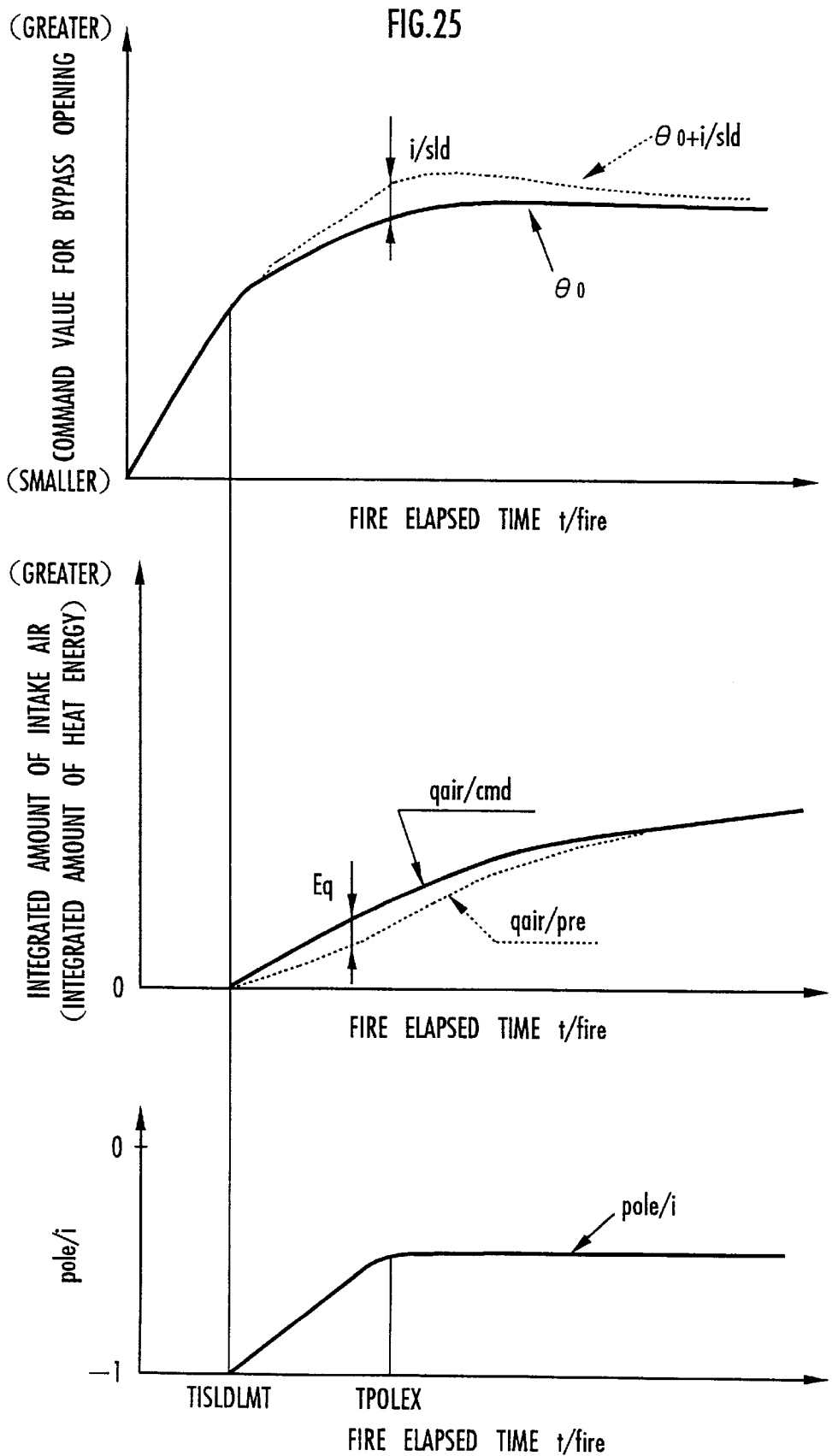
FIG. 25 is a diagram illustrative of an operation of the control system shown in FIG. 1.

For example, as shown in a middle diagram section of FIG. 25, when the predicted integrated amount qair/pre of intake air suffers an error (intake difference Eq) with respect to the target integrated amount qair/cmd of intake air that is determined dependent on the standard opening command value θ0 because of a variation in the amount of intake air due to structural factors, the opening command Θ (command value for the bypass opening) is corrected by the SLD opening corrective quantity i/sld with respect to the standard opening command value θ0, as shown in an upper diagram section of FIG. 25. The correction of the opening command Θ is capable of converging the predicted integrated amount qair/pre of intake air to the target integrated amount qair/cmd of intake air as shown in the middle diagram section of FIG. 25, and hence causing the integrated value of the amount of heat energy actually given to the catalytic converter 3 to follow the target value thereof. In this manner, variations in the amount of intake air due to structural factors can be compensated for, and hence variations in the pattern in which the temperature of the catalytic converter 3 increases due to structural factors can be eliminated.

In this embodiment, furthermore, the opening command Θ is corrected by way of multiplication by the atmospheric pressure corrective coefficient kpa and the atmospheric temperature corrective coefficient kta which are determined by the atmospheric condition correcting process. Specifically, as the atmospheric pressure Pa is lower, the opening command Θ is corrected so as to be larger, and as the atmospheric temperature is higher, the opening command Θ is corrected so as to be larger. In this manner, variations in the amount of intake air due to atmospheric conditions can be compensated for, and hence variations in the pattern in which the temperature of the catalytic converter 3 increases due to atmospheric conditions can be eliminated.

As a result, the pattern of the temperature increase of the catalytic converter 3 in the FIRE mode can be brought into conformity with a desired pattern (in this embodiment, if the engine temperature Tw and the shifted position of the automatic transmission while in the FIRE mode are constant, then the pattern of the temperature increase of the catalytic converter 3 in each FIRE mode is substantially the same except when the FIRE mode is interrupted), and the catalytic converter 3 can reliably be increased in temperature and activated in the FIRE mode.

Since the standard opening command value θ0, the target amount gair/cmd of intake air, and the target integrated amount gair/cmd of intake air are established so as to be dependent on the engine temperature Tw at the start of the internal combustion engine 1, which corresponds to the temperature status of the catalytic converter 3 at the start of the internal combustion engine 1 (basically, as the engine temperature Tw is higher, the target amount gair/cmd of intake air and the target integrated amount qair/cmd of intake air are smaller), the catalytic converter 3 can be increased in temperature and activated in a manner to match the temperature status of the catalytic converter 3 at the start of the internal combustion engine 1. Specifically, the pattern of the temperature increase of the catalytic converter 3 in the FIRE mode (the time-dependent degree of increase of the temperature) depends on the temperature status of the catalytic converter 3 at the start of the internal combustion engine 1, and the final temperature status of the catalytic converter 3 in the FIRE mode can be made optimum for the activation of the catalytic converter 3.

The target integrated amount qair/cmd of intake air defined by the standard opening command value θ0 is established such that the amount of intake air to be drawn into the combustion chamber 4 dependent thereon in each control cycle, i.e., the target amount gair/cmd of intake air, is gradually reduced after the FIRE elapsed time t/fire has reached the predetermined value t2 (see FIG. 7), i.e., after the internal combustion engine 1 has been warmed up to a certain extent. Therefore, even if the friction of various components of the internal combustion engine 1 is reduced as the internal combustion engine 1 is warmed up, the rotational speed Ne is prevented from tending to increase. As a result, the ignition timing of the internal combustion engine 1 is prevented from being excessively retarded by the ignition timing control rotational speed F/B control process.

Furthermore, when the command value iglog for the ignition timing determined by the ignition timing control rotational speed F/B control process exceeds the threshold value IGX close to the retarded limit value IGLGG for the ignition timing, the amount-of-intake-air F/B control correcting process is interrupted, and the opening command Θ is reduced in a feed-forward manner by the ignition-timing-dependent correcting process. Therefore, even if the friction of the internal combustion engine 1 is lowered to a degree greater than expected or lowered quickly, it is possible to reduce an increase in the tendency of the rotational speed Ne to increase, and to prevent the ignition timing from being excessively retarded until it would reach the retarded limit value IGLGG.

In the present embodiment, the amount-of-intake-air F/B control correcting process employs the sliding mode control process which is less susceptible to disturbances and errors in the modeling of the object to be controlled, particularly the adaptive sliding mode control process (the intake adaptive SLD control process) which uses the adaptive law for eliminating the effect of disturbances, etc. as much as possible, for highly stably converging the predicted integrated amount qair/pre of intake air to the target integrated amount qair/cmd of intake air and hence converging the integrated value of the amount of heat energy given to the catalytic converter 3 to its target value. As a consequence, the catalytic converter 3 can more reliably be increased in temperature and activated.

In the intake adaptive SLD control process of the amount-of-intake-air F/B control correcting process, the object to be controlled thereby is considered to be a system for generating the integrated amount Qa of intake air from the opening command Θ, and is expressed by a discrete-system model (intake-side controlled model). Therefore, the algorithm of the ignition timing adaptive SLD control process can be constructed more simply and suitable for computer processing than if the object to be controlled were expressed by a continuous-system model.

Because the object to be controlled by the intake adaptive SLD control process is expressed as a discrete-system model, the switching function σ1 used in the intake adaptive SLD control process can be constructed using time-series data of only the intake difference Eq without using the rate of change of the intake difference Eq. As a result, the reliability of the value of the switching function σ1 required to determine the SLD opening corrective quantity i/sld can be increased, and hence the reliability of the intake adaptive SLD control process can be increased.

In the intake adaptive SLD control process, by omitting the feedback term Θeq/fb of the equivalent control input Θeq and employing the standard opening command value θ0 corresponding to the feed-forward term Θeq/ff as the equivalent control input Θeq in this embodiment, the SLD opening corrective quantity i/sld can be determined by a simple algorithm without using the model parameters a1, a2, b1 of the model to be controlled (the intake controlled model).

While the SLD opening corrective quantity i/sld can be determined using the model parameters a1, a2, b1, since the model to be controlled by the intake adaptive SLD control process is constructed by a discrete system, the values of the model parameters a1, a2, b1 can accurately be identified by using a known identifying algorithm.

In the amount-of-intake-air F/B control correcting process, as shown in the middle diagram section of FIG. 25, until the SLD correction limit time TISLDLMT elapses immediately after the start of the internal combustion engine 1 elapses, the values of the predicted integrated amount qair/pre of intake air and the target integrated amount qair/cmd of intake air are forcibly held to "0", and the value of the SLD opening corrective quantity i/sld is also held to "0".

Therefore, immediately after the start of the internal combustion engine 1, the amount-of-intake-air F/B control correcting process is not performed until the SLD correction limit time TISLDLMT elapses, and the bypass opening is controlled in a feed-forward manner primarily based on the standard opening command value θ0 (more accurately, the value produced by multiplying the standard opening command value θ0 by the atmospheric pressure corrective coefficient kpa, the atmospheric temperature corrective coefficient kta, and the learning corrective coefficient kilearn (see the upper diagram section of FIG. 25).

Accordingly, immediately after the start of the internal combustion engine 1, the amount of intake air is smoothly increased in the same pattern as the pattern of increase of the standard opening command value θ0, with the result that the combustion status of the internal combustion engine 1 is smoothly stabilized immediately after it has started, thereby achieving a good emission status of the internal combustion engine 1.

For actually starting the amount-of-intake-air F/B control correcting process, the value of the pole pole/i relative to the intake adaptive SLD control process is gradually increased from "−1" (|pole/i| is gradually reduced) until the FIRE elapsed time t/fire reaches the predetermined value TPOLEX, as shown in a lower diagram section of FIG. 25, so that the rate of reduction of the intake difference Eq is made smaller until the FIRE elapsed time t/fire reaches the predetermined value TPOLEX than after the FIRE elapsed time t/fire has reached the predetermined value TPOLEX.

As a consequence, when the amount-of-intake-air F/B control correcting process is started, the opening command Θ and hence the amount of intake air are prevented from greatly varying abruptly, so that the stability of the combustion status of the internal combustion engine 1 can be maintained in an initial stage after its start while achieving a good emission status of the internal combustion engine 1.

In this embodiment, furthermore, according to the learning correcting process, the SLD opening corrective quantity i/sld produced by the amount-of-intake-air F/B control correcting process is learned, and the learning corrective coefficient kilearn (basically the basic learning corrective coefficient vpskisld) based on the value of the ratio of the SLD integrated intake corrective quantity qair/sld produced by integrating the SLD opening corrective quantity i/sld in the FIRE mode, to the target integrated amount qair/cmd of intake air is determined. For a next FIRE mode, the opening command Θ is corrected by being multiplied by the learning corrective coefficient kilearn in a feed-forward fashion in the full period of the FIRE mode, so that any correction of the opening command Θ in each control cycle based on the SLD opening corrective quantity i/sld in the FIRE mode can be held to a minimum. As a result, even if the amount of intake air varies greatly due to structural factors, the pattern of time-dependent changes of the amount of intake air is prevented from largely deviating from the pattern of the standard opening command value θ0, and the internal combustion engine 1 can be operated stably without impairing the combustion and emission statuses of the internal combustion engine 1.

In this embodiment, even when the vehicle is propelled or the internal combustion engine 1 is raced by depressing the accelerator pedal in the FIRE mode, and the internal combustion engine 1 operates in a mode other than the idling mode, resulting in interrupting the FIRE mode, the bypass opening is controlled to increase the amount of intake air (the amount-of-intake-air F/B control correcting process is interrupted), and the calculation of the predicted integrated amount qair/pre of intake air and the target integrated amount qair/cmd of intake air is continued. After the interruption of the FIRE mode is canceled, the amount-of-intake-air F/B control correcting process is resumed, and the opening command Θ is corrected to converge the predicted integrated amount qair/pre of intake air to the target integrated amount qair/cmd of intake air. Therefore, when the internal combustion engine 1 operates in a mode other than the idling mode while in the FIRE mode, resulting in interrupting the FIRE mode, the catalytic converter 3 can reliably be increased in temperature and activated within the FIRE mode limit time TFIRELMT.

With respect to the ignition timing control rotational speed F/B control process, the feedback control process thereof employs the adaptive sliding mode control process (the ignition timing adaptive SLD control process) as with the amount-of-intake-air F/B control correcting process, for thereby increasing the stability of converging the rotational speed Ne to the target rotational speed ne/fire.

At this time, based on the response designating characteristics of the ignition timing adaptive SLD control process which is a response designating control process, the ignition-timing-dependent pole basic value pole/igtbl which is established as a normal value for the pole pole/ig (=s4/s3) which defines the rate of reduction of the rotational speed difference En (=Ne−ne/fire) is variably determined such that as the command value iglog for the ignition timing that is controlled for the control of the rotational speed Ne is more retarded, the rate of reduction of the rotational speed difference En is reduced. Generally, as the ignition timing is more retarded, a change in the rotational speed Ne with respect to a change in the ignition timing is greater. Under such a condition, the value of the pole pole/ig is established so as to reduce the rate of reduction of the rotational speed difference En for thereby suppressing the change in the command value iglog determined by the ignition timing adaptive SLD control process to prevent the rotational speed Ne from changing abruptly with respect to the target rotational speed ne/fire. If the ignition timing is advanced, the value of the pole pole/ig is established so as to increase the rate of reduction of the rotational speed difference En for thereby enabling the rotational speed Ne to follow the target rotational speed ne/fire quickly. Consequently, the process of controlling the rotational speed Ne at the target rotational speed ne/fire can be performed quickly and stably.

In an initial stage immediately after the ignition timing control rotational speed F/B control process has started, i.e., until the rotational speed F/B elapsed time Δt/nfb reaches the predetermined value T/NFBX, the ignition-timing-dependent pole basic value pole/igtbl is corrected by being multiplied by the time-dependent corrective coefficient kigt to determine the pole pole/ig in order to reduce the rate of reduction of the rotational speed difference En. In this fashion, the rotational speed Ne is prevented from varying abruptly immediately after the start of the ignition timing control rotational speed F/B control process, so that the combustion status of the internal combustion engine 1 is prevented from being impaired.

In the present embodiment, when the ignition timing control rotational speed F/B control process is resumed after the interruption of the FIRE mode is canceled, the ignition-timing-dependent pole basic value pole/igtbl is corrected by being multiplied by the rotational-speed-dependent corrected corrective coefficient kignef to determine the pole pole/ig in order to reduce the rate of reduction of the rotational speed difference En as the rotational speed Ne is much higher than the target rotational speed ne/fire. In this manner, when the rotational speed Ne is much higher than the target rotational speed ne/fire at the time of resuming the ignition timing control rotational speed F/B control process, the command value iglog for the ignition timing is prevented from abruptly becoming retarded depending on the large rotational speed difference En, and the internal combustion engine 1 can operate stably.

Furthermore, the absolute value of the pole pole/i for defining the rate of reduction of the intake difference Eq relative to the amount-of-intake-air F/B control correcting process is established so as to be greater than the absolute value of the pole pole/ig for defining the rate of reduction of the rotational speed difference En relative to the ignition timing control rotational speed F/B control process (see the processing in STEP17-7, STEP17-8 shown in FIG. 17). Stated otherwise, the pole pole/ig is set to such a value that the rate of reduction of the rotational speed difference En is higher than the rate of reduction of the intake difference Eq. Consequently, the feedback control process for converging the rotational speed Ne to the target rotational speed ne/fire according to the ignition timing control rotational speed F/B control process and the feedback control process for converging the predicted integrated amount qair/pre of intake air to the target integrated amount qair/cmd of intake air according to the amount-of-intake-air F/B control correcting process are prevented from interfering with each other thereby to controlling the rotational speed Ne stably at the target rotational speed ne/fire.

In the ignition timing adaptive SLD control process used in the ignition timing control rotational speed F/B control process, the object to be controlled thereby is considered to be a system for generating the difference rotational speed DNE corresponding to the rotational speed Ne from the ignition timing difference command value DIG corresponding to the command value iglog for the ignition timing and is expressed by a discrete-system model (rotational speed controlled model). Therefore, the algorithm of the ignition timing adaptive SLD control process can be constructed simply and suitable for computer processing.

Because the object to be controlled by the in-take adaptive SLD control process is expressed as a discrete-system model, the switching function σ2 can be constructed using time-series data of only the intake difference Eq without using the rate of change of the rotational speed difference En, as with the intake adaptive SLD control process. As a result, the reliability of the value of the switching function σ2 required to determine the ignition timing difference command value DIG can be increased, and hence the reliability of the ignition timing adaptive SLD control process can be increased.

While the bypass valve 7 is used as a flow control valve for increasing the amount of intake air introduced into the combustion chamber 4 in the FIRE mode in the illustrated embodiment, the amount of intake air may be increased by controlling the opening of the throttle valve 5.

While the amount of intake air introduced into the combustion chamber 4 (the predicted amount gair/pre of intake air) is predicted from the intake pressure Pb in the illustrated embodiment, the amount of intake air may directly be detected by an air flow sensor or the like.

In the illustrated embodiment, the adaptive sliding mode control process is employed as the response designating control process of the amount-of-intake-air F/B control correcting process. However, a normal sliding mode control process free of the adaptive law may be employed. In such a normal sliding control process, it is preferable to add the feedback term Θeq/fb of the equivalent control input Θeq to determine the SLD opening corrective quantity i/sld.

In this embodiment, the pole pole/i for defining the rate of reduction of the intake difference Eq is basically variably established depending on the FIRE elapsed time t/fire. However, the pole pole/i may be variably established depending on appropriate conditions in view of the controllability of the predicted integrated amount qair/pre of intake air at the target integrated amount qair/cmd of intake air and the stability of operation of the internal combustion engine 1.

In the illustrated embodiment, the object to be controlled by the amount-of-intake-air F/B control correcting process is expressed by a secondary autoregressive model (discrete-system model). However, it may be expressed by an autoregressive model of higher order. In this case, the switching function required for the amount-of-intake-air F/B control correcting process needs to be established as a linear function of three or more time-series data of the intake difference Eq, for example. Even with such a scheme, the rate of reduction of the intake difference Eq can be designated by the values of coefficient parameters of the switching function as with the illustrated embodiment. This holds true also for the ignition timing adaptive SLD control process.

A process of designating the rate of reduction of the intake difference Eq and the rotational speed difference En in the same manner as with the illustrated embodiment if the object to be controlled by the intake adaptive SLD control process or the ignition timing adaptive SLD control process is expressed by an autoregressive model (discrete-system model) of third order will briefly be described below. In the following description, the intake adaptive SLD control process and the ignition timing adaptive SLD control process are collectively referred to as an "adaptive SLD control process". Input and output of an object to be controlled by the adaptive SLD control process are referred to as X, Y, a target value for the output Y of the object to be controlled, which is a control quantity of the adaptive SLD control process, is referred to as y, and the difference between the output Y and the target value y is referred to as E (=Y−y). With respect to the intake adaptive SLD control process, the input X, the output Y (control quantity), the target value y, and the difference E correspond respectively to the opening command Θ (command value for the bypass opening), the predicted integrated amount qair/pre of intake air, the target integrated amount qair/cmd of intake air, and the intake difference Eq. With respect to the ignition timing adaptive SLD control process, the input X, the output Y (control quantity), the target value y, and the difference E correspond respectively to the ignition timing difference command value DIG (=iglog−igbase), the difference rotational speed DNE (Ne−NOBJ), the target difference rotational speed dne (ne/fire−NOBJ), and the rotational speed difference En (=Ne−ne/fire).

The object to the controlled by the adaptive SLD control process is expressed by an autoregressive model of third order according to the following equation (52), for example, i.e., a discrete-system model in which the output Y of the object to be controlled in each control cycle is represented by an output Y of the object to be controlled up to three previous control cycles and an input X of the object to be controlled in a preceding control cycle:

$$Y(k+1)=e1.Y(k)+e2.Y(k-2)+f1.X(k) \tag{52}$$

A switching function σ3 used in the adaptive SLD control process is defined by a linear function of three time-series data E(k), E(k−1), E(k−2) of the difference E (hereinafter referred to as a "control quantity difference E") between the output Y (control quantity) and the target value y, as represented by the following equation (53):

$$\sigma 3(k)=(Y(k)-y(k))+s5.(Y(k-1)-y(k-1))+s6.(Y(k-2)-y(k-2)$$

$$=E(k)+s5 \cdot E(k-1)+s6 \cdot E(k-2) \tag{53}$$

In the equation (52), e1 through e3 and f1 represent model parameters which define the behavioral characteristics of the object to be controlled. In the equation (53), s5, s6 represent coefficient parameters of the switching function σ3. The coefficient relative to the control quantity difference En(k) is set to "1" for the sake of brevity.

The condition for converging (reducing) the control quantity difference En stably to "0" while the value of the switching function σ3 is being converged to "0" is that the characteristic root of the following equation (54) obtained as σ3=0 in the equation (53), i.e., the characteristic roots λ1, λ2 given by the following equation (55), are present in a unit circle on a complex plane.

$$E(k) = -s5 \cdot E(k-1) - s6 \cdot E(k-2) \tag{54}$$

$$\lambda 1 = \frac{-s5 + \sqrt{s5^2 - 4 \cdot s6}}{2} \tag{55}$$

$$\lambda 2 = \frac{-s5 - \sqrt{s5^2 - 4 \cdot s6}}{2}$$

Figure 26:
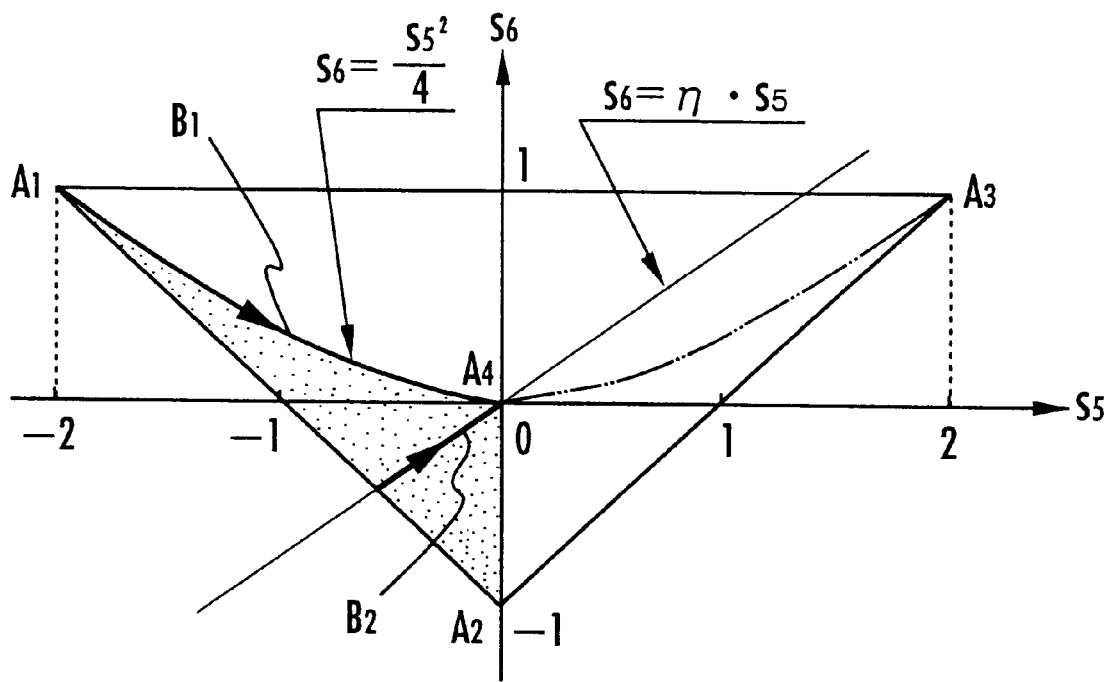
FIG. 26 is a diagram illustrative of a modification of the control system shown in FIG. 1.

A combination of the values of the coefficient parameters s5, s6 of the switching function σ3 which satisfies the above condition is a combination of the values of the coefficient parameters s5, s6 determined by points in an area surrounded by a triangle A1A2A3 on a coordinate plane (a coordinate plane having the coefficient parameters s5, s6 as components) shown in FIG. 26. If the values of the coefficient parameters s5, s6 are established such that a point determined thereby on the coordinate plane shown in FIG. 26 is present in the triangle A1A2A3, then it is possible to converge the control quantity difference En stably to "0" while the value of the switching function σ3 is being converged to "0".

For converging the control quantity difference E in a non-oscillatory fashion to "0", the values of the coefficient parameters s5, s6 may be established such that a point on the coordinate plane shown in FIG. 26 is present in a stippled area (hereinafter referred to as an "area A1A2A4") within the triangle A1A2A3. A curve A1A4 which defines the upper boundary of the area A1A2A4 is a parabolic curve expressed by the quadratic function s6=s5²/4. A point A4 represents the origin of the coordinate plane.

When the values of the coefficient parameters s5, s6 are established such that a point (s5, s6) determined thereby is present within the area A1A2A4, the rate of reduction of the control quantity difference E becomes greater as the point (s5, s6) approaches the origin A4 by changing the values of the coefficient parameters s5, s6 to move the point (s5, s6) from the side A1A2 of the area A1A2A4 toward the origin A4.

For example, when the values of the coefficient parameters s5, s6 are changed to move the point (s5, s6) from the point A1 to the origin A4 on the curve (parabolic curve) A1A4 (see the arrow B1 in FIG. 26), the rate of reduction of the control quantity difference E increases continuously gradually.

Alternatively, for example, when the values of the coefficient parameters s5, s6 are changed to move the point (s5, s6) from the side A1A2 of the area A1A2A4 to the origin A4 on a straight line expressed by the equation s6=η.s5 (η>0) (see the arrow B2 in FIG. 26), the rate of reduction of the control quantity difference E increases continuously gradually.

With respect to the intake adaptive SLD control process of the amount-of-intake-air F/B control correcting process, as with the previous embodiment, in order to increase the rate of reduction of the intake difference Eq gradually from a low rate depending on the FIRE elapsed time t/fire in an initial stage of the FIRE mode (immediately after the internal combustion engine 1 has started), the values of the coefficient parameters s5, s6 may be changed to move the point (s5, s6) from a point within the area A1A2A4 near the side A1A2 to the origin A4 as the FIRE elapsed time t/fire increases.

For variably establishing the coefficient parameters s5, s6, it is preferable to move the point (s5, s6) on the curve (parabolic curve s6=s5²/4) A1A4 or on the straight line s6=η.s5. With this arrangement, if either one of the coefficient parameters s5, s6 is established depending on the FIRE elapsed time t/fire, then the value of the other coefficient parameter is determined, and hence it is easier to variably establish the coefficient parameters s5, s6.

More specifically, if the point (s5, s6) is to move on the curve (parabolic curve s6=s5²/4) A1A4, basic values of the coefficient parameters s5, s6 are determined depending on the FIRE elapsed time t/fire in the same tendency as the pole table value pole/itbl (see FIG. 9) within a range −2<s5<0 ("−2", "0" are lower and upper limit values, respectively, of the coefficient parameter s5 on the curve A1A4 of the area A1A2A4). The coefficient parameter s6 is then determined from the coefficient parameter s5 according to the equation s6=s5²/4. The coefficient parameters s5, s6 may similarly be established when the point (s5, s6) is moved on the straight line s6=η.s5.

In this case, the reaching law input Θrch and the adaptive law input Θadp required to determine the SLD opening corrective quantity i/sld may be made proportional respectively to the value of the switching function σ3 and its integrated value. The standard opening command value θ0 may be used instead of the equivalent control input Θeq.

With respect to the ignition timing adaptive SLD control process of the ignition timing control rotational speed F/B control process, in order to reduce the rate of reduction of the rotational speed difference En as the command value iglog for the ignition timing is more retarded, the values of the coefficient parameters s5, s6 may be variably established depending on the command value iglog for the ignition timing such that the point (s5, s6) moves within the area A1A2A4 toward the side A1A2 (away from the origin A4) as the command value iglog for the ignition timing is more retarded. The coefficient parameters s5, s6 may similarly be variably established for reducing the rate of reduction of the rotational speed difference En as the rotational speed difference En is greater (as the rotational speed Ne is much higher than the target rotational speed ne/fire), and for reducing the rate of reduction of the rotational speed difference En until the rotational speed F/B elapsed time Δt/nfb reaches the predetermined value T/NFBX, when the ignition timing control rotational speed F/B control process is reduced by the cancellation of the interruption of the FIRE mode.

In this case, as with the intake adaptive SLD control process, for variably establishing the coefficient parameters s5, s6, the point (s5, s6) is moved on the curve (parabolic curve s6=s5²/4) A1A4 or on the straight line s6=s5 for thereby making it easier to variably establish the coefficient parameters s5, s6.

More specifically, if the point (s5, s6) is to move on the curve (parabolic curve s6=s5²/4) A1A4, basic values of the coefficient parameters s5, s6 are determined depending on the command value iglog for the ignition timing in the same tendency as the ignition-timing-dependent pole basic value pole/igtbl (see FIG. 20) within a range $-2<s5<0$ ("-2", "0" are lower and upper limit values, respectively, of the coefficient parameter s5 on the curve A1A4 of the area A1A2A4). The basic value of the coefficient parameter s5 is multiplied by a corrective coefficient determined depending on the rotational speed F/B elapsed time $\Delta t/nfb$ in the same tendency as the time-dependent corrective coefficient kigt and a corrective coefficient determined dependent on the rotational speed Ne in the same tendency as the rotational-speed-dependent corrective coefficient kigne (more preferably, the rotational-speed-dependent corrected corrective coefficient kignef) to produce a value, which is established as the value of the coefficient parameter s5. The coefficient parameter s6 is then determined from the coefficient parameter s5 according to the equation $s6=s5^2/4$. The coefficient parameters s5, s6 may similarly be established when the point (s5, s6) is moved on the straight line $s6=\eta.s5$.

An equation for calculating the equivalent control input DIGeq required to determine the ignition timing difference command value DIG can be determined from a condition $\sigma3(k+1)=\sigma(k)$ and the equation (52). The reaching law input DIGrch and the adaptive law input DIGadp may be made proportional to the value of the switching function $\sigma3$ and its integrated value, as with the previous embodiment.

In the above embodiment, with respect to the feedback control process based on controlling the bypass opening, an example wherein the predicted integrated amount qair/pre of intake air is converged to the target integrated amount qair/cmd of intake air has been described as a control quantity for controlling the predicted integrated amount qair/pre of intake air (more generally, an integrated value of the amount of heat energy given to the catalytic converter 3). However, the present invention is also applicable to controlling the amount of intake air to converge the output torque or the like of the internal combustion engine 1 to its target value. Furthermore, if the ignition timing control rotational speed F/B control process in the above embodiment is not carried out, then the present invention is also applicable to controlling the rotational speed Ne of the internal combustion engine 1 at a desired target rotational speed.

In the above embodiment, if the air-fuel ratio of the air-fuel mixture to be combusted in the combustion chamber 4 is constant, then since the amount of heat energy generated by the internal combustion engine 1 (the amount of heat energy of exhaust gases), and hence the amount of heat energy given to the catalytic converter 3 are substantially proportional to the amount of intake air introduced into the combustion engine 4, the integrated amount of intake air in each control cycle is used as data representing the amount of heat energy given to the catalytic converter 3. However, inasmuch as the amount of heat energy generated by the internal combustion engine 1 slightly varies depending on the ignition timing of the internal combustion engine 1, if the accuracy of the data representing the amount of heat energy given to the catalytic converter 3 is to be increased, then the predicted or detected value of the amount of intake air from instant to instant (in each control cycle) may be corrected dependent on the ignition timing from instant to instant, and integrated to acquire data representing the amount of heat energy. If the air-fuel ratio of the air-fuel mixture needs to be changed, then the predicted or detected value of the amount of intake air from instant to instant (in each control cycle) may be corrected dependent on the air-fuel ratio from instant to instant, and integrated to acquire data representing the amount of heat energy. At any rate, it is possible to carry out these processes by preparing data tables of corrective coefficients for correcting the predicted or detected value of the amount of intake air depending on the ignition timing or the air-fuel ratio.

The above correcting processes for acquiring data representing the amount of heat energy given to the catalytic converter 3 are also applicable to instances where the amount of supplied fuel or other parameters are used as the data representing the amount of heat energy.

Although certain preferred embodiments of the present invention have been shown and described in detail, it should be understood that various changes and modifications may be made therein without departing from the scope of the appended claims.

What is claimed is:

1. An apparatus for controlling an internal combustion engine by generating a command value for a manipulative quantity of a flow control valve disposed in an intake air passage of an internal combustion engine controllable by the flow control valve, according to a sliding mode control process in order to converge a predetermined control quantity relative to the internal combustion engine to a target value thereof, wherein an object to be controlled by the sliding mode control process is modeled by a discrete system for generating said control quantity from the command value for the manipulative quantity of said flow control valve, said sliding mode control process uses a switching function constructed by a linear function composed of a plurality of time-series data of the difference between said control quantity and said target value, and an algorithm for generating the command value for the manipulative quantity of said flow control valve in a predetermined control cycle according to said sliding mode control process is constructed based on the discrete-system model of said object to be controlled and said switching function.

2. An apparatus according to claim 1, wherein said discrete-system model comprises a model in which said control quantity in each control cycle is expressed by the control quantity and the command value for the manipulative quantity of said flow control valve in a control cycle prior to said control cycle.

3. An apparatus according to claim 1 or 2, wherein said sliding mode control process comprises an adaptive sliding mode control process.

4. An apparatus according to claim 3, wherein the algorithm of said sliding mode control process determines a corrective quantity for the command value for the manipulative quantity of said flow control valve based on a reaching law and an adaptive law of said adaptive sliding mode control process, and corrects, with the determined corrective quantity, a reference control value for the manipulative quantity of said flow control valve determined depending on the target value for said control quantity for thereby determining the command value for the manipulative quantity of said flow control valve in each control cycle.

5. An apparatus according to claim 4, wherein said corrective quantity for the command value for the manipulative quantity of said flow control valve is determined as the sum of a component based on said reaching law proportional to the value of said switching function and a component based on said adaptive law proportional to an integrated value of the value of said switching function in each control cycle.

6. An apparatus according to claim 1, comprising means for variably establishing the value of a coefficient parameter relative to the time-series data of the difference between said control quantity of the switching function and said target value, depending on a predetermined condition.

7. An apparatus according to claim 6, wherein said control quantity is converged to said target value according to said sliding mode control process immediately after said internal combustion engine has started to operate, and, at least in a predetermined period after said internal combustion engine has started to operate, the value of said coefficient parameter is established in order to make a rate of reduction of said difference lower than after elapse of said predetermined period.

* * * * *